United States Patent
Dylewski, II

(10) Patent No.: US 12,065,026 B2
(45) Date of Patent: Aug. 20, 2024

(54) MULTI-PANEL TONNEAU COVER

(71) Applicant: Leer Group, Elkhart, IN (US)

(72) Inventor: Eugene A. Dylewski, II, Granger, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 18/332,341

(22) Filed: Jun. 9, 2023

(65) Prior Publication Data

US 2023/0322059 A1 Oct. 12, 2023

Related U.S. Application Data

(63) Continuation of application No. 17/716,047, filed on Apr. 8, 2022, now Pat. No. 11,673,459, which is a continuation of application No. 16/928,117, filed on Jul. 14, 2020, now Pat. No. 11,299,021.

(60) Provisional application No. 62/929,189, filed on Nov. 1, 2019, provisional application No. 62/929,161, filed on Nov. 1, 2019, provisional application No. 62/929,141, filed on Nov. 1, 2019, provisional application No. 62/929,129, filed on Nov. 1, 2019, provisional application No. 62/929,244, filed on Nov. 1, 2019, provisional application No. 62/928,448, filed (Continued)

(51) Int. Cl.
*B60J 7/14* (2006.01)
*B60J 7/16* (2006.01)
*B60J 7/19* (2006.01)

(52) U.S. Cl.
CPC ............. *B60J 7/141* (2013.01); *B60J 7/1607* (2013.01); *B60J 7/198* (2013.01)

(58) Field of Classification Search
CPC ... B60J 7/14; B60J 7/141; B60J 7/1607; B60J 7/198
USPC ............. 296/100.01, 100.02, 100.06, 100.09
See application file for complete search history.

(56) References Cited

U.S. PATENT DOCUMENTS

| | | | | |
|---|---|---|---|---|
| 4,946,217 A | * | 8/1990 | Steffens | B60P 7/02 296/100.09 |
| 6,059,350 A | * | 5/2000 | Kooiker | B60J 7/141 296/100.09 |

(Continued)

FOREIGN PATENT DOCUMENTS

CA          2834605 A1    9/2014

OTHER PUBLICATIONS

Extended European Search Report Dated Jul. 21, 2023; Application No. EP 20841597.6-1009 / 3999366 PCT/US2020042049.

*Primary Examiner* — Jason S Daniels
(74) *Attorney, Agent, or Firm* — Barnes & Thornburg LLP

(57) ABSTRACT

A tonneau cover for a bed of a truck is provided. The tonneau cover includes several improvements including but not limited to a bulkhead panel that is secured to the truck. A first cover panel section pivotably attached to the bulkhead panel. A first intermediate panel section pivotably attached to the first cover panel section and a second panel section. A second intermediate panel section pivotably attached to the second cover panel section and a third panel section. The first cover panel section, the second cover panel section, and the third cover panel section fold to form a stack of cover panel sections which is pivoted upright onto the bulkhead panel which supports the stack of cover panel sections in an upright position. The second intermediate panel section sets upon the bulkhead panel when the stack of (Continued)

cover panel sections is pivoted upright onto the bulkhead panel.

18 Claims, 45 Drawing Sheets

Related U.S. Application Data on Oct. 31, 2019, provisional application No. 62/928,606, filed on Oct. 31, 2019, provisional application No. 62/875,172, filed on Jul. 17, 2019.

(56) References Cited

U.S. PATENT DOCUMENTS

| | | | |
|---|---|---|---|
| 6,170,900 B1 * | 1/2001 | Kooiker | B60J 7/141 296/100.09 |
| 6,899,372 B1 * | 5/2005 | Keller | B60J 7/141 296/100.1 |
| 9,815,357 B2 | 11/2017 | Hall | |
| 9,815,358 B1 * | 11/2017 | Quintus | B60J 7/141 |
| 2001/0035664 A1 * | 11/2001 | Steffens | B60J 7/141 296/100.09 |
| 2002/0145299 A1 * | 10/2002 | Henderson | B62D 33/04 296/61 |
| 2007/0210609 A1 | 9/2007 | Malmin et al. | |
| 2008/0100088 A1 * | 5/2008 | Calder | B60J 7/141 296/100.09 |
| 2016/0176448 A1 * | 6/2016 | Germano | B60J 7/141 296/100.09 |
| 2016/0200376 A1 * | 7/2016 | Kerr, III | B60J 7/198 296/100.09 |
| 2017/0210214 A1 * | 7/2017 | Weltikol | B60P 7/02 |

* cited by examiner

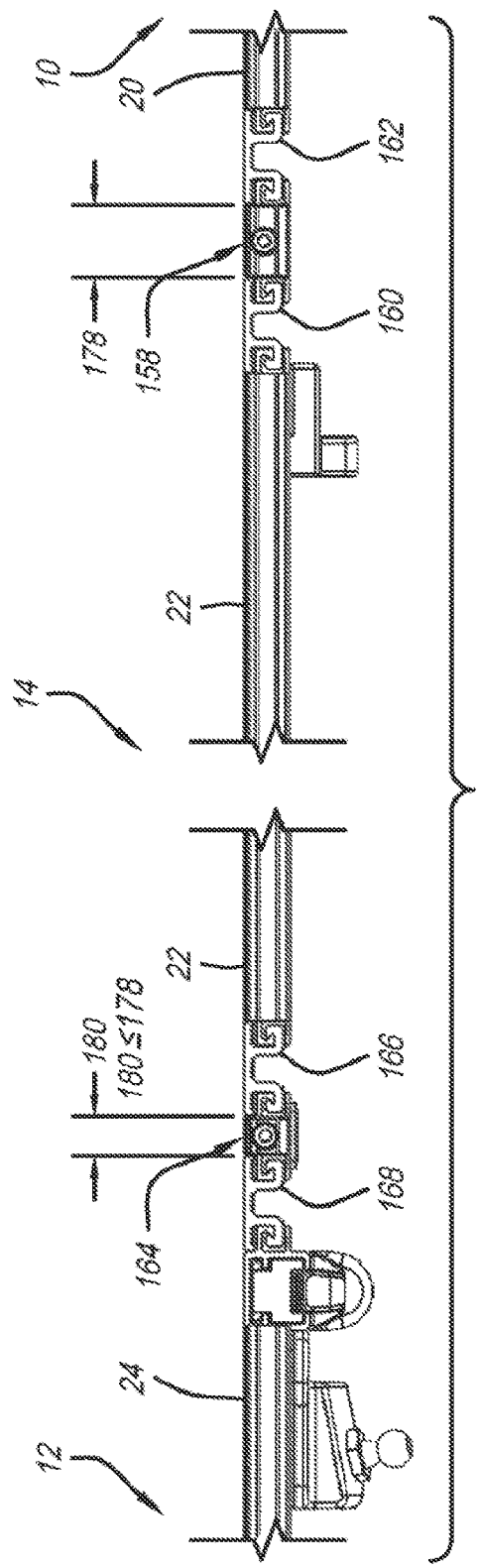
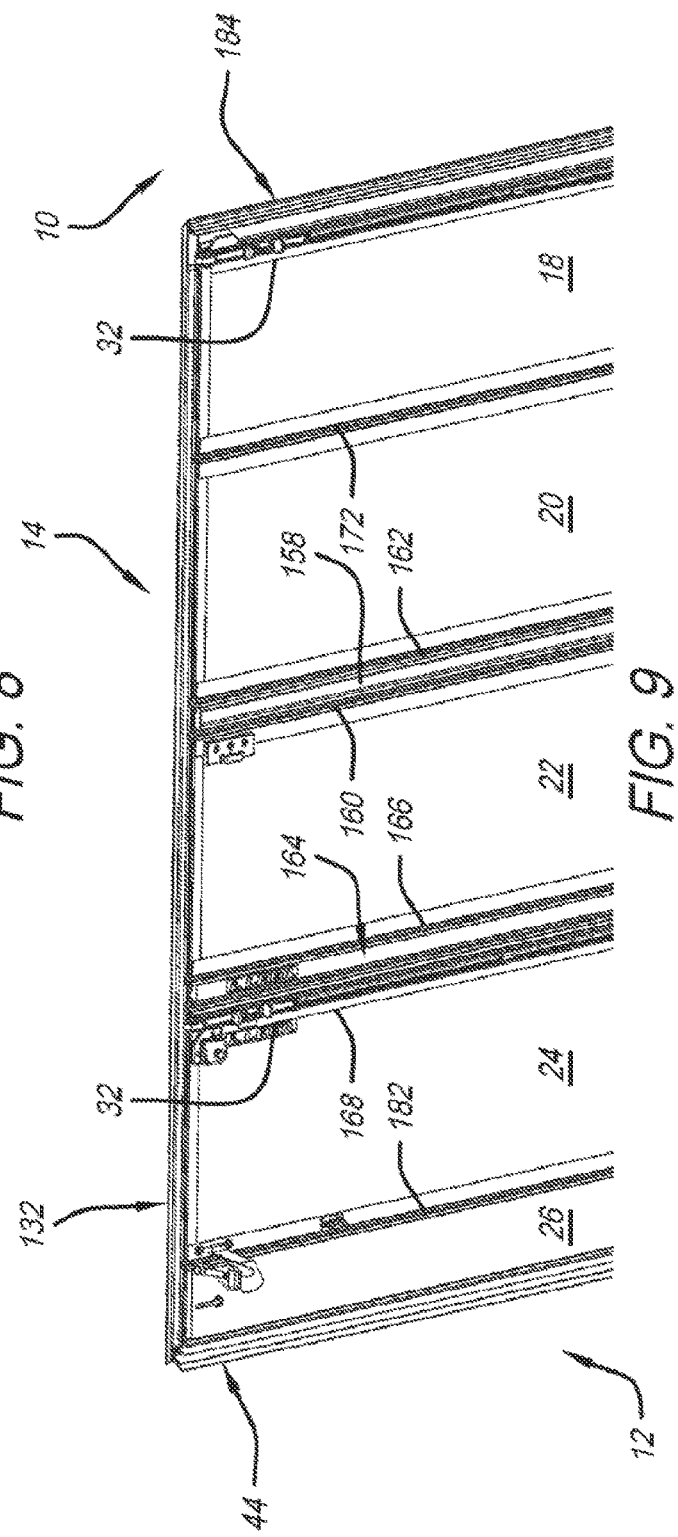

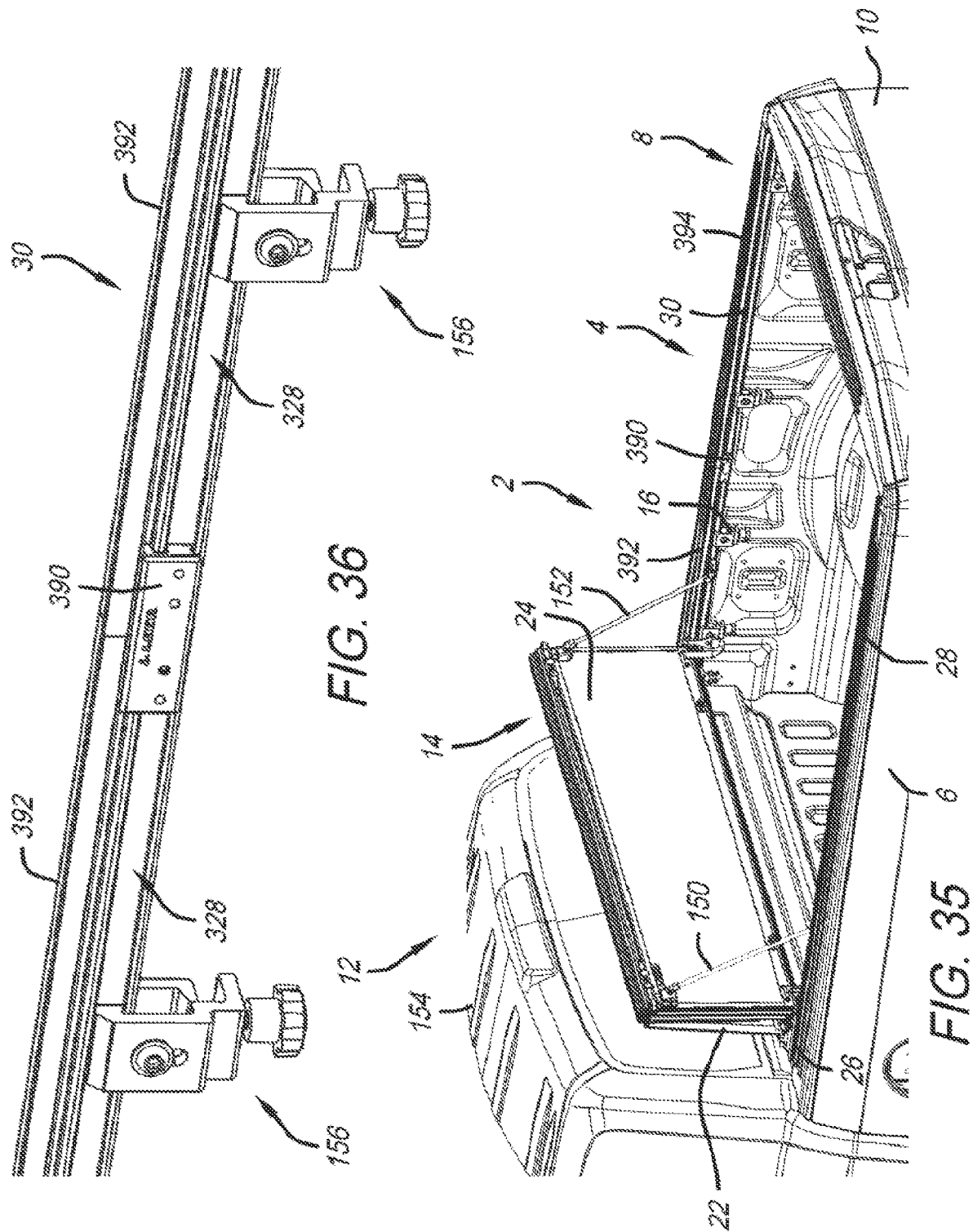

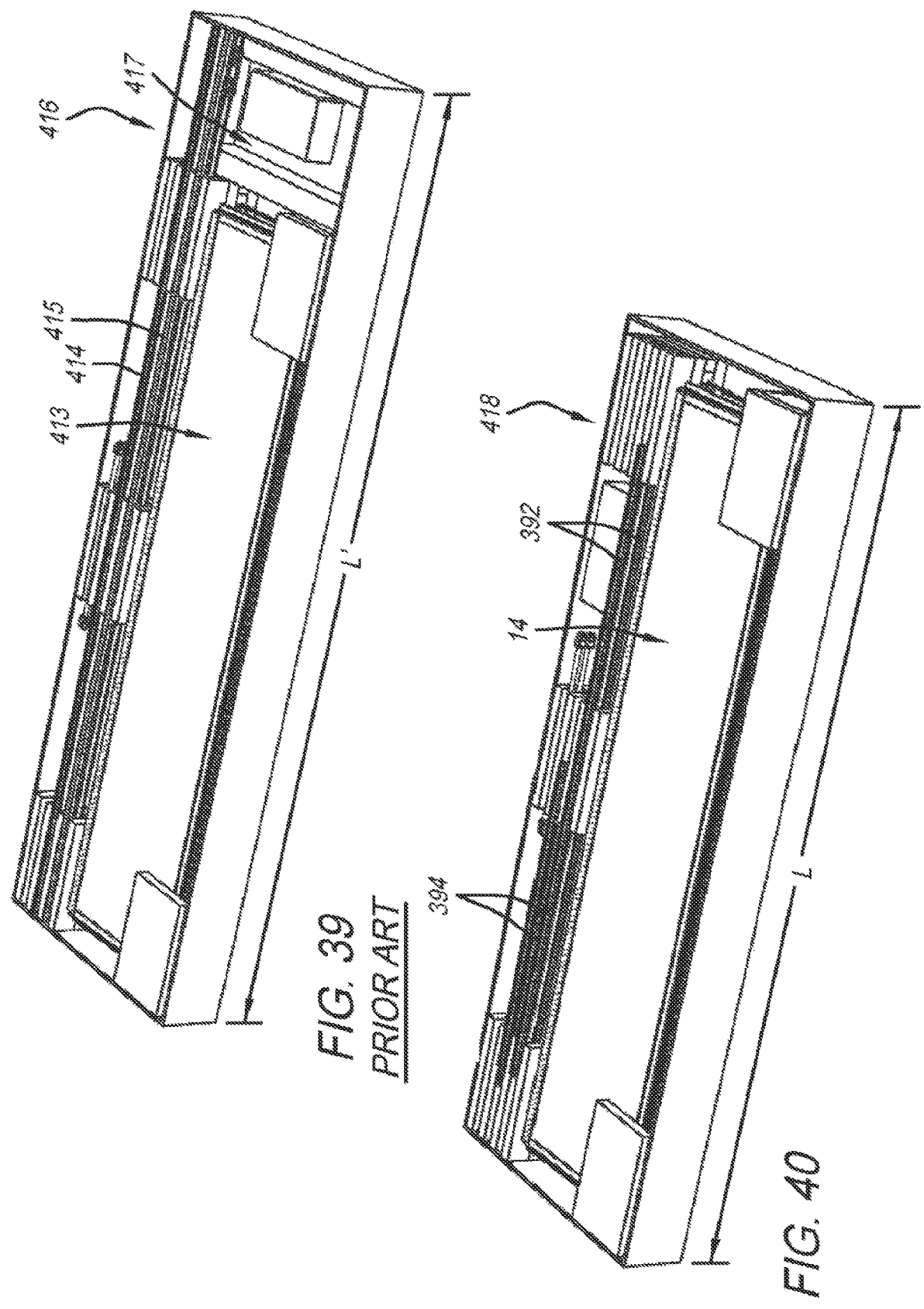

MULTI-PANEL TONNEAU COVER

RELATED APPLICATIONS

The present Application is a Continuation Application of U.S. Continuation application Ser. No. 17/716,047, filed on Apr. 8, 2022, which is a continuation of U.S. patent application Ser. No. 16/928,117, filed on Jul. 14, 2020, entitled, "Multi Panel Tonneau Cover," issuing as U.S. Pat. No. 11,299,021, which is related to and claims priority to U.S. Provisional Application No. 62/875,172, entitled "Tonneau Cover," filed on Jul. 17, 2019; and to U.S. Provisional Patent Application, Ser. No. 62/929,129, filed on Nov. 1, 2019 entitled "Mechanical Catch Assembly," and to U.S. Provisional Application Ser. No. 62/928,448, filed on Oct. 31, 2019 entitled "Tonneau Cover Multi-Piece Rail," and to U.S. Provisional Application Ser. No. 62/929,189, filed on Nov. 1, 2019 entitled "Tonneau Cover Panel Section Hinge Seals," and to U.S. Provisional Application Ser. No. 62/928,606, filed on Oct. 31, 2019 entitled "Tonneau Cover Panel Section Handle," and to U.S. Provisional Application Ser. No. 62/929,141, filed on Nov. 1, 2019 entitled "Tonneau Cover Wall Rail," and to U.S. Provisional Application Ser. No. 62/929,161, filed on Nov. 1, 2019 entitled "Bulkhead Panel Assembly," and also claims priority to U.S. Provisional Application Ser. No. 62/929,244, filed on Nov. 1, 2019, entitled "Four Panel Tonneau Cover." The subject matter disclosed in these applications are hereby expressly incorporated into the present Application.

TECHNICAL FIELD AND SUMMARY

The present disclosure relates to trucks such as pickup trucks, and truck beds used on pickup trucks and like vehicles and, in particular, truck bed covers also known as tonneau covers, used on such truck beds that include new features.

Tonneau covers are truck bed covers that provide a covering for a truck bed when used in combination with the truck's sidewalls and tailgate. Covering the bed of a pickup truck helps create a secure compartment where items may be stored out of view when the tailgate is in an upward and latched position. Embodiments of a tonneau cover may include the cover portion that is suspended over the truck bed between the sidewalls. Typically, a frame or rail assembly may be employed that attaches to the opposing sidewalls to secure the cover onto the truck.

An illustrative embodiment of the present disclosure provides a tonneau cover for a bed of a truck. The tonneau cover comprises: first and second rails; each of the first and second rails are configured to attach to one of two opposed truck bed sidewalls; a bulkhead panel that is secured to each of the first and second rails; a first cover panel section pivotably attached to the bulkhead panel; a second cover panel section; a first intermediate panel section pivotably attached to the first cover panel section and the second panel section; a third cover panel section; a second intermediate panel section pivotably attached to the second cover panel section and the third panel section; and a fourth cover panel section pivotally attached to the third cover panel section; wherein the first cover panel section, the second cover panel section, the third cover panel section, and the fourth cover panel section fold to form a stack of cover panel sections; wherein the stack of cover panel sections is pivoted upright onto the bulkhead panel which supports the stack of cover panel sections in an upright position; wherein the stack of cover panel sections form a generally triangularly-shaped side profile such that a bottom portion of the generally triangularly-shaped side profile of the stack of cover panel sections is wider than a top portion of the generally triangularly-shaped side profile of the stack of cover panel sections; and wherein the second intermediate panel section sets upon the bulkhead panel when the stack of cover panel sections is pivoted upright onto the bulkhead panel.

In the above and other embodiments, the tonneau cover may further comprise: the first intermediate panel section has a side profile width less than a side profile width of the second intermediate panel section; the first intermediate panel section has a side profile width less than or equal to a side profile width of the second intermediate panel section; a first flexible hinge attaches the first cover panel section to the bulkhead panel, a second flexible hinge that attaches the first intermediate panel section to the first cover panel section, a third flexible hinge that attaches the first intermediate panel section to the second panel section, a fourth flexible hinge that attaches the second intermediate panel section to the second cover panel section, and a fifth flexible hinge that attaches the second intermediate panel section to the third panel section; the first intermediate panel section has a side profile width that is not greater than a side profile width of the second intermediate panel section; at least one of the cover panel sections of the stack of cover panel sections has a side profile that is positioned non-parallel with at least one of another cover panel section of the stack of cover panel sections; the stack of cover panel sections that is pivoted upright onto the bulkhead panel which supports the stack of cover panel sections in an upright position is configured to not block a center high mount stop lamp on the truck; the bulkhead panel includes at least one tab, at least a portion of which is sized to engage at least a portion of the second intermediate panel section to determine a location on the bulkhead panel that supports the stack of cover panel sections in the upright position; the second intermediate panel section includes at least one channel as the at least a portion of the second intermediate panel section to receive the at least a portion of the at least one tab; the at least one tab on the bulkhead panel is a plurality of tabs; and the at least one tab on the bulkhead panel has characteristics selected from the group consisting of at least one of a detent, friction fit, and fastener.

Another illustrative embodiment of the present disclosure provides a tonneau cover for a bed of a truck. The tonneau cover comprises: a bulkhead panel that is configured to secure to the truck; a plurality of cover panel sections pivotably attached to each other; and an intermediate panel section pivotably attached to at least one of the cover panel sections of the plurality of cover panel sections; wherein the plurality of cover panel sections fold to form a stack of cover panel sections; wherein the stack of cover panel sections is pivoted upright onto the bulkhead panel which supports the stack of cover panel sections in an upright position; wherein the intermediate panel section sets upon the bulkhead panel when the stack of cover panel sections is pivoted upright onto the bulkhead panel; and wherein the bulkhead panel includes at least one tab, at least a portion of which is sized to engage at least a portion of the second intermediate panel section to determine a location on the bulkhead panel that supports the stack of cover panel sections in an upright position.

In the above and other embodiments, the tonneau cover may further comprise: the second intermediate panel section includes at least one channel as the at least a portion of the second intermediate panel section to receive the at least a portion of the at least one tab; the at least one tab on the bulkhead panel is a plurality of tabs; the at least one tab on the bulkhead panel has characteristics selected from the group consisting of at least one of a detent, friction fit, and fastener; and the stack of cover panel sections form a generally triangularly-shaped side profile such that a bottom portion of the generally triangularly-shaped side profile of the stack of cover panel sections is wider than a top portion of the generally triangularly-shaped side profile of the stack of cover panel sections.

Another illustrative embodiment of the present disclosure provides a tonneau cover for a bed of a truck. The tonneau cover comprises: a bulkhead panel that is secured to the truck; a first cover panel section pivotably attached to the bulkhead panel; a second cover panel section; a first intermediate panel section pivotably attached to the first cover panel section and the second panel section; and a third cover panel section; a second intermediate panel section pivotably attached to the second cover panel section and the third panel section; wherein the first cover panel section, the second cover panel section, and the third cover panel section fold to form a stack of cover panel sections; wherein the stack of cover panel sections is pivoted upright onto the bulkhead panel which supports the stack of cover panel sections in an upright position; wherein the first intermediate panel section has a side profile width less than a side profile width of the second intermediate panel section; and wherein the stack of cover panel sections form a generally triangularly-shaped side profile such that a bottom portion of the generally triangularly-shaped side profile of the stack of cover panel sections is wider than a top portion of the generally triangularly-shaped side profile of the stack of cover panel sections.

In the above and other embodiments, the tonneau cover may further comprise: at least one of the cover panel sections of the stack of cover panel sections has a side profile that is positioned non-parallel with at least one other cover panel sections of the stack of cover panel sections; and the bulkhead panel includes at least one tab, at least a portion of which is sized to engage at least a portion of the second intermediate panel section to determine a location on the bulkhead panel that supports the stack of cover panel sections in the upright position.

Another illustrative embodiment of the present disclosure provides a tonneau cover for a bed of a truck. The tonneau cover comprises: a bulkhead panel that is secured to the truck; a first cover panel section pivotably attached to the bulkhead panel; a second cover panel section; a first intermediate panel section pivotably attached to the first cover panel section and the second panel section; a third cover panel section; a second intermediate panel section pivotably attached to the second cover panel section and the third panel section; wherein the first cover panel section, the second cover panel section, and the third cover panel section fold to form a stack of cover panel sections; wherein the stack of cover panel sections is pivoted upright onto the bulkhead panel which supports the stack of cover panel sections in an upright position; wherein the second intermediate panel section sets upon the bulkhead panel when the stack of cover panel sections is pivoted upright onto the bulkhead panel; and wherein the first intermediate panel section has a side profile width less than or equal to a side profile width of the second intermediate panel section.

Additional features and advantages of the tonneau cover assembly will become apparent to those skilled in the art upon consideration of the following detailed descriptions of carrying out the tonneau cover assembly as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 8; is a side detail view of portions of the tonneau cover;

FIG. 9 is an underside perspective view of a portion of the tonneau cover;

FIG. 35 is a perspective view of the truck with the tonneau cover folded, stacked, and positioned upright with respect to the truck bed;

FIG. 36 is a perspective detail view of an assembled split rail;

FIG. 39 is a prior art perspective view of a folded prior art tonneau cover and components related thereto, packaged in a prior art carton;

FIG. 40 is a perspective view of a folded tonneau cover according to the present disclosure along with components related thereto, packaged in a carton;

Corresponding reference characters indicate corresponding parts throughout the several views. The exemplification set out herein illustrates embodiments of the tonneau cover assembly, and such exemplification is not to be construed as limiting the scope of the tonneau cover assembly in any manner.

DETAILED DESCRIPTION OF THE DRAWINGS

Figure 1:
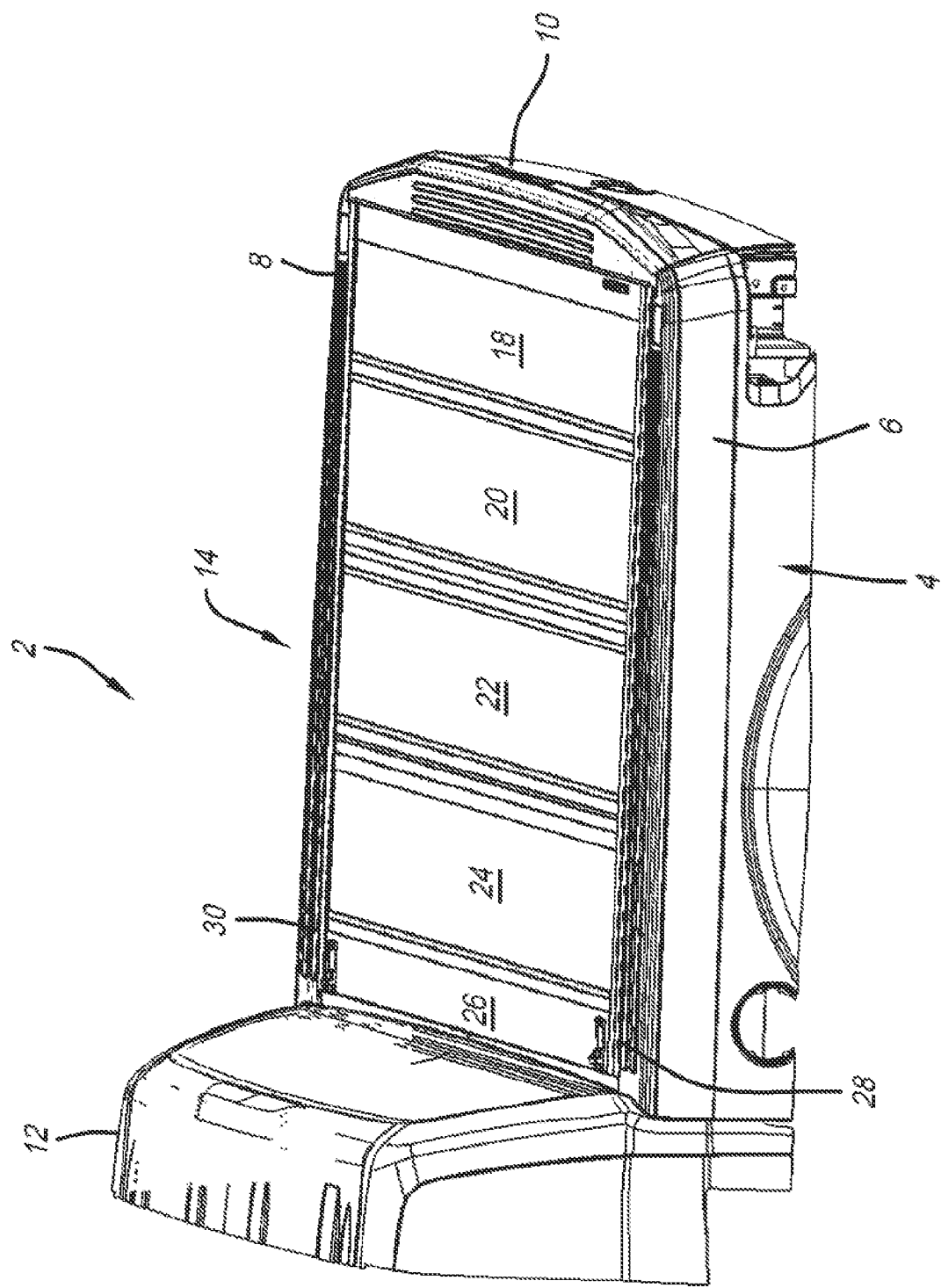
FIG. 1 is a rear perspective view of a pickup truck with an accompanying truck bed having tonneau cover lying over top.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a pickup truck that includes a cab section located in front of a bed section. The pickup truck comprises a tonneau cover that covers the bed section. The tonneau cover includes a cover member that shrouds the truck bed underneath. The cover member may be composed of one or more folding sections that are hingedly attached to each other. The cover member may alternatively be made of a soft material that is flexible enough to fold or roll between covered and uncovered positions with respect to the truck bed underneath. To that end, the types of tonneau covers pertinent to this present disclosure are of the type that may be folded or rolled between covered and uncovered conditions with respect to the truck bed.

Multi Panel Tonneau Cover

An illustrative embodiment of the present disclosure also provides a pickup truck that includes a multi sectioned tonneau cover. Illustratively, each of the sections are pivotable with respect to each other and to a bulkhead panel. The cover sections may be supported on the bulkhead panel in a vertical orientation when folded and stacked. Illustratively, a four panel folding tonneau cover has an advantage over a three panel cover, for example, in that each of the four cover sections can be shorter, which means when stacked vertically on the bulkhead panel, the cover sections have less propensity to extend above the cab roof of the pickup truck. This translates into less likelihood for drag created by larger vertically oriented cover sections.

In a further illustrative embodiment, when the cover sections are stacked and oriented vertically, the cover sections are configured so they do not all fold flat against each other to create a substantially rectangular side profile. Instead, the stacked panels form a generally triangularly-shaped side profile. A disadvantage of having all of the cover sections folded flat against each other, thereby creating the rectangularly-shaped side profile, is there is no inherent stability in the stack when folded in this rectangular side profile configuration. Such a stack typically can only continue folding over center towards the truck cab rear window because of this lack of stability.

Instead, the tonneau cover of the present disclosure includes at least one intermediate panel so that when the panels are stacked and positioned vertically on the bulkhead panel, the side profile width of the stack is greater at the bottom when compared at the top. At least one of the cover sections is spaced apart from one or more of the other cover sections creating a space therebetween. Furthermore, that space therebetween has a greater distance towards the bottom of the cover section stack than at the top of the cover section stack. The effect of this is creating a triangularly-shaped side profile. By creating this wider area at the bottom than at the top, the center of gravity is lower and the vertically oriented stack of cover sections has better stability. Prop rods can be used to maintain the cover sections in their upright position while the truck is moving.

In a further embodiment, a positive placement assembly can illustratively be attached to the bulkhead panel and employed to engage the wider bottom of the stacked cover sections. This assists the operator in positioning the folded stack of cover sections at a desired predetermined location on the bulkhead panel.

A rear perspective view of a truck 2, with an accompanying truck bed 4 comprising sidewalls 6 and 8, is shown in FIG. 1. This view also depicts tailgate 10 and cab section 12 located opposite each other with truck bed 4 located therebetween. Illustratively, a tonneau cover 14 is shown shrouding interior 16 of truck bed 4 (see, also, FIG. 2). Tonneau cover 14 is composed of a plurality of cover sections 18, 20, 22, and 24 that are pivotably attached to each other as shown (see, also, FIGS. 2, 3, and 4). A bulkhead panel assembly 26 is secured to rails 28 and 30, which are positioned along the inner periphery of sidewalls 6 and 8, respectively. Illustratively, cover section 18 is pivotably attached to bulkhead panel assembly 26. It is appreciated that the tonneau cover 14 shown herein is illustrative.

Figure 2:
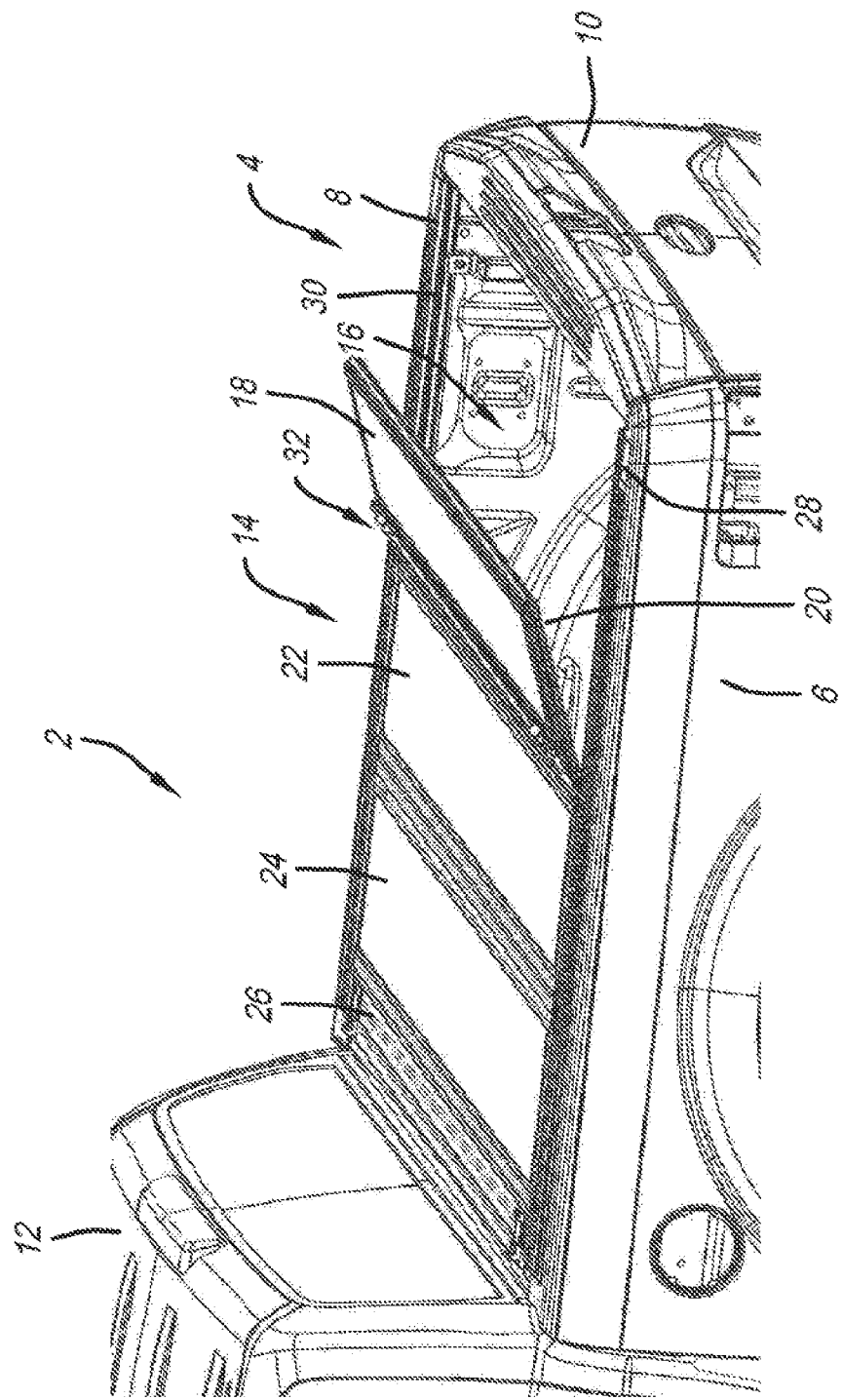
FIG. 2 is another perspective view of the truck of FIG. 1 depicting the tonneau cover in a partially folded-up position.

Another perspective view of truck 2 is shown in FIG. 2. In this view, tonneau cover 14 is depicted partially shrouding truck bed 4. In particular, cover section 18 is folded over cover section 20. In addition, cover section 20 is pivoted with respect to cover section 22. By folding at least one of the cover sections, interior 16 of truck bed 4 becomes accessible. Latching assembly 32 is shown on panel 18. It is contemplated that latching assembly 32 will engage rails 28 and 30 to latch thereto when all of cover sections 18, 20, 22, and 24 of tonneau cover 14 are laid flat covering truck bed 4 and shrouding interior 16. Because latching assembly 32 is directed towards interior 16 of truck bed 4, such latches are concealed from the exterior of truck 2.

Figure 3:
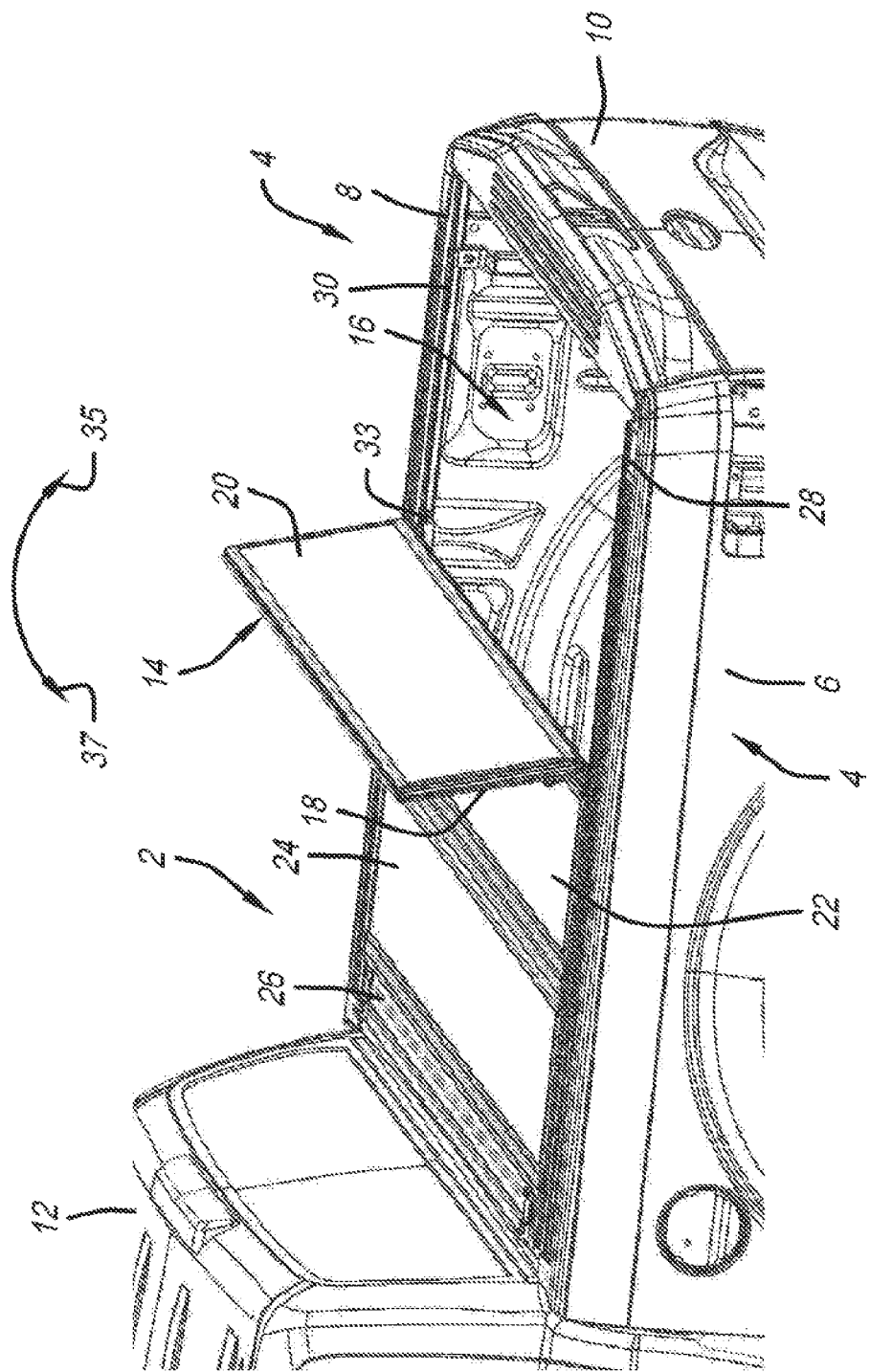
FIG. 3 is another perspective view of the tonneau cover further folded-up.

Another perspective view of truck 2 is shown in FIG. 3. Similar to the views shown in FIGS. 1 and 2, truck 2 depicts tonneau cover 14 laying atop sidewalls 6 and 8 via rails 28 and 30 to shroud a portion of interior 16 of bed 4. This view, however, also shows cover sections 18 and 20 of tonneau cover 14 folded over further than that shown in FIG. 2 to further reveal interior 16 underneath. Also shown in this view is a mechanical catch assembly 33 attached to rail 30 and bulkhead panel assembly 26.

Figure 4:
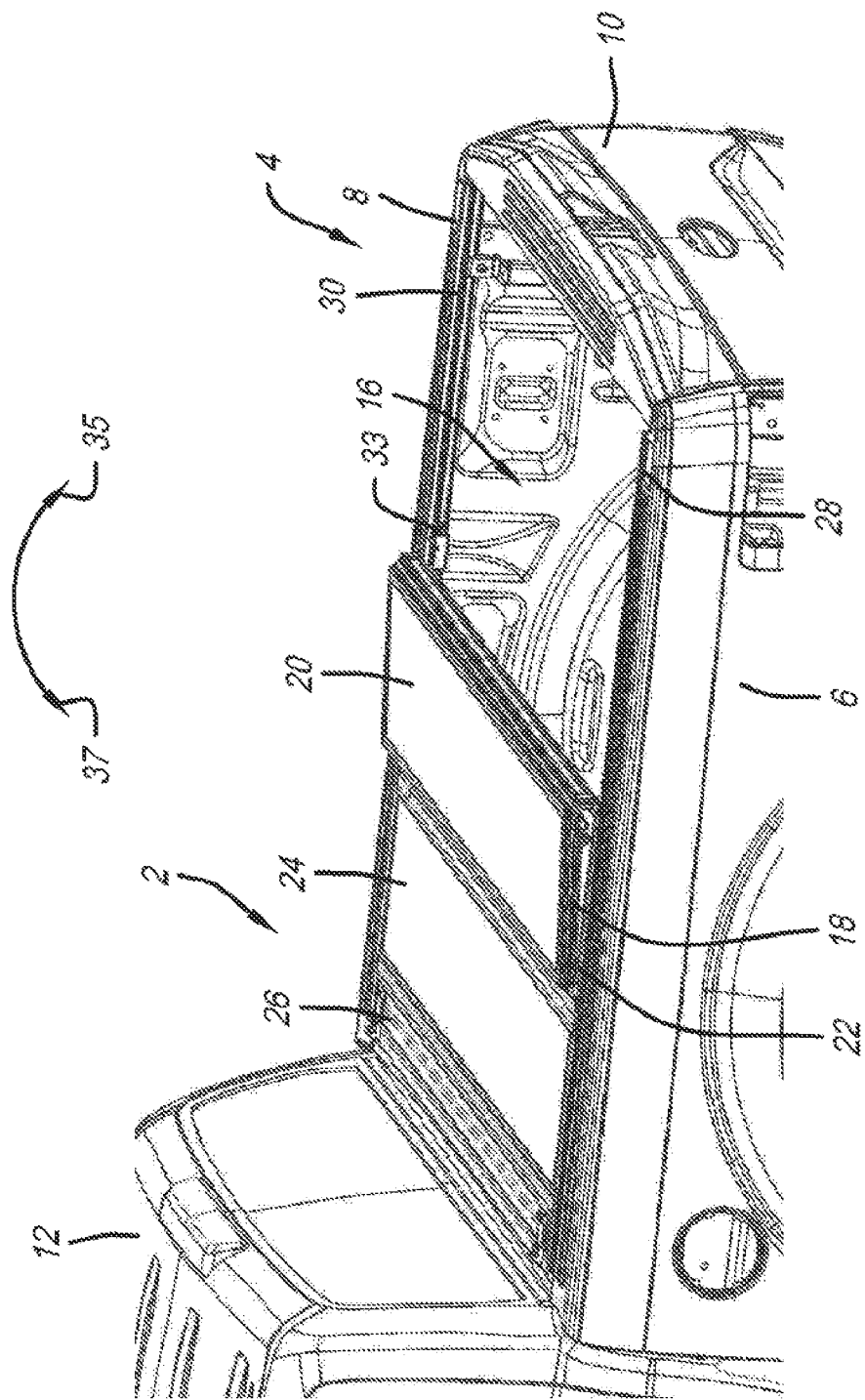
FIG. 4 is another perspective view of the truck with the tonneau cover further folded-up.

A similar perspective view of truck 2, as shown in FIGS. 1, 2, and 3, is also shown in FIG. 4. This view differs from FIGS. 1, 2, and 3 in that cover sections 18 and 20 are folded over onto cover section 22. Illustratively, cover sections 18 and 20 have been pivoted in direction 37 toward bulkhead panel assembly 26.

Figure 5:
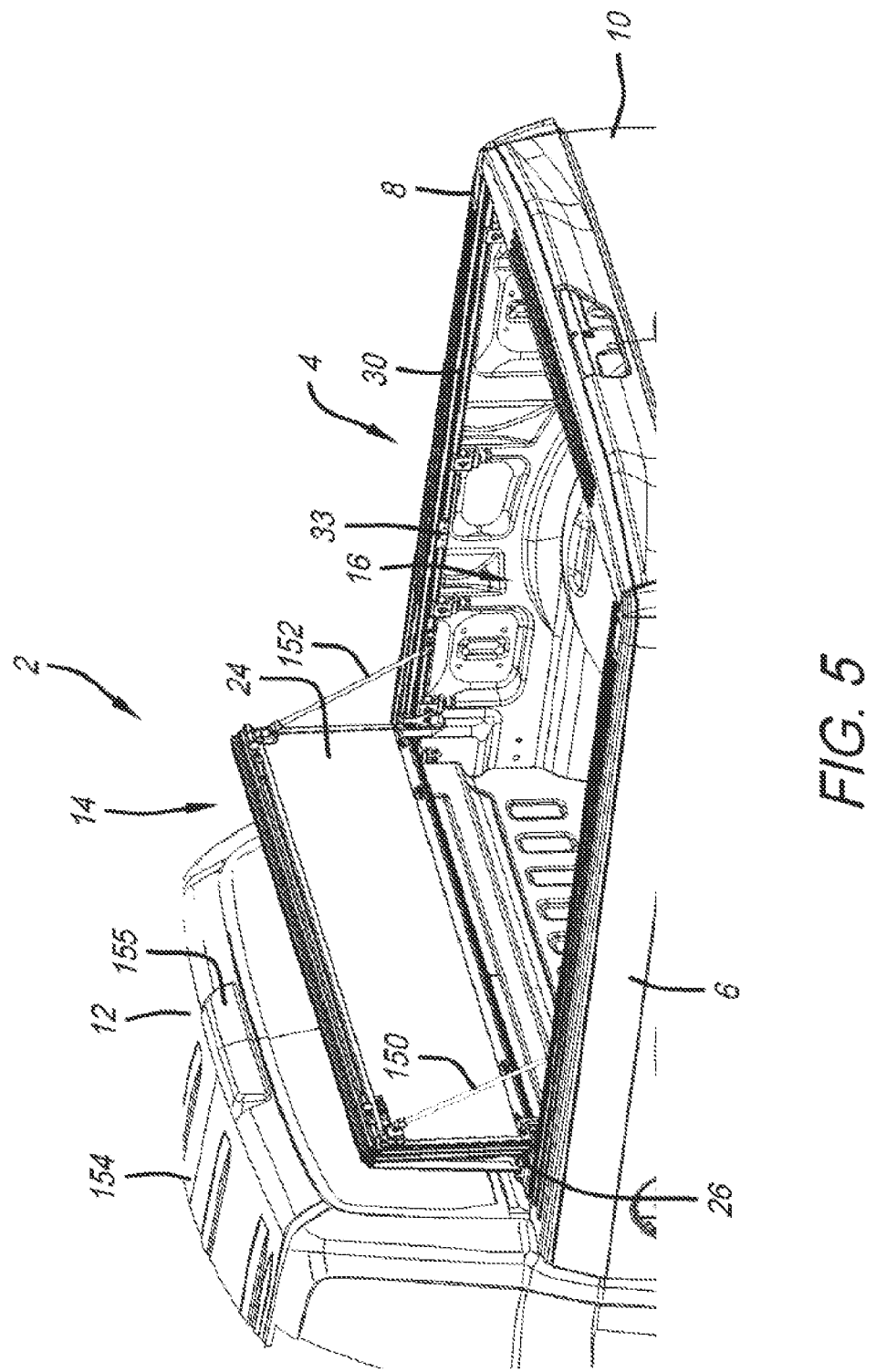
FIG. 5 is another perspective view of the truck with the tonneau cover folded up into a stack set up right.

A similar perspective view of truck 2, as shown in FIGS. 1, 2, 3, and 4, is also shown in FIG. 5. This view differs from the others in that cover sections 18, 20, 22, and 24 are folded over and stacked vertically onto bulkhead panel assembly 26. Prop rods 150 and 152 are both coupled to cover section 24 and onto rails 28 and 30, respectively. The prop rods assist in keeping the stack of cover sections 18, 20, 22 and 24 upright while truck 2 is moving. It is further appreciated from this view that, by virtue of the illustrative four foldable cover sections, the height of the folded stack does not extend above the roof top 154 of cab section 12. In addition, the folded stack does not cover the center high mount stop lamp (CHMSL) 155.

Figure 6:
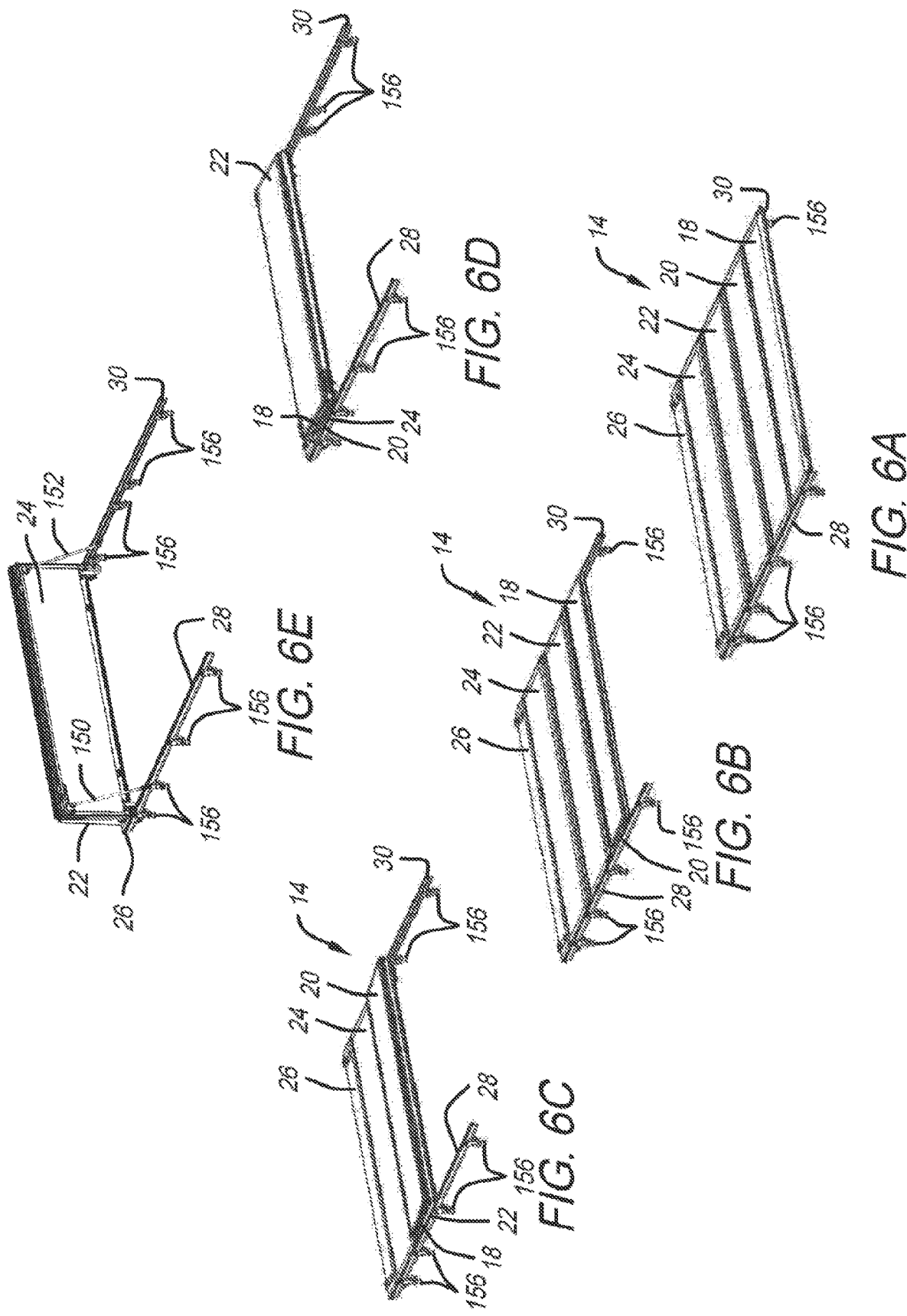
FIGS. 6A, 6B, 6C, 6D, and 6E are progression views of the tonneau cover assembly shown between fully closed and fully open positions.

Perspective, isolated, progression views showing tonneau cover 14 on rails 28 and 30, with the tonneau cover being moved from a full closed position to a full open position, is shown in FIGS. 6A, 6B, 6C, 6D, and 6E. The view shown in FIG. 6A depicts tonneau cover 14 in its full closed position on rails 28 and 30. Here, as with the view shown in FIG. 1, tonneau cover 14 completely shrouds interior 16 of truck bed 4. As such, cover sections 18, 20, 22, and 24 are unfolded and lay on rails 28 to 30. Bulkhead panel assembly 26 is shown at the forward end of tonneau cover 14 adjacent cover section 24.

The view shown in FIG. 6B is the same as that of FIG. 6A, but with cover section 18 stacked on cover section 22 to begin opening tonneau cover 14, similar to that shown in FIG. 2. The folding of tonneau cover 14 continues in FIG. 6C where now both cover sections 18 and 20 are stacked onto cover section 22. By progressing with this stacked arrangement, it is appreciated that more of interior 16 of truck bed 4 will be exposed as further shown in FIGS. 4 and 5.

Further, stacking all of cover sections 18, 20, and 22 onto cover section 24 is shown in FIG. 6D. Lastly, as shown in FIG. 6E, the stack of cover sections 18, 20, 22, and 24 are pivoted upright onto bulkhead panel assembly 26, which supports the stack in its upright position. Prop rods 150 and 152 attach to both cover section 24 and onto rails 28 and 30, respectively, to maintain the stack of cover sections in this upright position while the truck is moving. Further shown in this and the other views are clamps 156 on both rails 28 and 30. Clamps 156 are configured to attach rails 28 and 30 to their adjacent sidewalls 6 and 8, respectively.

Figure 7:
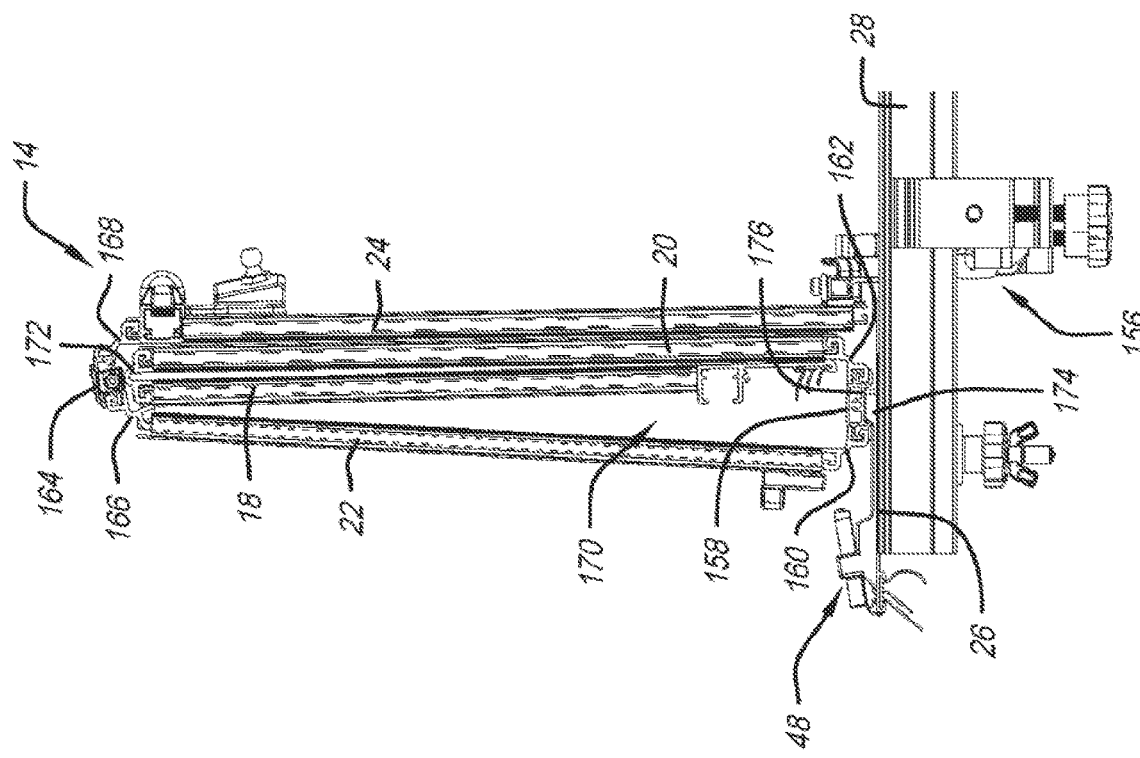
FIG. 7 is a side isolated detail view of the tonneau cover with the cover panel sections folded and stacked onto a bulkhead panel.

A side isolated detail view of tonneau cover 14, located on bulkhead panel assembly 26, which is attached to rail 28 (and 30, not shown in this view), is shown in FIG. 7. This view demonstrates how the stacked cover sections 18, 20, 22, and 24, of tonneau cover 14, being pivoted upright onto bulkhead panel assembly 26, can maintain its stability. In contrast to prior art designs that have fold-up cover sections so they all lie flat against each other to form a rectangular side profile when stacked upright, the stack configuration of tonneau cover 14 shown in FIG. 7 creates a triangularly-shaped side profile where the bottom or base of the stack is wider than at the top. As shown in this view, the upright stack of cover sections of tonneau cover 14 include a base intermediate panel 158, which is attached to cover sections 20 and 22, via flexible hinge members 160 and 162. Base intermediate panel 158 is the support structure for cover sections 18, 20, 22, and 24 when seated upright on bulkhead panel assembly 26. Opposite base intermediate panel 158 is narrow intermediate panel 164, which is connected to cover sections 22 and 24, via flexible hinge members 166 and 168, as shown. Because narrow intermediate panel 164 has a narrower width than base intermediate panel 158 (see, also, FIG. 8), stacked cover sections 18, 20, 22, and 24 form the triangularly-shaped side profile. Having a wider base at the bottom and a narrower panel at the top means the upright stack of tonneau cover 14 has a lower center of gravity and, thus, is more stable when setting on bulkhead panel assembly 26. To that end, a space 170 is formed between cover section 22 and cover section 18. Space 170, as shown, is itself wider at the bottom, adjacent base intermediate panel 158, and narrower at the top, adjacent narrow intermediate panel 164.

A flexible hinge 172 is shown pivotally connecting cover sections 18 and 20. Although not shown in this view, another such hinge (see hinge 182 in FIG. 11) pivotally attaches cover section 24 to bulkhead panel assembly 26 to allow the stacked cover sections to pivot upright onto bulkhead panel assembly 26. Also shown in this view is a buckle receiver 48. A positive placement tab 174 extends from buckle receiver 48 and is sized to fit into an illustrative channel 176 formed in base intermediate panel 158 as shown. It is appreciated that the buckle component of buckle receiver 48 is optional. Positive placement tab 174 may extend from another structure on bulkhead panel assembly 26, be integrally formed with, or manifest itself in any other variety of manners that extends to fit into channel 176 of base intermediate panel 158. As demonstrated, mating positive placement tab 174 with base intermediate panel 158 helps stabilize the stack of cover sections 18, 20, 22 and 24, when stacked and pivoted upright as shown in FIG. 7. This also creates a consistent placement on bulkhead panel assembly 26. It also helps keep the cover off of the exterior surface of bulkhead panel assembly 26 to prevent surface marring.

A side detail view of portions of tonneau cover 14 are shown in FIG. 8. This view depicts portions of cover sections 20, 22, and 24. Cover sections 20 and 22, as previously discussed with respect to the view of FIG. 7, are attached to base intermediate panel 158 via flexible hinge members 160 and 162. Similarly, narrow intermediate panel 164 is pivotally coupled to cover sections 22 and 24 via flexible hinge members 166 and 168. In order to obtain the triangularly-shaped side profile of stacked tonneau cover 14 shown in FIG. 7, width 178 of base intermediate panel 158 is wider than width 180 of narrow intermediate panel 164.

Figure 16:
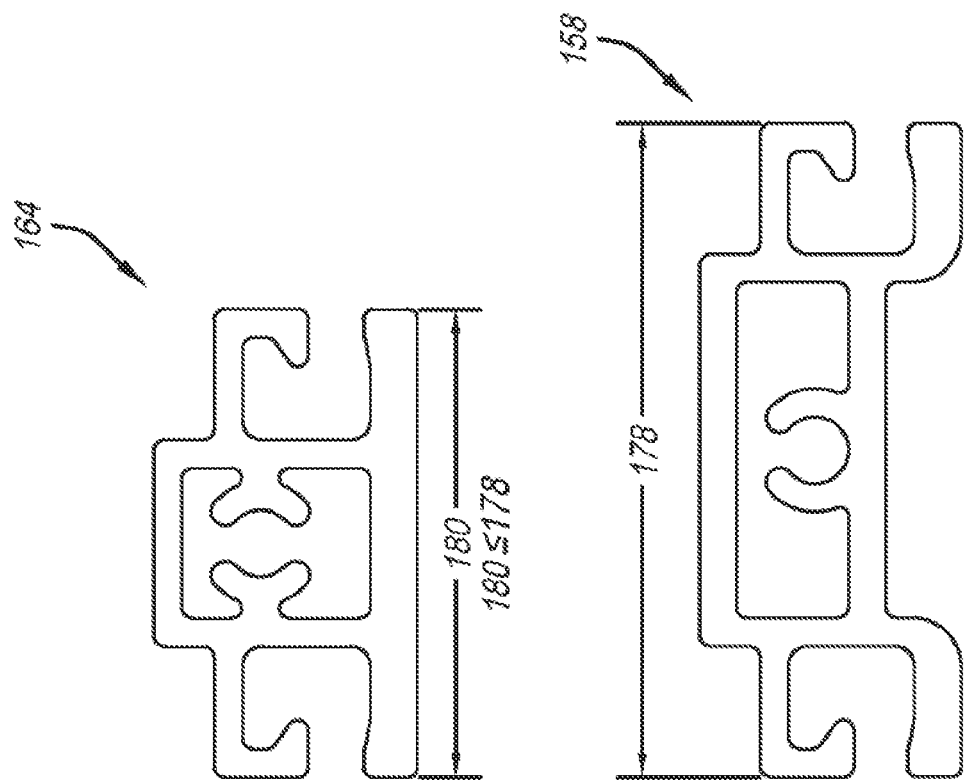
FIG. 16 shows comparative and views of a narrow intermediate panel and a base intermediate panel.

Comparative end views of narrow intermediate panel 164 and base intermediate panel 158 is shown in FIG. 16. Because width 178 is wider than width 180, base intermediate panel 158 can provide a stabilizing platform for the stacked upright cover sections 18, 20, 22, and 24. In an alternate illustrative embodiment, width 178 may be equal to width 180. It is further notable from this view that the wider width 178 of base intermediate panel 158 joins cover sections 20 and 22 located toward tailgate 10 of truck 2. In contrast, narrower width 180 of narrow intermediate panel 164, between cover sections 22 and 24, is located towards the cab section 12 of truck 2.

An underside perspective view of a portion of tonneau cover 14 is shown in FIG. 9. Bulkhead panel assembly 26 is depicted with its bulkhead seal 44 longitudinally extending the width of tonneau cover 14, and configured to engage space between the end of cover 14 and a front wall of truck bed 4, or the rear wall of cab section 12. In this illustrative embodiment, cover section 24 may include a latching assembly 32 similar to a latching assembly 32 on cover section 18 on the other side of tonneau cover 14.

Illustratively, a perimeter seal 132 extends along the sides of tonneau cover 14 is shown to prevent rainwater or other contaminants from seeping into truck bed 4 when tonneau cover 14 is laid flat as shown in FIG. 1. Extending longitudinally between cover sections 24 and 22 is narrow intermediate panel 164 bounded by flexible hinge members 166 and 168 as shown. Accordingly, narrow intermediate panel 164 is pivotable with respect to cover sections 22 and 24, and vice versa.

Moving further along tonneau cover 14 toward tailgate 10, base intermediate panel 158 is shown located between cover sections 20 and 22. Flexible hinge members 160 and 162 pivotally attach base intermediate panel 158 to cover section 22 and cover section 20, respectively. Again, it is appreciated from this view that the wider intermediate panel 13 base intermediate panel 158 having a width of 178—is located further toward the tailgate 10 end of tonneau cover 14 as compared to the narrower intermediate panel—narrow intermediate panel 164 having width 180—being closer to cab section 12 end, on tonneau cover 14. Flexible hinge member 172 is longitudinally extending and pivotally coupling cover section 18 to cover section 20. Lastly, a tailgate seal 184 is longitudinally extending along the width of cover section 18, illustratively adjacent latching assembly 32 as shown.

Figure 10:
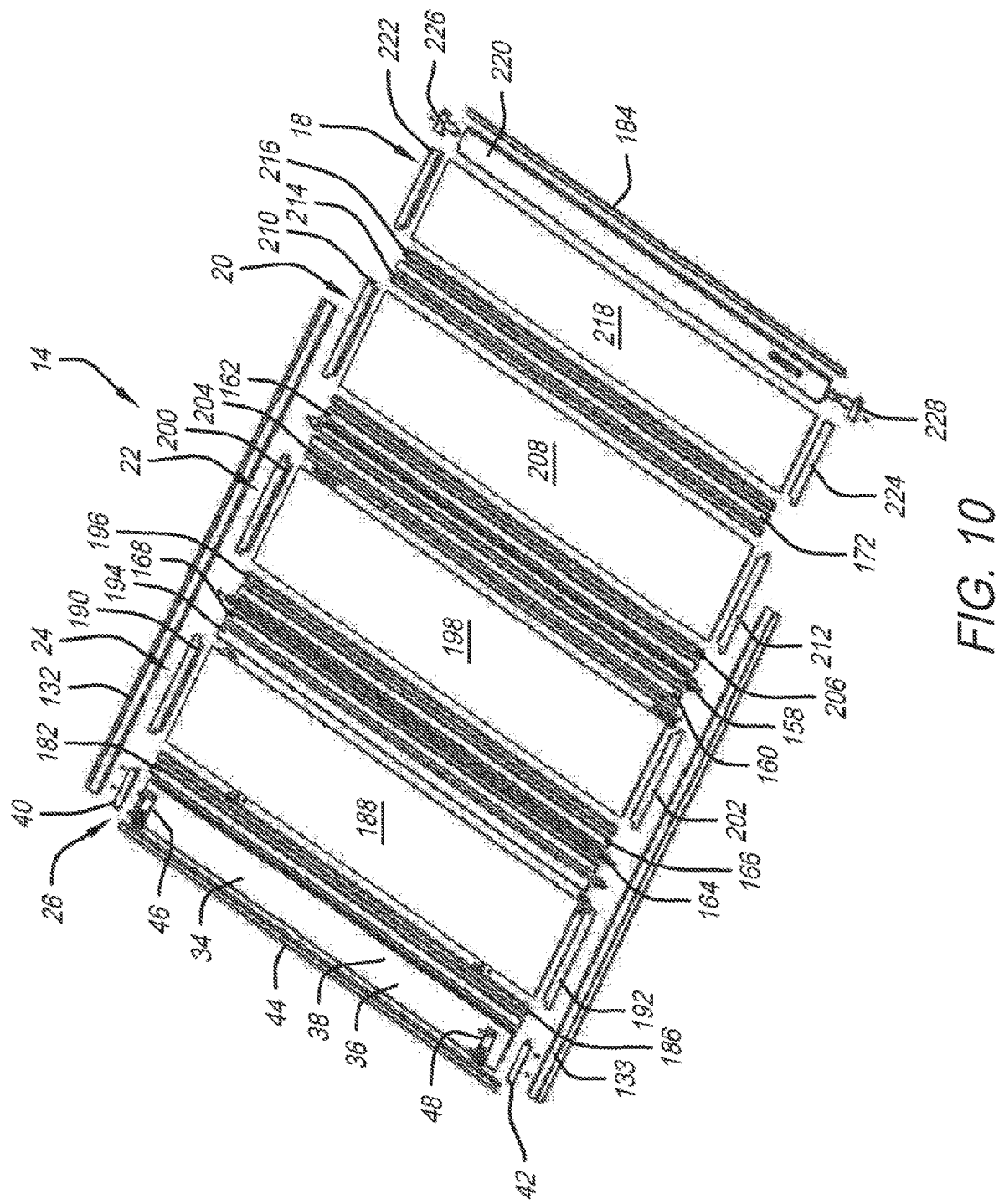
FIG. 10 is a perspective exploded view of the tonneau cover.
Figure 11:
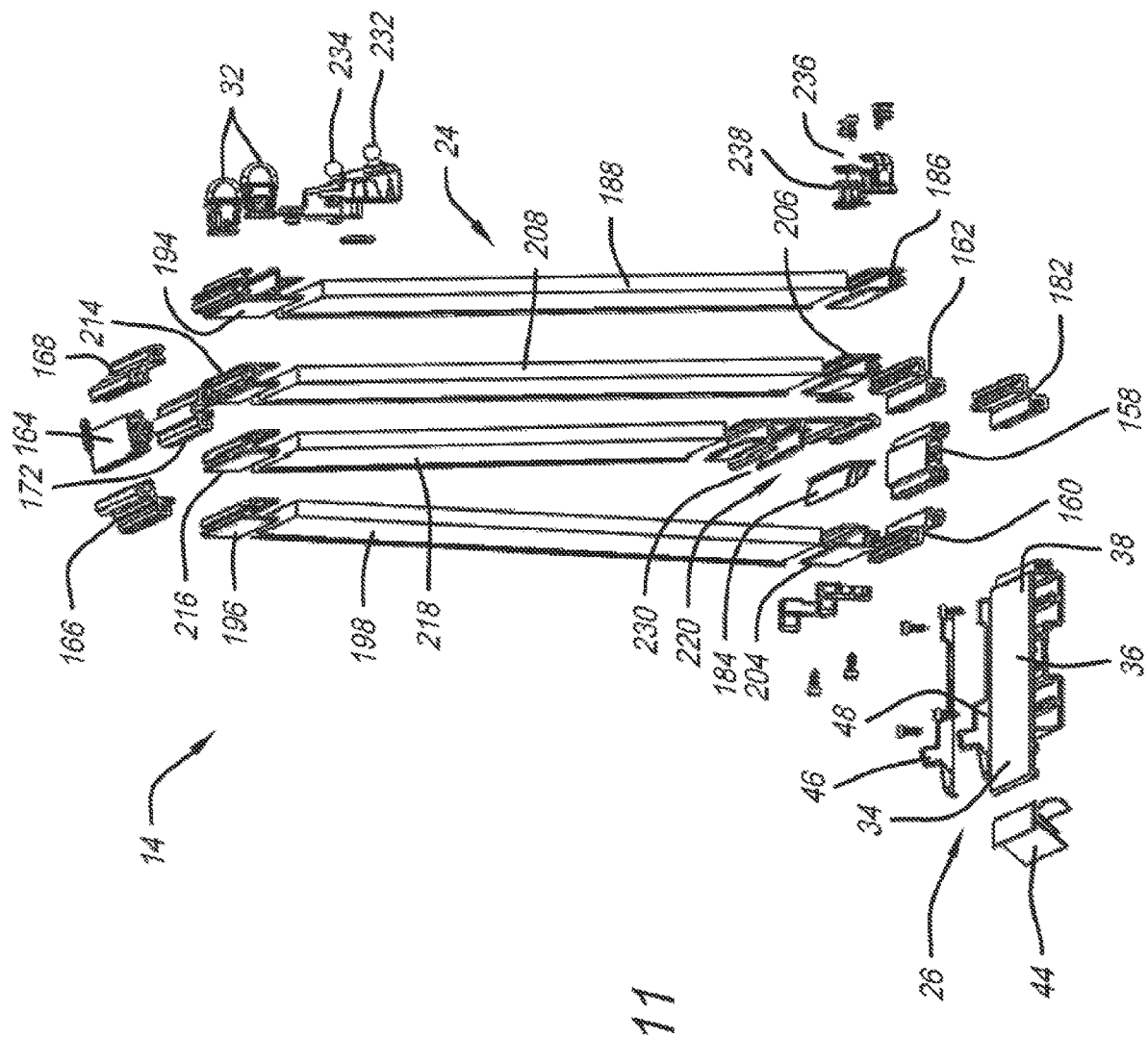
FIG. 11 is an exploded view of the tonneau cover in a folded, stacked, and upright position with respect to the bulkhead panel assembly.

Perspective exploded views of tonneau cover 14 are shown in both FIGS. 10 and 11. The view in FIG. 10 is tonneau cover 14 laid out in its flat covering position. In contrast, the view in FIG. 11 shows tonneau cover 14, albeit in exploded view, in its folded, stacked, and upright position, with respect to bulkhead panel assembly 26. As shown in both views, tonneau cover 14 includes bulkhead panel assembly 26, which includes a bulkhead seal 44, end caps 40 and 42, receivers 46 and 48, front frame 34, central panel 36, and hinge frame 38. Perimeter seals 132 and 133 bound the lateral sides of tonneau cover 14 as shown. Hinge member 182 pivotally couples cover section 24 to bulkhead panel assembly 26. Cover section 24 may illustratively include a frame member 186 that engages part of hinge number 182 and panel 188. It is appreciated that frame member 186, as well as the other frame members that are part of cover sections 18, 20, 22, 24 may be made from a cast, extruded, or bent-formed metal material such as aluminum. End caps 190 and 192, illustratively, bound the sides of panel 188.

Another frame member 194, engages both panel 188 of cover section 24 and flexible hinge member 168, together. Narrow intermediate panel 164 is pivotally coupled to both flexible hinge members 166 and 168. Another frame member 196 couples to both flexible hinge member 166 and panel 198, the latter being part of cover section 22. End caps 200 and 202 are shown bordering the side peripheries of panel 198 of cover section 22. Another frame member 204 engages both panel 198 and flexible hinge member 160. Based intermediate panel 158 is pivotally coupled to both flexible hinge members 160 and 162. Another frame member 206 couples to both flexible hinge member 162 and panel 208 as part of cover section 20. Like the other cover sections, end caps 210 and 212 bound the sides of panel 208 of cover section 20.

Bounding the opposite side of panel 208 from frame member 206 is frame member 214. Flexible hinge member 172 pivotally couples frame member 214 from cover section 20 to frame member 216 of cover section 18. A panel 218 is received in both frame member 216 and end frame panel 220. End caps 222 and 224 bound the peripheral sides of panel 218 of cover section 18, similar to the end caps of the other cover sections. End caps 226 and 228 can be attached to end frame panel 220 as shown, for example, in FIG. 10. Tailgate seal 184 may be longitudinally extending with end frame panel 220 attaching thereto, to provide a sealing function between tonneau cover 14 and tailgate 10 of truck 2.

In an illustrative embodiment, end frame panel 220 may include a channel 230 configured to receive a latching assembly 32 (see, also, FIG. 9). FIG. 11 also shows illustrative latch assemblies 32, which may be employed in both cover sections 18 and 24. Alternatively, other latching assemblies or catch assemblies may be employed as well. Also shown are prop rod mounts 232 and 234 which are attachable on cover section 24 and attachable to prop rods 150 and 152, respectively (see, also, FIG. 5). Clips 236 and 238 are shown and are also attachable to cover section 24. Clips 236 and 238 are configured to receive prop rods 150 and 152, respectfully, when same are not in use and are to be stored.

Figure 12:
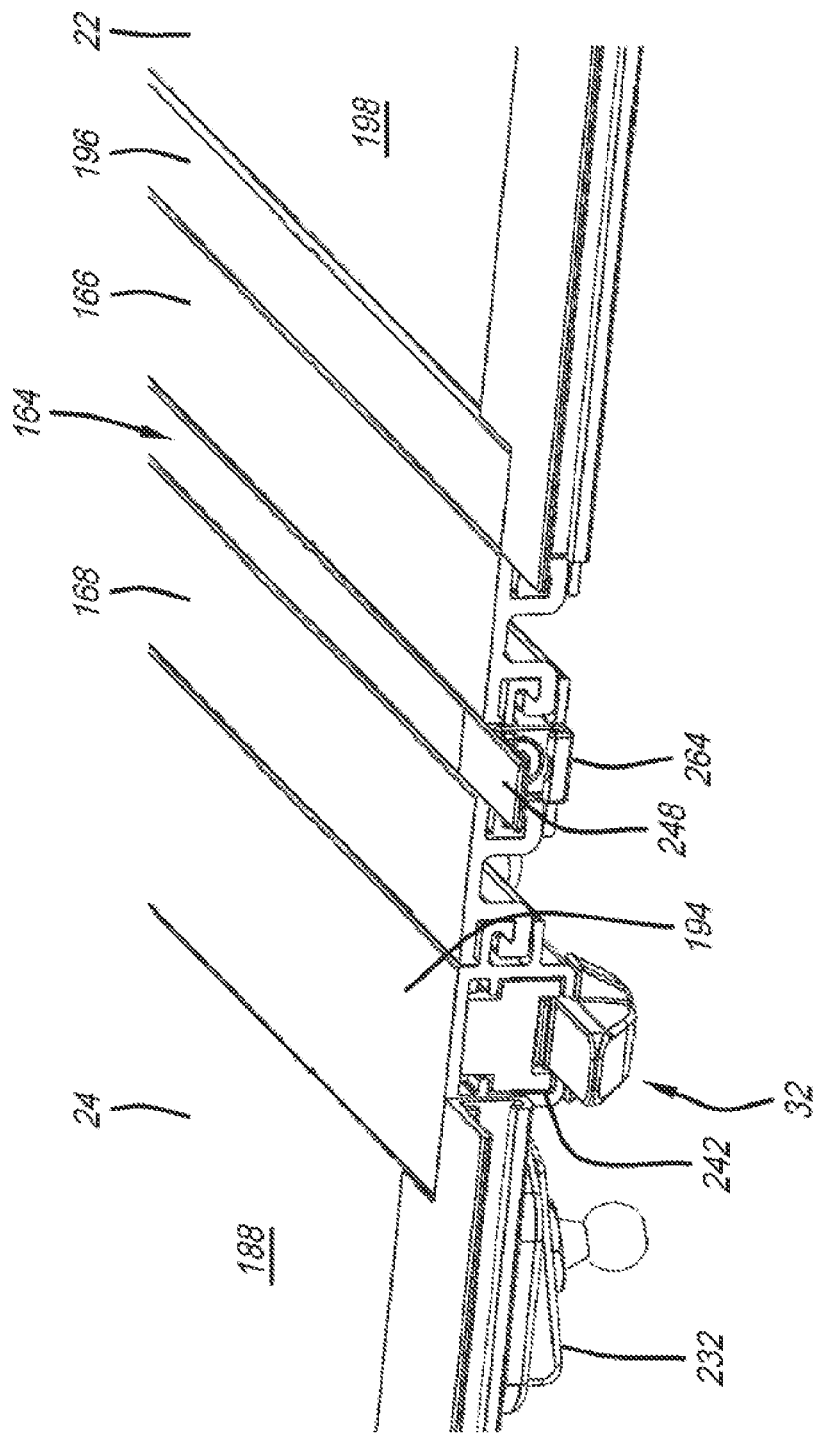
FIG. 12 is a perspective isolated detail view of a portion of the tonneau cover.
Figure 13:
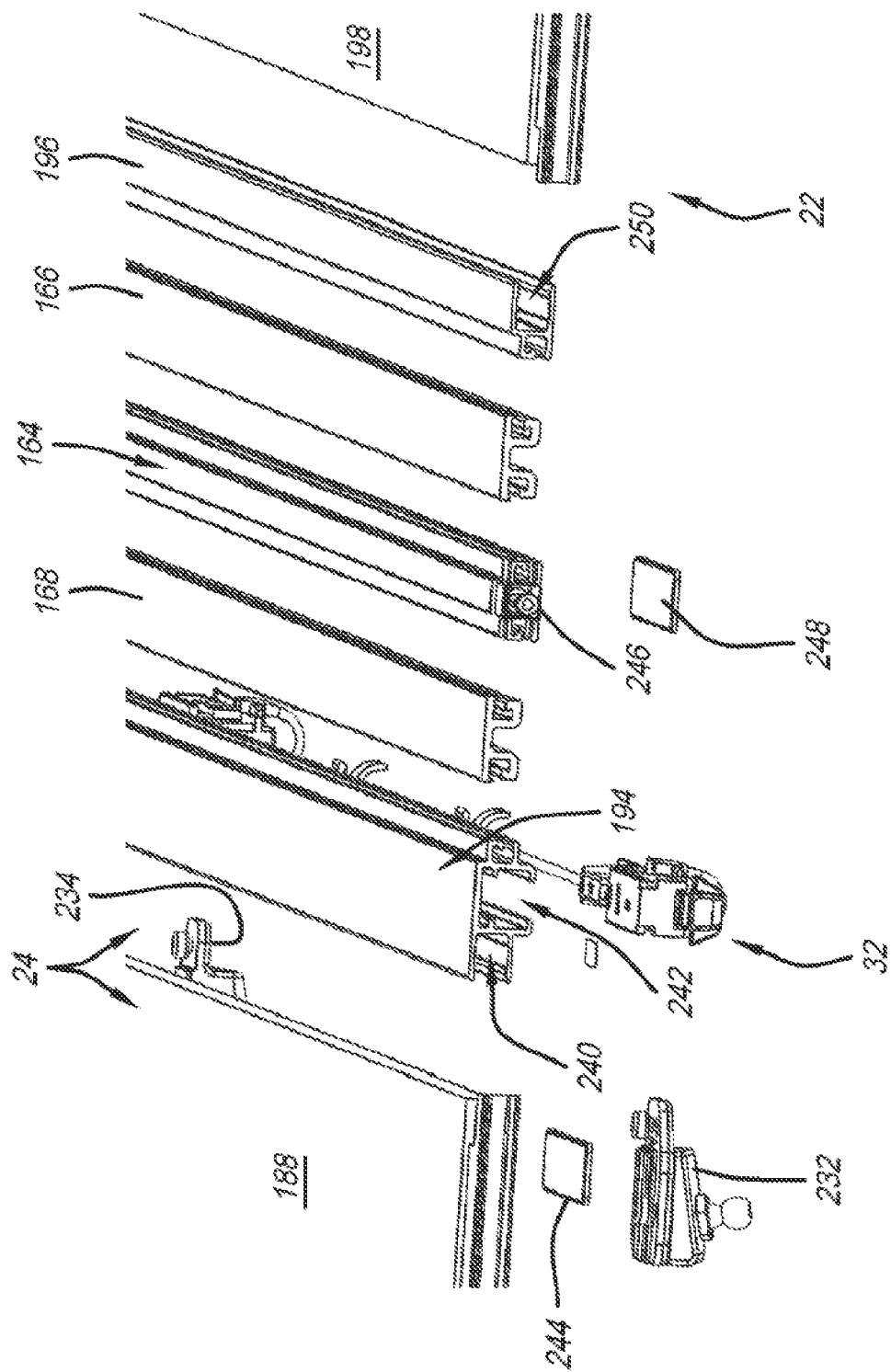
FIG. 13 is a perspective isolated detail exploded view of a portion of the tonneau cover.

Perspective isolated detail and detail exploded views of a portion of tonneau cover 14 are shown and FIGS. 12 and 13. This portion of tonneau cover 14 is shown in the section between cover sections 22 and 24. As shown, panel 188 fits into channel 240 of frame member 194. It is appreciated that the other frame members that bound cover sections 18, 20, and 22 employ similar channel configurations to fit their panels therein. Frame member 194 also includes a latch channel 242 configured and sized to receive latching assembly 32. Also shown is prop rod mounts 232 and 234. Fillers 244 and 248 fill any voids adjacent to the periphery of the cover, between end caps such as end caps 222 and 224, or at hinge areas, adjacent perimeter seals such as perimeter seal 132.

A flexible hinge member 168 is shown pivotally coupling cover section 24 to narrow intermediate panel 164. Additionally, it is appreciated that other means of coupling the cover sections to the hinges may be employed and are contemplated to be within the scope of the disclosure herein. Flexible hinge member 168 is shown located between frame member 194 and narrow intermediate panel 164. Frame member 196 also includes a channel 250 which, similar to channel 240 as previously discussed, receives panel 198 of cover section 22.

Another illustrative embodiment of the present disclosure includes a positive placement assembly that positions the folded, stacked, and pivoted cover sections 18, 20, 22, and 24 upright onto bulkhead panel assembly 26. Tonneau cover 14 has the ability to place the stacked cover sections consistently at the predetermined location on bulkhead panel assembly 26, which assists in keeping tonneau cover 14 stable when cover sections 18, 20, 22, and 24 are stacked in the upright position.

Figure 14:
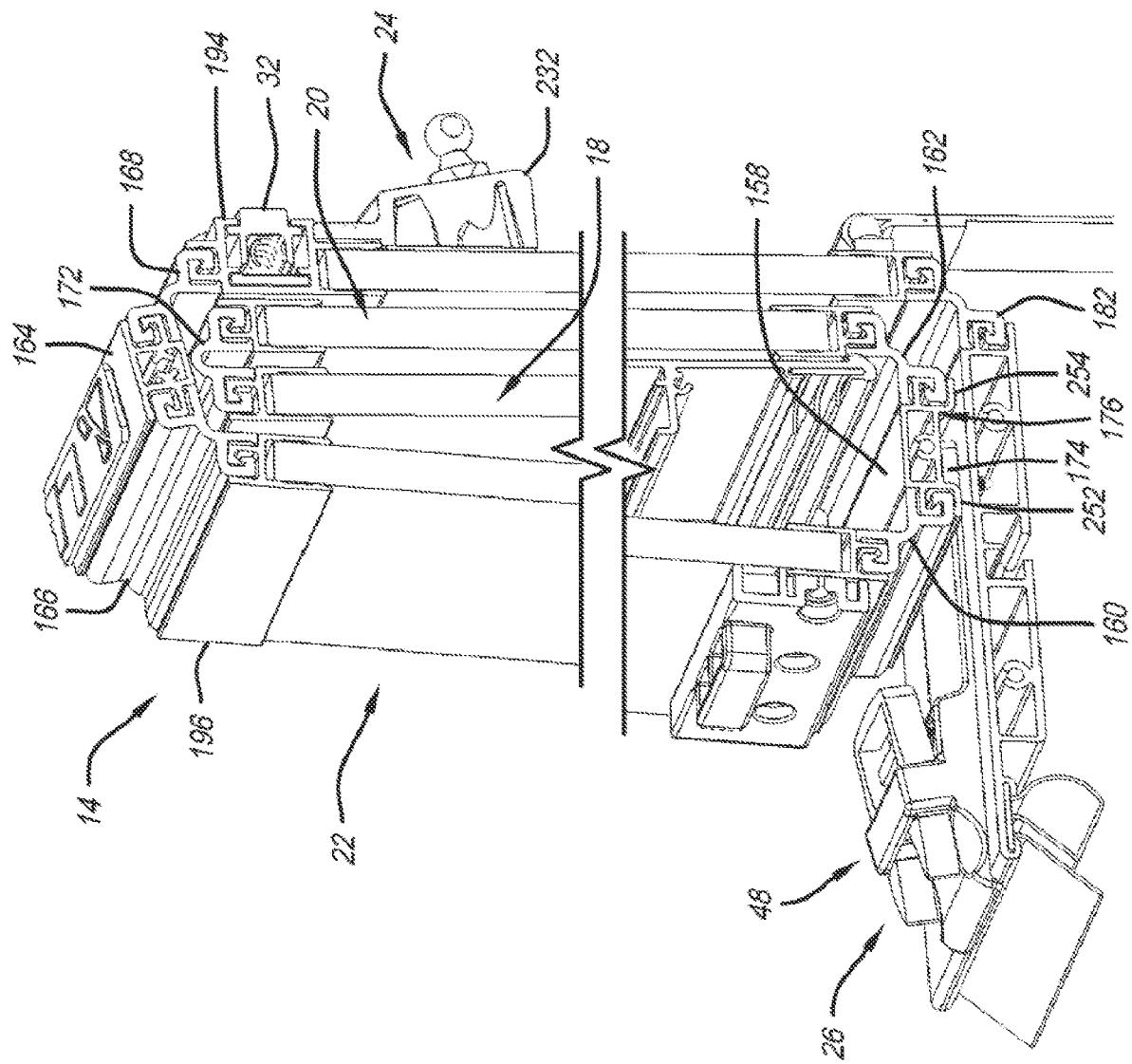
FIG. 14 is a perspective detail view of the tonneau cover in a folded, stack, and upright position on the bulkhead panel.
Figure 15:
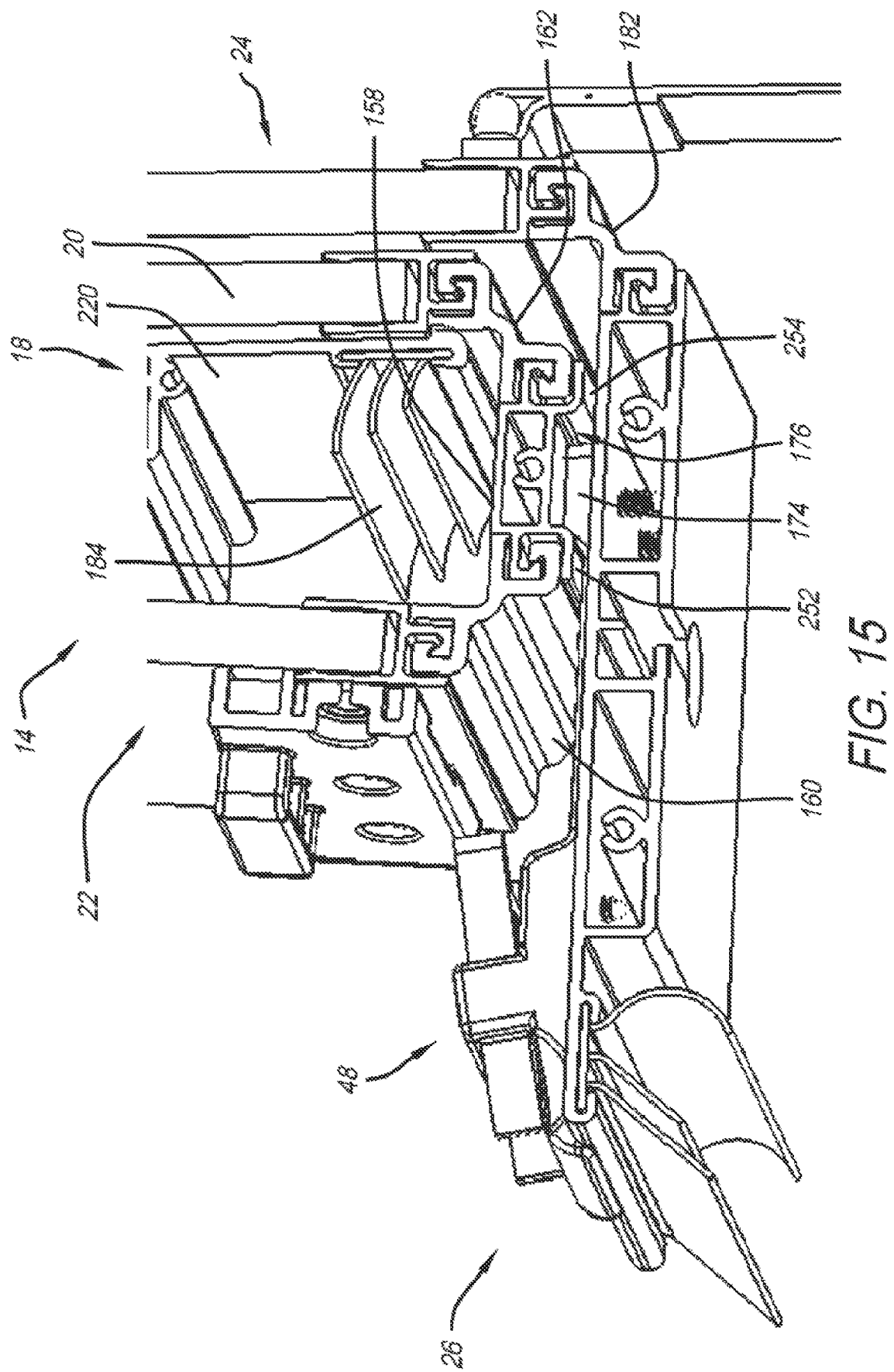
FIG. 15 is a perspective detail view of a portion of the tonneau cover folded, stacked, and positioned upright on the bulkhead panel.

Perspective and perspective detail views of tonneau cover 14 that includes features of a positive placement assembly are shown in FIGS. 14 and 15. Particularly, the features include a channel 176 longitudinally formed on one side of base intermediate panel 158 (see, also, FIG. 7). Base intermediate panel 158 is the lowermost panel of the stacked cover and is what supports the rest of the upright stacked cover sections 18, 20, 22, and 24. Base panel sections 252 into 254, located on each side of channel 176, support the stack on the top surface of bulkhead panel assembly 26. Additionally, positive placement tab 174, extending upward from bulkhead panel assembly 26, is fitted in channel 176 when cover sections 18, 20, 22, and 24 are stacked upright. In the illustrative embodiment, positive placement tab 174 extends from a buckle receiver 48 attached to bulkhead panel assembly 26. Positive placement tab 174 may also alternatively be a separate structure extending from bulkhead panel assembly 26 or attached to a different structure, yet still fit into channel 176 to help stabilize the stack of cover sections. Additionally, positive placement tab 174 may be a single tab, be multiple tabs, or a longitudinally extending tab along the width of bulkhead panel assembly 26 depending on the need of tonneau cover 14. Still, further, positive placement tab 174 may have additional features on it, such as detents, friction fit surface, fastening means, etc., to assist in further supporting cover sections 18, 20, 22, and 24 onto bulkhead panel assembly 26.

Bulkhead Panel Assembly

A further illustrative embodiment of the present disclosure provides a reinforced bulkhead panel for use as part of a tonneau cover. The reinforced bulkhead panel extends from one truck bed sidewall to the other truck bed sidewall behind the cab section. The bulkhead panel is secured to the sidewalls and is hingedly attached to the remaining portion of the tonneau cover so the tonneau cover is able to pivot with respect to the bulkhead panel. In addition, the reinforced bulkhead panel is configured to support the weight of the remaining tonneau cover so, when folded to its stowed position, it can be stored atop the reinforced bulkhead panel which supports the cover's weight. Prop rods, straps, and other securement devices may be employed to assist coupling the remaining portions of the tonneau cover onto the top of the reinforced bulkhead panel.

Another illustrative embodiment of the present disclosure provides a reinforced bulkhead panel coupled to rails and/or sidewalls of the truck bed and suspended therebetween. The reinforced bulkhead panel includes a central panel that is bounded by a front frame and a hinge frame from front to rear. The front frame is located adjacent the cab section of the pickup truck and includes a seal member that also spans between the sidewalls of the truck bed and extends to the cab section to form a seal between the cab section and the front frame. The hinge frame also spans between the sidewalls over the truck bed and is coupled to the central panel opposite the front frame. The hinge frame is configured to hingedly attach to the remainder of the tonneau cover.

Illustratively, the front frame, central panel, and hinge frame may all be made from a metal material. Further, illustratively, the front and hinge frames and the central panel may be made from aluminum. And still further illustratively, the front and hinge frames and central panel may be each made from an extruded aluminum material. The front and hinge frames and central panel may have a generally uniform cross-sectional shape along its longitudinal length.

Figure 17:
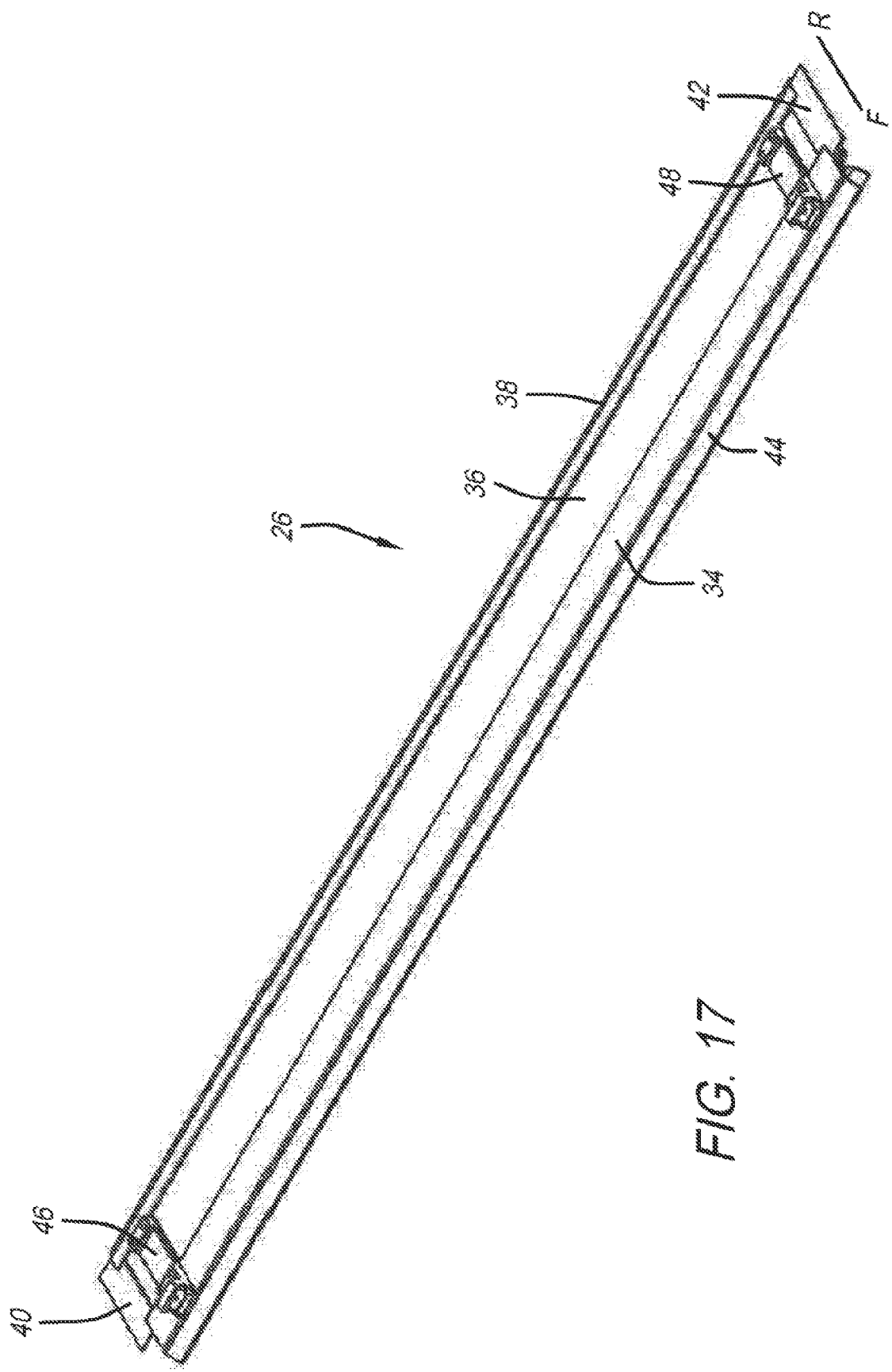
FIG. 17 is an isolated perspective view of a reinforced bulkhead panel assembly.

An isolated perspective view of reinforced bulkhead panel assembly 26 is shown in FIG. 17. This view depicts a central panel 36 bounded by front frame 34 and hinge frame 38. As shown, front frame 34 is located on what would be the front portion of tonneau cover 14, typically adjacent to the end of truck bed 4, adjacent cab section 12, and indicated by front F. Located opposite front frame 34, on central panel 36, and indicated by rear R is hinge frame 38. Cover section 24 is hingedly attached to hinge frame 38, via a hinge 130 (see, also, FIG. 20). Also, illustratively shown are end caps 40 and 42 that bound the sides of front frame 34, central panel 36, and hinge frame 38. A bulkhead seal 44 longitudinally extends about the length of front frame 34 to provide a sealing functioned between it and either the end of truck bed 4 or cab section 12. This illustrative embodiment of reinforced bulkhead panel assembly 26 shows optional buckle receivers 46 and 48. In some embodiments, buckle receivers 46 and 48 can be used to receive buckles attached to one or more cover sections to secure same to the reinforced bulkhead panel. This allows reinforced bulkhead panel assembly 26 to support the cover sections that may be seated on top of same.

Figure 18:
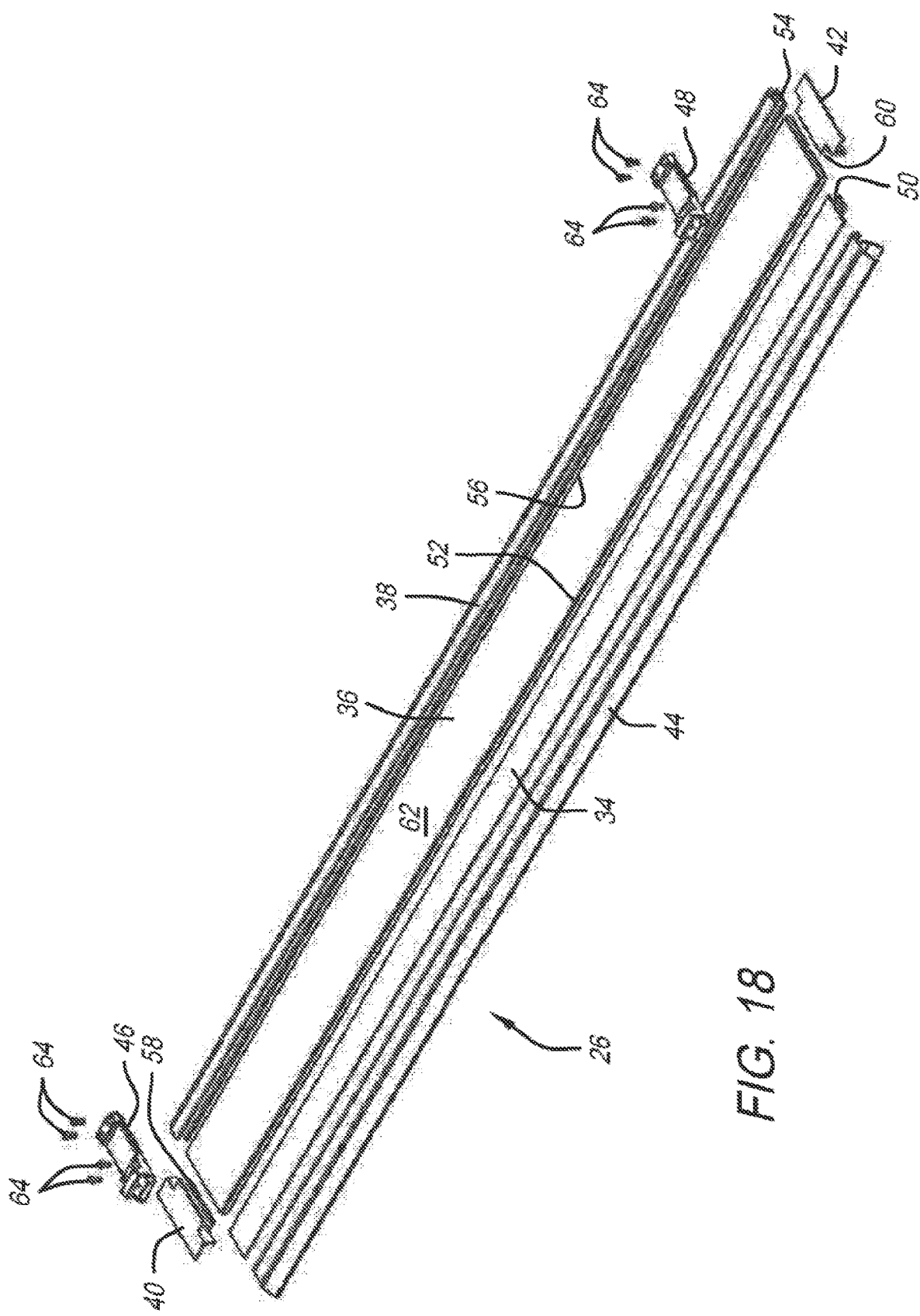
FIG. 18 is an exploded perspective view of the reinforced bulkhead panel assembly.

An exploded perspective view of reinforced bulkhead panel assembly 26 is shown in FIG. 18. This view depicts the individual components that form reinforced bulkhead panel assembly 26. Illustratively, front frame 34 includes a longitudinally extending channel 50 that fits over end 52 of central panel 36. Bulkhead seal 44, also longitudinally extending as shown, fits onto front frame 34 (see, also, FIG. 19). Hinge frame 38, as shown, also includes a longitudinally extending channel 54 (see, also, FIG. 19) that receives end 56 of central panel 36. Central panel 36, front frame 34, and hinge frame 38 may be extruded components such as extruded aluminum that, when combined, reinforce each other sufficient to support the weight of stacked cover sections 18, 20, 22, and 24. Each of endcaps 40 and 42 includes tabs 58 and 60, respectively, or other like structures configured to fit onto central panel 36. It is appreciated that tabs 58 and 60 may form a channel that receives and secures onto central panel 36. Such securement may be enhanced by employing fasteners, adhesive, or friction fit. Also shown are buckle receivers 46 and 48 which may, illustratively, be attached to top surface 62 of central panel 36 via fasteners 64.

Figure 19:
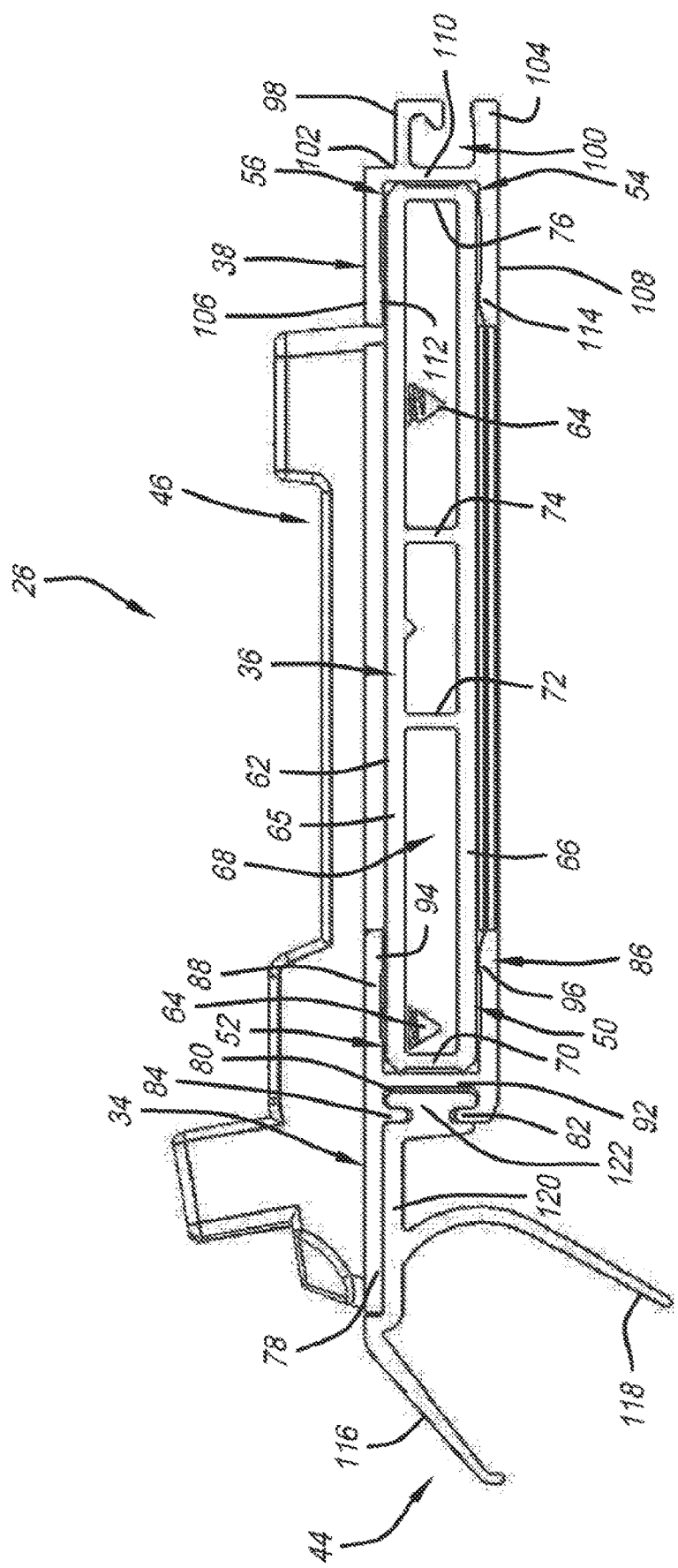
FIG. 19 is a side cross-sectional view of the reinforced bulkhead panel assembly.

A side cross-sectional view of reinforced bulkhead panel assembly 26 is shown in FIG. 19. Here, as shown, central panel 36, which is composed of a top panel member 65 and a lower panel member 66, is located opposite top panel member 65 with a space 68 located therebetween. To further assist separating top panel member 65 and lower panel member 66 are brace members 70, 72, 74, and 76. Brace member 70 is located at end 52 of central panel 36, whereas brace member 76 is located at end 56 of central panel 36. Therebetween are spaced apart brace members 72 and 74 extending between top panel member 65 and lower panel member 66 to form space 68 there between. Again, central panel 36 may illustratively be extruded to form this cross-sectional profile.

Further shown herein is front frame 34, which includes front flange 78 extending from central panel 36 to longitudinally extending channel 50. Underneath front flange 78 is a channel 80 that is furthered defined by tabs 82 and 84. It is appreciated that front flange 78, channel 80, and tabs 82 and 84 are longitudinally extending the length side-to-side of front frame 34. It is appreciated that front frame 34 may be extruded as well, separately from central panel 36. Longitudinally extending channel 50 is formed by flange members 86 and 88 via brace member 92. As shown herein, end 52 of central panel 36 fits into longitudinally extending channel 50. Illustrative longitudinally extending detents 94 and 96 provide adhesive pockets to secure front frame 34 to central panel 36. In other embodiments, detents 94 and 96 may be used as friction fit gripping surfaces.

At rear R of central panel 36 (see, also FIG. 17), at end 56, hinge frame 38 is shown to include a hinge channel 98. Space 100, which is longitudinally extending and formed by flange members 102 and 104, are longitudinally extending as well. Longitudinally extending channel 54 is shown formed by flange members 106 and 108, with brace member 110 extending therebetween. End 56 of central panel 36 is depicted fitted into longitudinally extending channel 54 in a similar manner to that of end 52 fitted in longitudinally extending channel 50 of front frame 34. Detents 112 and 114 are formed on the inside of flange members 106 and 108, respectively. This assists securing central panel 36 onto longitudinally extending channel 54.

Further shown herein is bulkhead seal 44. It includes a longitudinally extending first seal flange 116 that spans between the end of front flange 78 of front frame 34 and cab section 12 (or other structure depending on the make and model of the pickup truck) to provide a seal between the ends of tonneau cover 14 and truck bed 4. A secondary seal flange 118 is spaced apart from first seal flange 116 and is longitudinally extending the length of bulkhead seal 44. Secondary seal flange 118 may serve as a secondary flange. Both first and second seal flanges extend from a base seal member 120 located underneath front flange 78 as illustratively shown. Opposite first seal flange 116 is securement seal 122, which is sized and fitted into channel 80 of front frame 34. This secures bulkhead seal 44 to front frame 34. Also shown in this view is buckle receiver 46 located on top surface 62 and secured to central panel 36 via fasteners 64 as illustratively shown.

Figure 20:
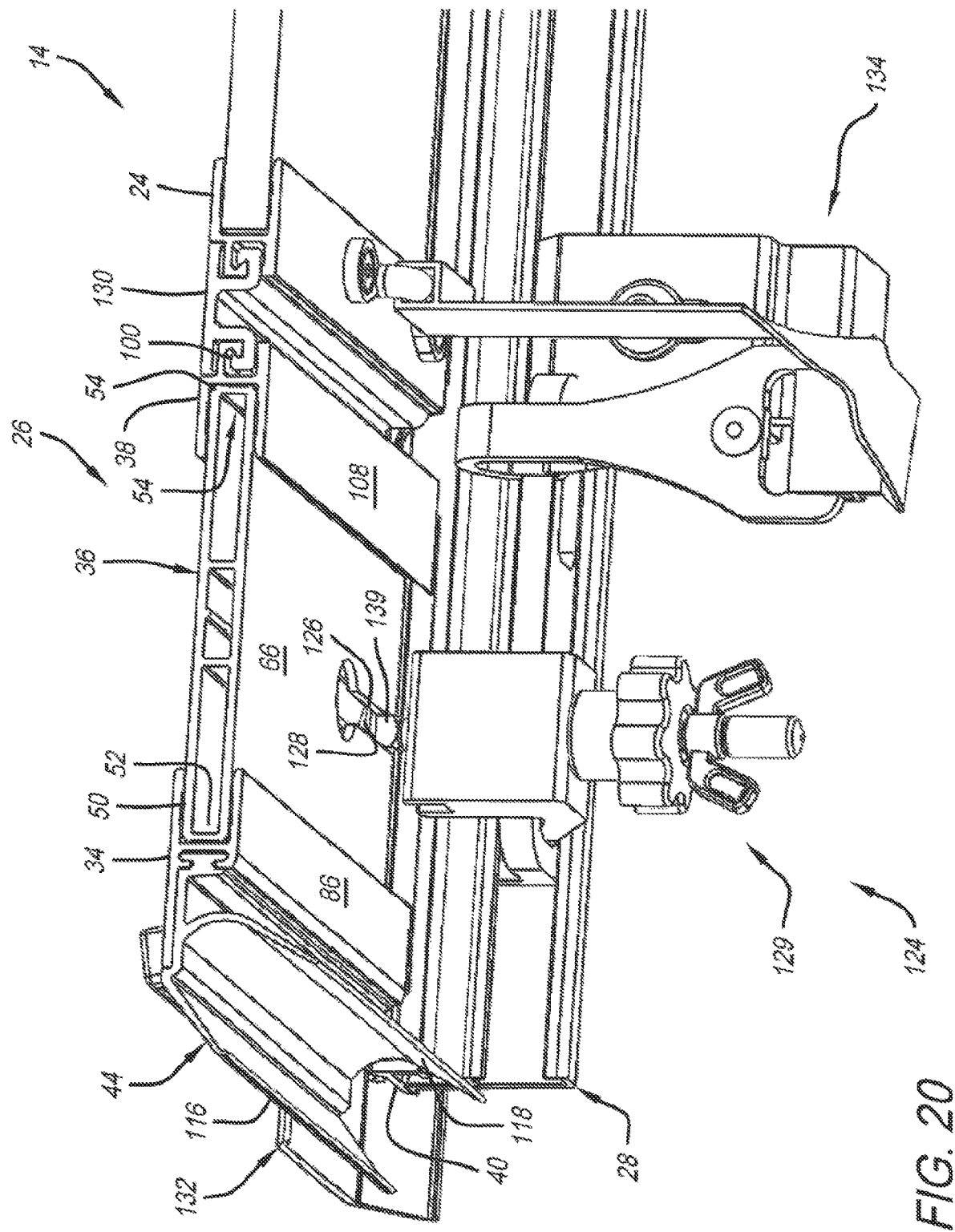
FIG. 20 is a perspective cross-sectional view of a portion of the tonneau cover.

A perspective cross-sectional view of tonneau cover 14, including reinforced bulkhead panel assembly 26 secured to rail 28, is shown in FIG. 20. In this view, a tie-down clamp assembly 124 is shown securing to central panel 36 and cover section 24. Tie-down clamp assembly 124 includes a tie-down block clamp assembly 129 and a tie-down tether 134. Further details of tie down clamp assembly 124, tie-down block clamp assembly 129, and tie-down tether 134 are described in U.S. patent application Ser. No. 16/593,049, entitled Tonneau Cover Tie-Down Assembly, filed Oct. 4, 2019, the disclosure of which is incorporated herein by reference in its entirety.

As shown on the underside of lower panel member 66 is a clamp slot 126 formed therein to receive an illustrative bolt head 128 or other like structure from tie-down block clamp assembly 129, to secure reinforced bulkhead panel 26 to rail 28. Although not shown herein, another clamp slot is formed in lower panel member 66 adjacent rail 30 so another tie down clamp assembly may attach the other side of reinforced bulkhead panel assembly 26 to rail 30. The skilled artisan upon reading the present disclosure will appreciate that this additional clamp slot located adjacent rail 30, in combination with the shown tie down clamp assembly 124, secures reinforced bulkhead panel assembly 26 to rail 28 and, thus, fixes reinforced bulkhead panel assembly 26 to sidewalls 6 and 8 of truck bed 4. This keeps reinforced bulkhead panel assembly 26 stationary with respect to sidewalls 6 and 8, as well as to cover sections 18, 20, 22, and 24 of the present tonneau cover 14, or to other tonneau cover designs that may be attached to reinforced bulkhead panel assembly 26. Also shown are flange members 86 and 108 of front frame 34 and hinge frame 38, respectively, supporting central panel 36.

This view further illustrates how front frame 34 longitudinally couples to central panel 36 via end 52 fitted into longitudinally extending channel 50. Also, bulkhead seal 44, with first seal flange 116 and secondary seal flange 118, also longitudinally extends the length of reinforced bulkhead panel assembly 26. Similarly, end 56 of central panel 36 is shown fitted into longitudinally extending channel 54 of hinge frame 38 along the longitudinal length of bulkhead panel assembly 26. A hinge 130 may be fitted into space 100 of hinge frame 38 to connect same to cover section 24. This allows cover section 24 to be pivotally coupled to reinforced bulkhead panel assembly 26.

Further shown in this view is an illustrative perimeter seal 132, which fits over reinforced bulkhead panel assembly 26 and rail 28. This view also shows end cap 40 illustratively positioned over rail 28.

Figure 21:
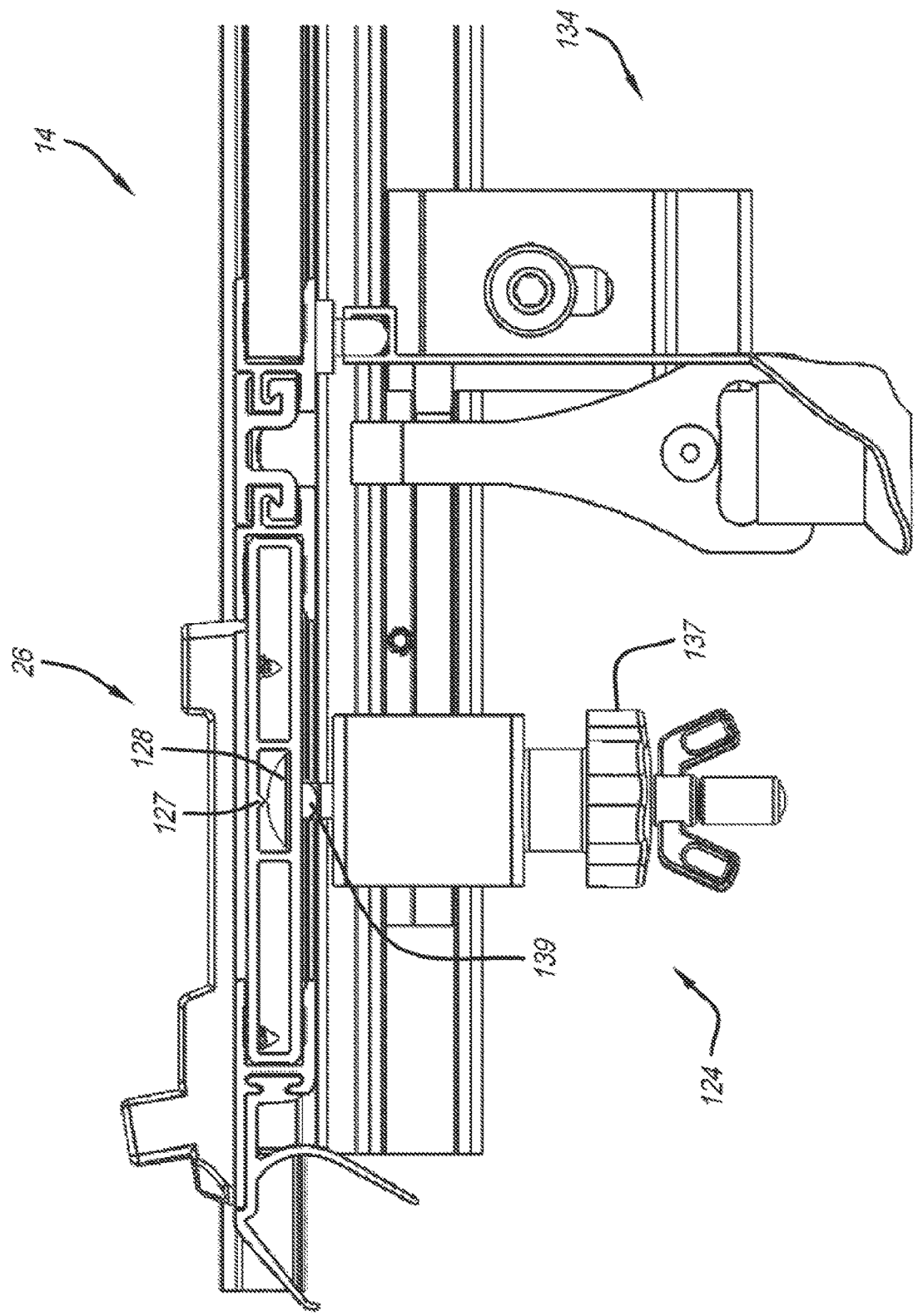
FIG. 21 is a side cross-sectional view of a portion of the tonneau cover.

A side cross-sectional view of a portion of tonneau cover 14 is shown in FIG. 21. This view depicts, among other features, a depending tab 127 that prevents bolt head 128 from moving upwardly and disengaging the carriage bolt's square shaft 139 from clamp slot 126. Tab 127 help keep bolt head 128 from rotating as the flower nut 137 is tightened. Further disclosure of tie-down tether 134 and associated components may be found in the Tonneau Cover Tie-Down Assembly Patent Application previously incorporated herein by reference.

Panel Section Hinge Seals

Another illustrative embodiment of the present disclosure focuses on an aspect of water management with regard to the hinge portions of the tonneau cover. Because tonneau covers spend the majority of their time in an outside environment, there is an expectation that water, particularly rainwater or other precipitation, will contact the tonneau cover. To that end, the water is to be kept out of the truck bed when the tonneau cover is shrouding the truck bed. This makes water management a consideration.

Accordingly, an aspect of this water management of the present disclosure is with regard to the connection between a flexible hinge member and a connecting cover section of the tonneau cover. In this case, the flexible hinge member connects to a cover section, and particularly, a formed or extruded metal frame member portion of the cover section. The flexible hinge member may be made from a rubber or flexible resilient polymer material. Because of the contrast in materials, such as extruded aluminum and resilient polymer, a seam between the two materials may exist that can form a gap therebetween. Such a gap can be especially prominent when the flexible hinge member is bent as adjacent cover sections are being folded. This gap may create a pathway between the exterior of the tonneau cover and the interior of the truck bed. A pathway makes it easy for rainwater or other precipitation to migrate through the gap from outside to inside the truck bed. This is the case even when the tonneau cover is not folded but lying flat covering the truck bed. This is because, despite the inherent memory of the resilient flexible hinge member, that memory may not be enough to eliminate any gap or spacing between the flexible hinge member and the cover section.

An illustrative embodiment of the present disclosure provides a sealing strip that is located at the juncture between the flexible hinge member and the cover section. This sealing strip has a length, width, and thickness sufficient to fill in any gap formed at the seam between the cover section and the flexible hinge member. In a further illustrative embodiment, the sealing strip contact surfaces engaging the cover section and flexible hinge member may include an adhesive to provide securement between the sealing strip and the cover section, as well as the sealing strip and the flexible hinge member. The adhesive serves a dual role of preventing gaps between the cover section and hinge member, and assists in securing the two structures together.

Figure 22:
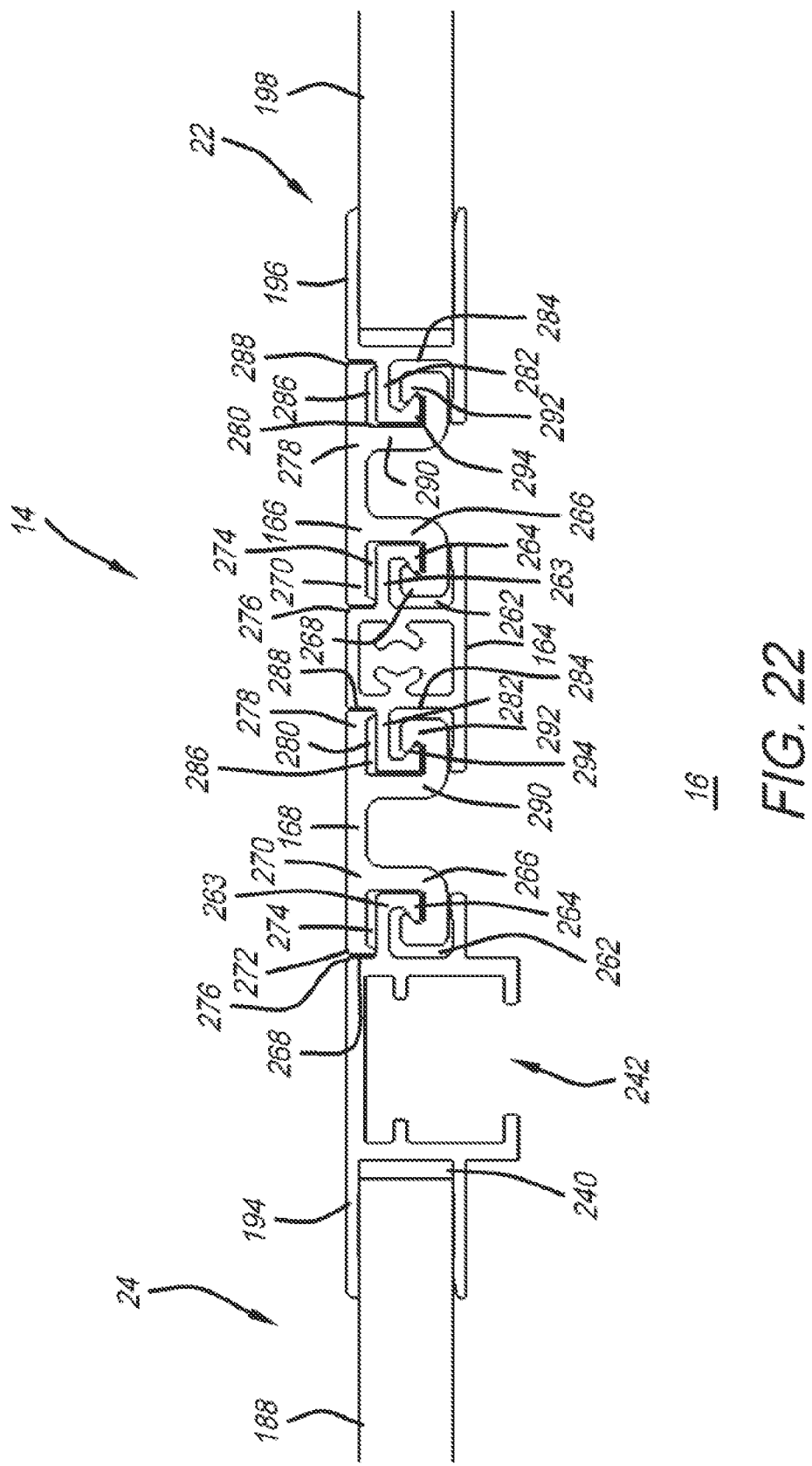
FIG. 22 is a side detail view of a portion of the tonneau cover.

A side detail view of a portion of tonneau cover 14 is shown in FIG. 22. Cover section 24 is depicted pivotally coupled to cover section 22 via flexible hinge members 166 and 168 with narrow intermediate panel 164 located therebetween. Panel 188 of cover section 24 is fitted into channel 240 of frame member 194. Latch channel 242 is shown located adjacent channel 240 and configured to receive latching assembly 32 (see, also, FIG. 2). Illustratively, extending from latch channel 242 opposite channel 240 is arm 263 of hinge clasp channel structure 262. A grip flange 264 extends from arm 263 and is oriented inwardly toward hinge clasp channel structure 262 such as illustratively shown. Flexible hinge member 168 includes a corresponding wrap-around arm 266 with a likewise corresponding grip flange 268 that engages grip flange 264 of hinge clasp channel structure 262 as illustratively shown.

An arm 270 of flexible hinge member 168 includes a longitudinally extending seal channel 272 that faces arm 263 bounding hinge clasp channel structure 262. Sealing strip 274 fits into seal channel 272 between arm 270 of flexible hinge member 168 and arm 263 of hinge clasp channel structure 262. Sealing strip 274 may be made from foam, rubber, acrylic adhesive, urethane adhesive, epoxy adhesive, pressure sensitive tapes and the like, that creates a barrier by filling the space between arms 263 and 270. In this way, water that may be present at the exterior of tonneau cover 14 cannot pass through same at seam 276. Sealing strip 274 serves as a barrier to prevent any such migration. Additionally, sealing strip 274 may include an adhesive the abutment between itself and arm 263 and at arm 270. This provides a secure attachment between flexible hinge member 168 and frame member 194 (and, thus, cover section 24).

Extending in an opposite direction, flexible hinge member 168 includes another arm 278 with a seal channel 280 that faces arm 282, of a hinge clasp channel structure 284 on narrow intermediate panel 164. On the side of flexible hinge member 168, another sealing strip 286 is located in seal channel 280 abutting both arms 278 and 282 to create a barrier at seam 288 in similar form to that identified with respect to sealing strip 274. Additionally, flexible hinge member 168 includes wraparound arm 290 extending therefrom and a grip flange 292 which engages grip flange 294 that extends from arm 282. Also similar to sealing strip 274, sealing strip 286 may include adhesive at the abutment between itself and arm 278 and at arm 282. This creates a securement between flexible hinge member 168 and narrow intermediate panel 164. And again, this prevents water that may be exterior to tonneau cover 14 from migrating through same at seam 288 in order to get to interior 16 of truck bed 4. Accordingly, despite cover section 24 being pivotable with respect to narrow intermediate panel 164, water is prevented from entering the interior 16 of truck bed 4 at this juncture.

These same structures may exist for flexible hinge member 166. An arm 270 includes a longitudinally extending seal channel 272 that faces arm 263 bounding hinge clasp channel structure 262. Sealing strip 274 fits into seal channel 272 between arm 270 of flexible hinge member 166 and arm 263 of hinge clasp channel structure 262. Sealing strip 274 serves as a barrier to prevent any such migration. Sealing strip 274 may also include an adhesive at the abutment between itself and arm 263 and at arm 270 to provide a secure attachment between flexible hinge member 168 and frame member 194.

Extending in the opposite direction, flexible hinge member 166, like flexible hinge member 168, includes another arm 278. Seal channel 280 of arm 278 faces arm 282 of a hinge clasp channel structure 284 on narrow intermediate panel 164. On the side of flexible hinge member 166, another sealing strip 286 is located in seal channel 280, abutting both arms 278 and 282, to create a barrier at seam 288. Additionally, flexible hinge member 166 includes wraparound arm 290 extending therefrom and including grip flange 292 which engages grip flange 294 that extends from arm 282. Sealing strip 286 may include adhesive at the abutment between itself and arm 278 and at arm 282. This creates a securement between flexible hinge member 166 and frame member 196 of cover section 22. And again, this prevents water that may be on exterior tonneau cover 14 from migrating through same at seam 288 in order to get to the interior of truck bed 4. Thus, water is prevented from entering the interior 16 of truck bed 4 at cover section 22.

Figure 23:
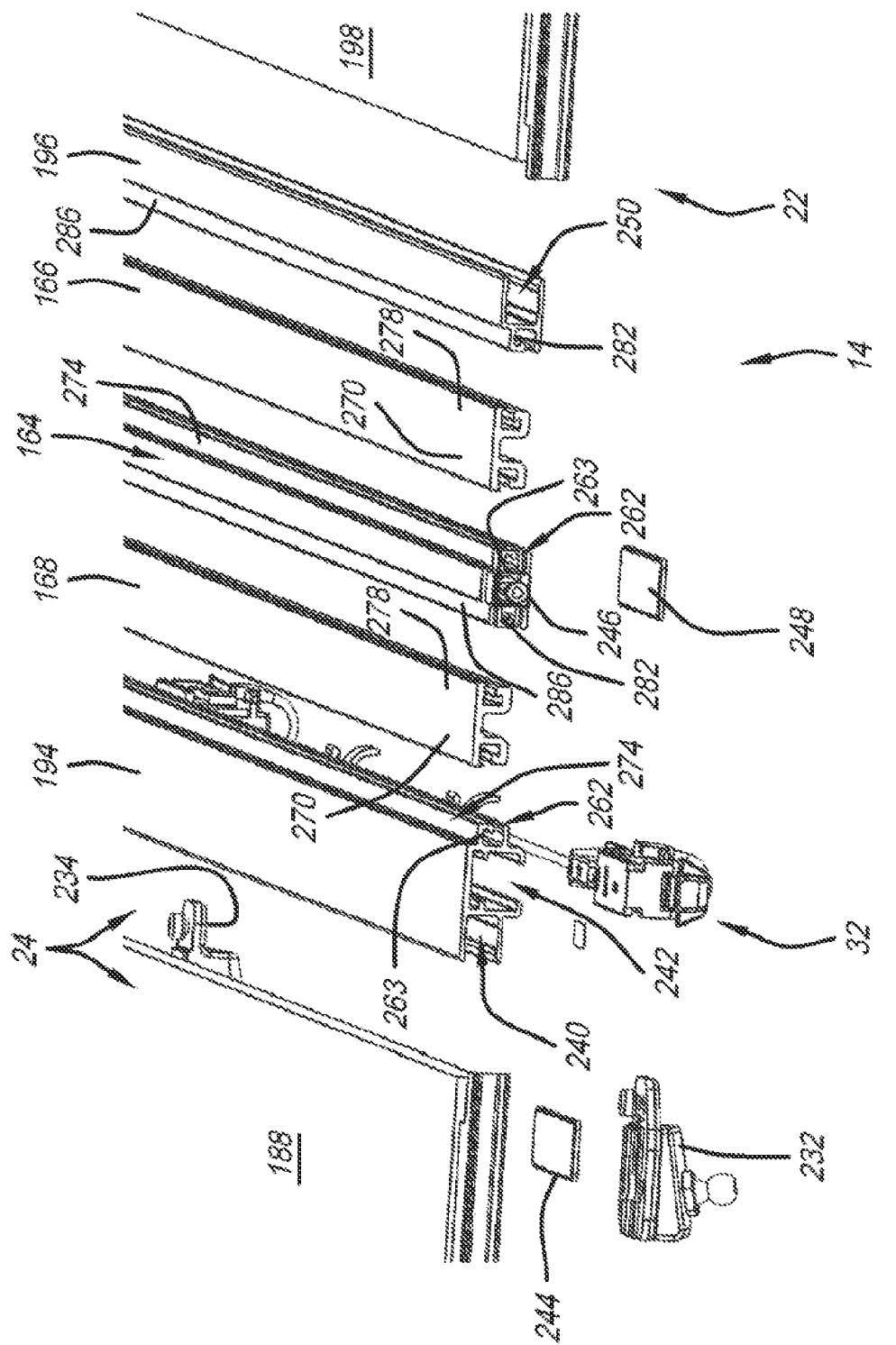
FIG. 23 is a perspective isolated detail exploded view of a portion of the tonneau cover.

A perspective isolated detail exploded view of a portion of tonneau cover 14 (similar to FIG. 13) is shown in FIG. 23. This portion of tonneau cover 14 includes cover sections 22 and 24. As shown, panel 188 fits into channel 240 of frame member 194. It is appreciated that the other frame members that bound cover sections 18, 20, and 22 employ similar channel configurations to fit their panels in respective frame members. Frame member 194 also includes a latch channel 242 configured in size to receive latching assembly 32. Also shown is prop rods mounts 232 and 234. Fillers 244 and 248 fill any voids adjacent the periphery of the cover, between end caps such as end caps 222 and 224, or at hinge areas, adjacent perimeter seals such as perimeter seal 132. Flexible hinge member 168 is shown located between frame member 194 and narrow intermediate panel 164.

Located on the longitudinal extent of arm 263 of hinge clasp channel structure 262 is sealing strip 274. Sealing strip 274 extends along any width of tonneau cover 14 to seal seam 276 (see FIG. 22) between frame member 194 and flexible hinge member 168. Because arm 270 of flexible hinge member 168 extends and is fitted over sealing strip 274, which itself is shown attached to arm 263 of hinge clasp channel structure 262, a seal is created between frame member 194, and flexible hinge member 168. Opposite frame member 194 is narrow intermediate panel 164 with sealing strip 286 located on arm 282. As on frame member 194, sealing strip 286 may extend the longitudinal length of arm 282 in order to provide a barrier between arm 278 of flexible hinge member 168 and narrow intermediate panel 164.

This view also depicts the longitudinally-extending character of components of cover section 22. Particularly, shown herein are portions of the longitudinally extent of panel 198, and frame member 196. Flexible hinge member 166 flexibly connects narrow intermediate panel 164 to frame member 196. Further shown is the longitudinal extent of arm 263 on narrow intermediate panel 164 along with hinge clasp channel structure 262 and sealing strip 274. Arm 270 of flexible hinge member 166 extends and is to be fitted over sealing strip 274. A seal is created between narrow intermediate panel 164 and flexible hinge member 166. Opposite narrow intermediate panel 164 is narrow frame member 196 with sealing strip 286 located on arm 282.

Figure 24:
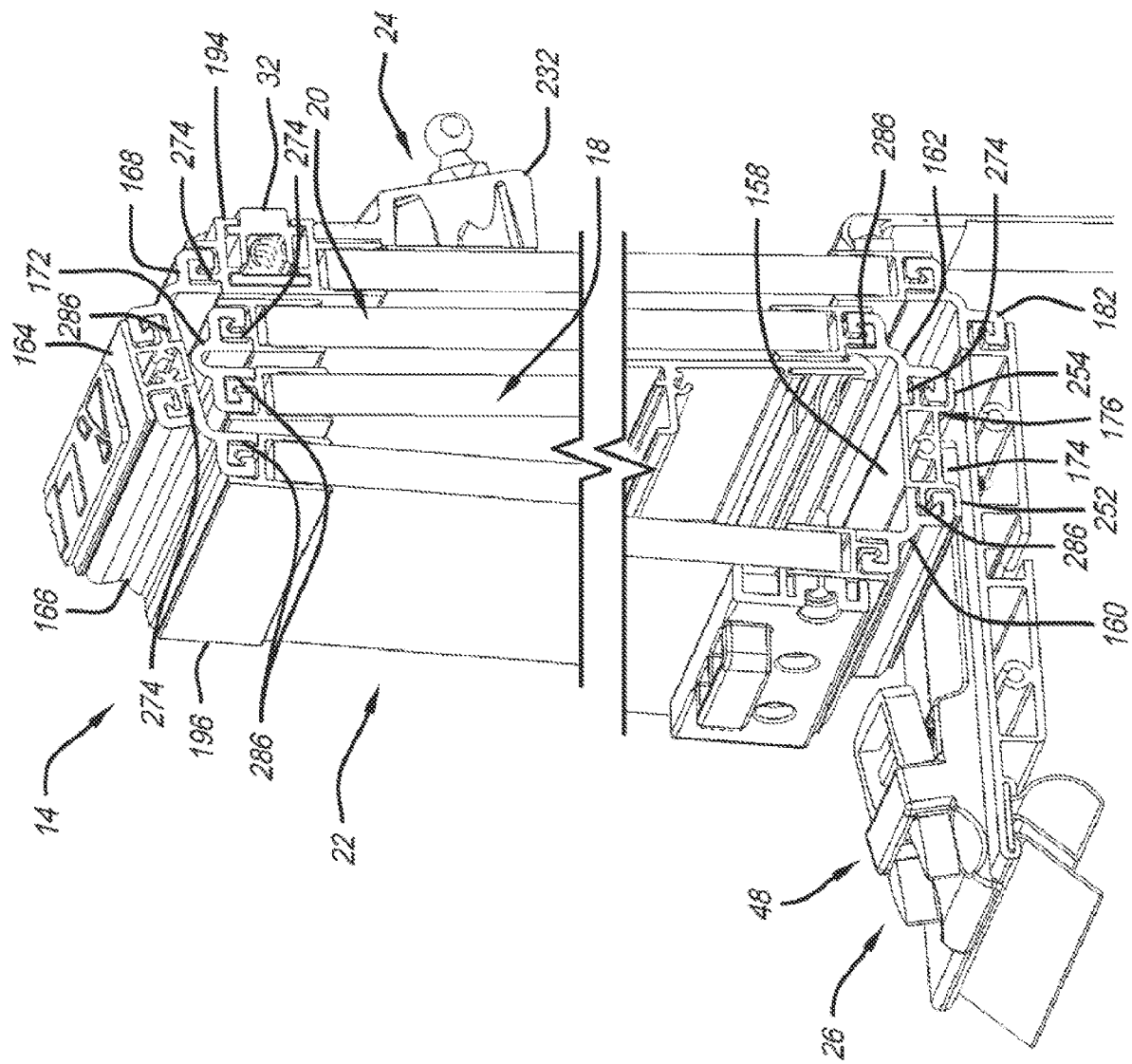
FIG. 24 is a side detail view of a portion of the tonneau cover.

A side detail view of portions of tonneau cover 14 (similar to FIG. 14) are shown in FIG. 24. This view depicts portions of cover sections 20, 22, and 24. Cover sections 20 and 22 are attached to base intermediate panel 158 via flexible hinge members 160 and 162. Similarly, narrow intermediate panel 164 is pivotally coupled to cover sections 22 and 24 via flexible hinge members 166 and 168. It is further notable from this view that the wider width of base intermediate panel 158 joins cover sections 20 and 22 located toward tailgate 10 of truck 2. In contrast, the narrower width of narrow intermediate panel 164, between cover sections 22 and 24, is located towards the cab section 12 of truck 2 when tonneau cover 14 is unfolded and laid flat on truck bed 4.

This view further depicts how the sealing strips fit at all of the junctures between the panels and hinges. For example, sealing strips 286, and 274 are located on flexible hinge member 172 located between cover sections 18 and 20. Sealing strips 286 and 274 are located on flexible hinge member 162 and between cover section 20 and base intermediate panel 158. Sealing strips 286 and 274 are located on flexible hinge member 160 located between base intermediate panel 158 and cover section 22. Sealing strips 286 and 274 are located on flexible hinge member 166 located between cover section 22 and narrow intermediate panel 164 (see, also, FIG. 23). Sealing strips 286 and 274 are, lastly, located on flexible hinge member 168 located between narrow intermediate panel 164 and cover section 24 (see, also, FIGS. 22 and 23).

Cover Panel Section Handle

Folding the cover sections to their stacked stored position is generally not a difficult task. Each cover section, starting at the tailgate end, is simply lifted and folded onto the next adjacent panel until they are all folded up near the cab section of the pickup truck. Conversely, unfolding most of the cover sections back to the tonneau cover's laid flat position shrouding the truck bed is largely conventional as well. The cover sections are simply unfolded in an opposite direction of how they were originally folded.

Illustratively, with the type of cover disclosed herein, space exists between at least some of the sections when folded. Being able to grab the cover sections to unfold same is, therefore, not a particularly challenging task—except for one of the cover sections. The last cover section of the tonneau cover that shrouds the bed section, adjacent the tailgate end, is folded flat up against the top surface of the adjacent cover section. There is no appreciable space between the cover sections. In addition, there are no features that one could grasp to unfold the last cover section over the truck bed, thus, posing a challenge unfolding this last cover section.

According to the illustrative embodiment, a cover section handle may be affixed to the underside of the cover section to provide a grasping structure for an operator to grip and move the cover to its unfolded shrouding position over the truck bed. In an embodiment, the cover section handle may be located on the underside of the cover section distal from the cover section's hinge. This allows the operator to create a moment of force on the hinge by lifting on the cover section handle to pivot the cover section over.

In addition, the cover section handle being located on the underside of the cover section means that it will be positioned extending upwards when the last cover section is folded over onto the adjacent cover section, but will be concealed in the interior of the truck bed when the cover section is unfolded over and located adjacent the tailgate (when the tailgate is positioned upward and latched). It is appreciated that the cover section handle in some embodiments may be located anywhere on the cover section that makes it easier for the operator to move that cover section to another position.

Figure 25:
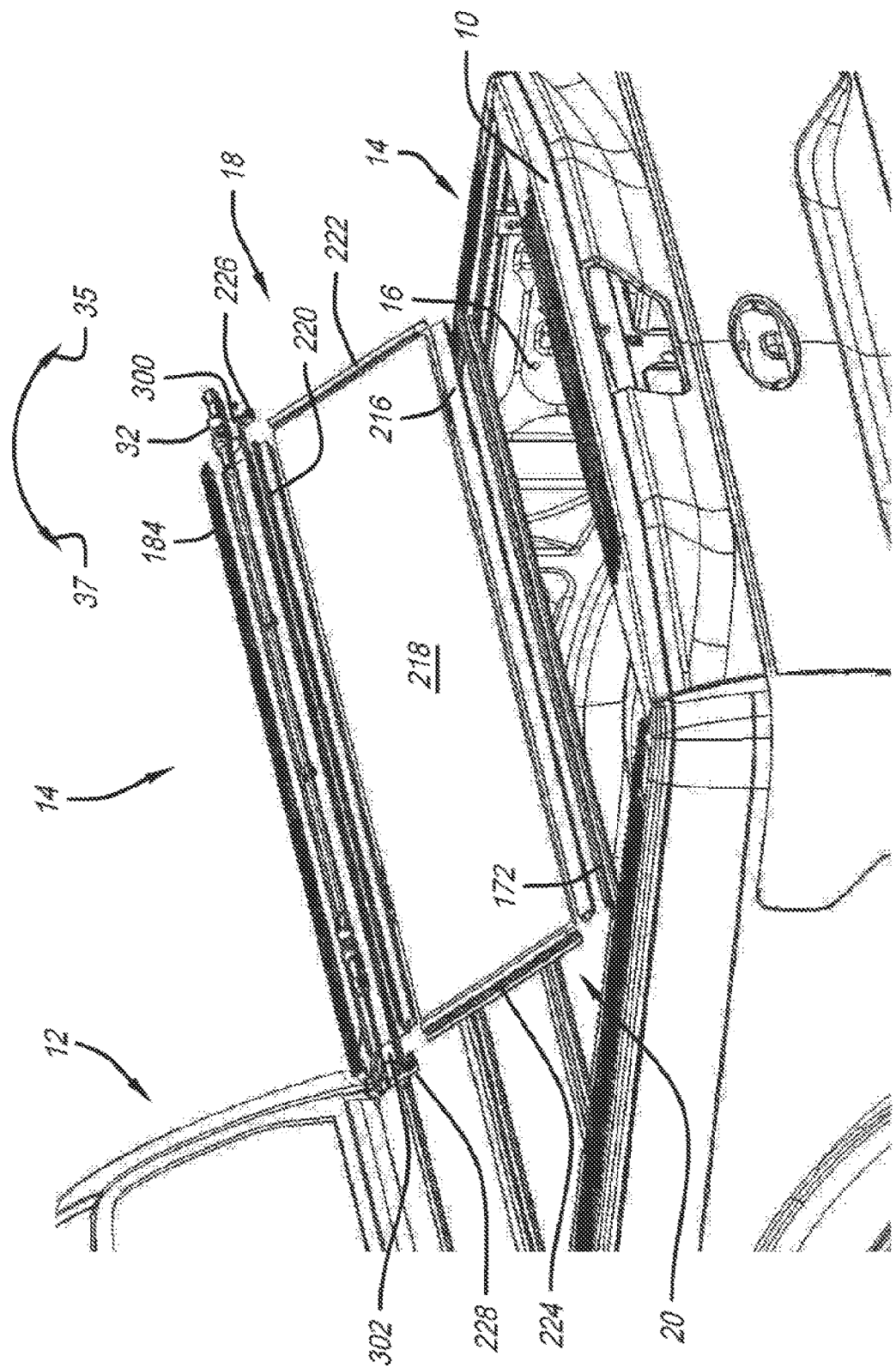
FIG. 25 is a perspective view of the tonneau cover shrouding a portion of the interior of the bed section of the truck.

Another perspective view of tonneau cover 14 shrouding the portion of interior 16 of bed section 4 is shown in FIG. 25. This view is similar to that shown in the prior figures except that (1) cover section 18 is only partially folded over cover section 20; and (2) cover section 18 is shown in a partially exploded view. With regard to the latter, cover section 18 is composed of panel 218 bounded by frame member 216, end frame panel 220, and endcaps 222 and 224. A tailgate seal 184 is affixed to end frame panel 220 and configured to seal between tonneau cover 14 and tailgate 10 when tonneau cover 14 is in its closed shrouded position (see, FIG. 1).

Also located on end frame panel 220 are endcaps 226 and 228 to be fitted on the ends thereof. A latching assembly can also be fitted within a channel in end frame panel 220. Further included are cover section handles 300 and 302 attachable to opposing sides of end frame panel 220. It is appreciated that cover section handle 300 may be located on one side of cover section 18, adjacent the longitudinally extending latching assembly 32, while cover section handle 302 may be located on the opposite side of cover section 18, distal from cover section handle 300. Opposite end frame panel 220 is flexible hinge member 172 that pivotally couples cover section 18 to cover section 20.

Figure 26:
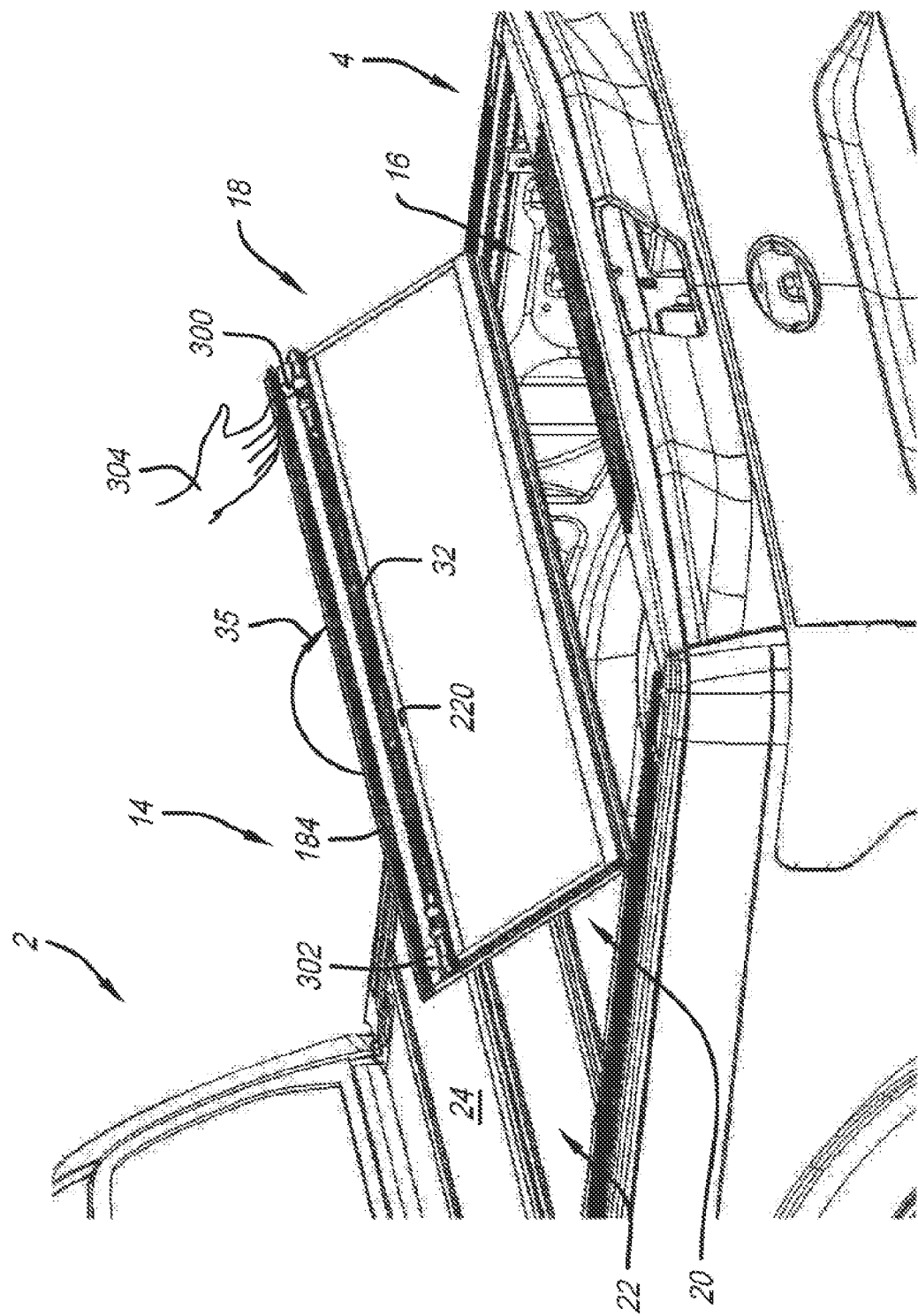
FIG. 26 is another perspective view of the tonneau cover partially shrouding a portion of the truck bed of the truck.

Another perspective view of pickup truck 2, with tonneau cover 14 in a partially covered condition similar to that shown in FIG. 25, is shown in FIG. 26. This view differs from FIG. 25 in that cover section 18 is assembled and shows hand 304 of an operator engaging cover section handle 300 to pivot cover section 18 in direction 35 to fully cover interior 16 of truck bed 4.

As can be appreciated from FIG. 2, when cover section 18 is folded over onto cover section 20, there is no appreciable space between the two cover sections. As such, it is more difficult to lift and move cover section 18 in direction 35 as compared to the other cover sections 20, 22, and 24. This is because a space exists between cover sections 20, 22, and 24 when folded. Accordingly, to assist unfolding cover section 18 in direction 35, for example, hand 304 of the operator lifts at cover section handle 300 (or by lifting cover section handle 302 as well, or in the alternative) to facilitate that easier lifting.

Figure 27:
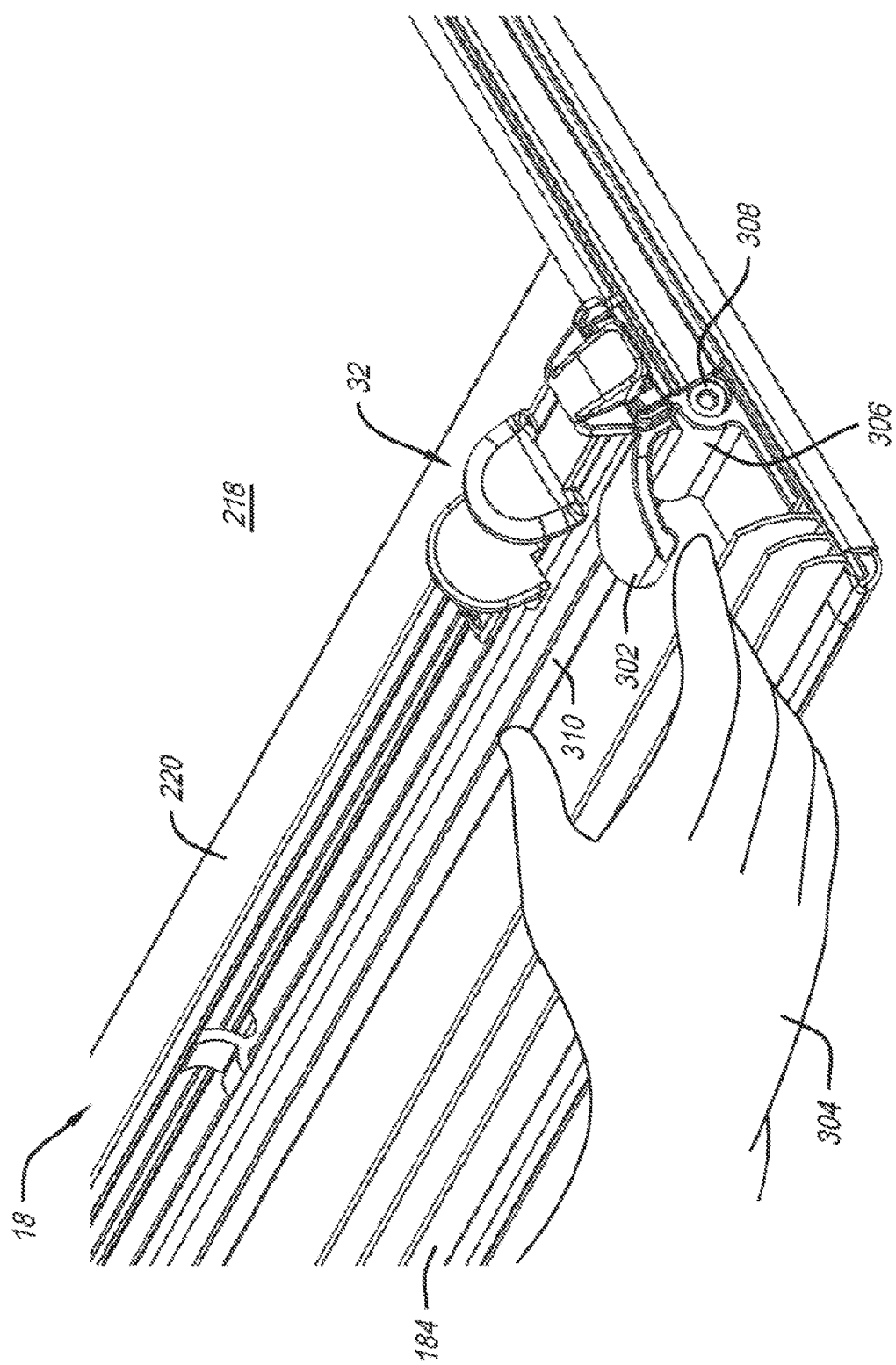
FIG. 27 is a perspective detail view of the underside of a portion of a cover section of the tonneau cover.

A perspective detail view of the underside of cover section 18 is shown in FIG. 27. This view depicts panel 218, end frame panel 220, latching assembly 32, and tailgate seal 184. Additionally, cover section handle 302 is attached to cover section 18 by handle bracket portion 306, which includes a fastener 308 to, illustratively, attach cover section handle 302 to end frame panel 220. In an illustrative embodiment, end frame member 220 may include an extending channel 310 that abuts handle bracket portion 306 and receives fastener 308 to secure cover section handle 302 onto end frame panel 220. It is appreciated that cover section handle 300 may be attached in the same manner. It will be further appreciated by the skilled artisan upon reading this disclosure that, in addition to the embodiments shown, the cover section handle may be integrally formed on end frame panel 220, be attached to any part thereof, or attached to any other portion of cover section 18. In further embodiments, the handle may be extruded along the width of panel 218, combined in frame panel 220, formed into tailgate seal 184, or combined with end caps 220 or 224. The point is that the cover section handle be a grippable structure extending in some manner from cover section 18, allowing hand 304 to grasp the cover section handle in order to move the cover section. In alternate embodiments, a secure cover section handle may attach to any of cover sections 20, 22, and 24, as desired.

Tonneau Cover Wall Rail and Clamp

Another illustrative embodiment of the present disclosure dispenses with the need for any gutter or other draining mechanisms for rainwater and other like precipitation that might pass through the interface between the tonneau cover and the truck bed sidewall. This disclosure includes a new water mitigation system at the interface between the side of the tonneau cover of the truck bed sidewall that illustratively includes a perimeter seal that extends from the side of the tonneau cover and/or a rail that both couples to the tonneau cover at the sidewall. The rail includes a portion that sets on the top of the truck bed sidewall. In an illustrative embodiment, the tonneau cover sets on the rail such that at least a portion of the tonneau cover is set above the sidewall. A flange may extend from the rail over the top surface of the truck bed sidewall at its top inner periphery. As such, the rail becomes essentially the top inner corner of the truck bed sidewall. The perimeter seal extending from the side of the tonneau cover is sized to shroud the flange portion of the rail that extends over the top of the truck bed sidewall. With this combination, the effective top inner periphery of the truck bed sidewall is covered, thereby preventing water, such as rainwater, snow, or other exterior precipitation, from entering into the interior of the truck bed between the sidewall and the cover. It is appreciated that throughout this disclosure one sidewall may be discussed. It is understood, however, that such disclosures herein apply to both sidewalls, and even other walls as well, if applicable.

Figure 28:
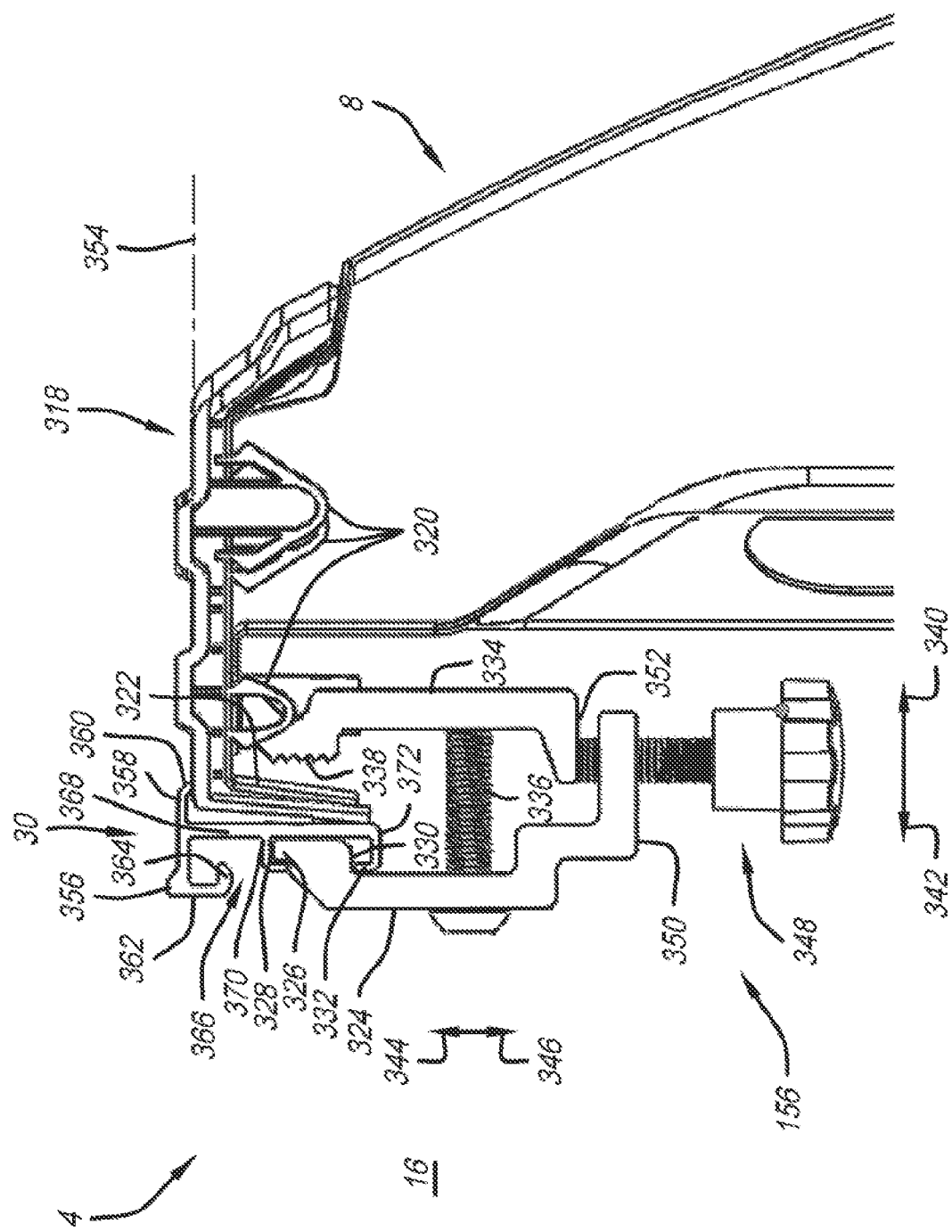
FIG. 28 is a across-sectional view of a side wall portion of the truck bed.

An end cross-sectional view of sidewall 8 of truck bed 4 is shown in FIG. 28. An illustrative version of sidewall 8 includes a top sidewall cap 318 illustratively attached to sidewall 8 via retaining clips 320. It is appreciated, however, that such sidewalls and top surfaces of same may be configured in a variety of different manners. Some sidewalls may include a top cap such as top sidewall cap 318. Other sidewalls may include a bent-metal formed top panel that is part of the formed sidewall. It is further contemplated that the disclosures herein are not dependent on the precise character of the top panel on the sidewall. Additionally, with respect to the disclosures herein, despite being discussed with reference to top sidewall cap 318, the disclosure is believed to be employed equally as well on any type of sidewall top panel. For this illustrative sidewall 8, a down-turned flange 322 is located at the inner periphery of truck bed 4. As illustratively shown herein, a portion of top sidewall cap 318 extends downward adjacent down-turned flange 322. It is appreciated, however, that in other truck designs, the top bed wall cap may not include an extending down-turned flange like extending down-turned flange 322. Either configuration is suitable for this disclosure. Furthermore, the shown down-turned flange 322, as part of sidewall 8 (as well as the down-turned flange for sidewall 6), is illustrative only. The embodiments in this disclosure are contemplated to be used on any variety of truck bed sidewalls.

In an illustrative embodiment, clamp assembly 156 is shown coupled to rail 30 and positioned to clamp onto down-turned flange 322 of sidewall 8. Clamp assembly 156 includes a clamp mount 324 that includes an upward-extending flange 326 that fits into slot 328 of rail 30. Clamp mount 324 also includes a planar surface 330 that rests on support 332 of rail 30. Upward-extending flange 326, in combination with planar surface 330 supported in slot 328 and support 332, will assist in keeping clamp assembly 156 seated on rail 30, even when clamp assembly 156 is not tightly clamped onto down-turned flange 322, as shown herein. To that end, opposite clamp mount 324 is clamp back 334 coupled together via clamping fastener 336, which extends therebetween. An illustrative serrated-type gripping surface 338, on clamp back 334, will abut down-turned flange 322 when clamping fastener 336 is rotated. This configuration will draw clamp mount 324 and clamp back 334 toward each other in directions 340 and 342, respectively. An adjustment screw 348 is disposed through clamp base 350 and engages clamp back base 352 to allow clamp back 334 to be moved vertically in either directions 344 or 346. This allows the clamp assembly 156 to accommodate down-turned flanges of different character on different types of truck bed sidewalls. It is appreciated that clamping fastener 336 may be disposed through a slot (not shown) disposed through clamp mount 324 so clamp back 334 can be moved both vertically in directions 344 and 346, as well as horizontally or in a clamping position in direction 342.

Also shown in FIG. 28 is rail 30. A portion of rail 30 (as well as rail 28 on sidewall 6) is located above the top plane or surface 354 of top sidewall cap 318, as well as the interior periphery of truck bed 4 at down-turned flange 322.

Figure 29:
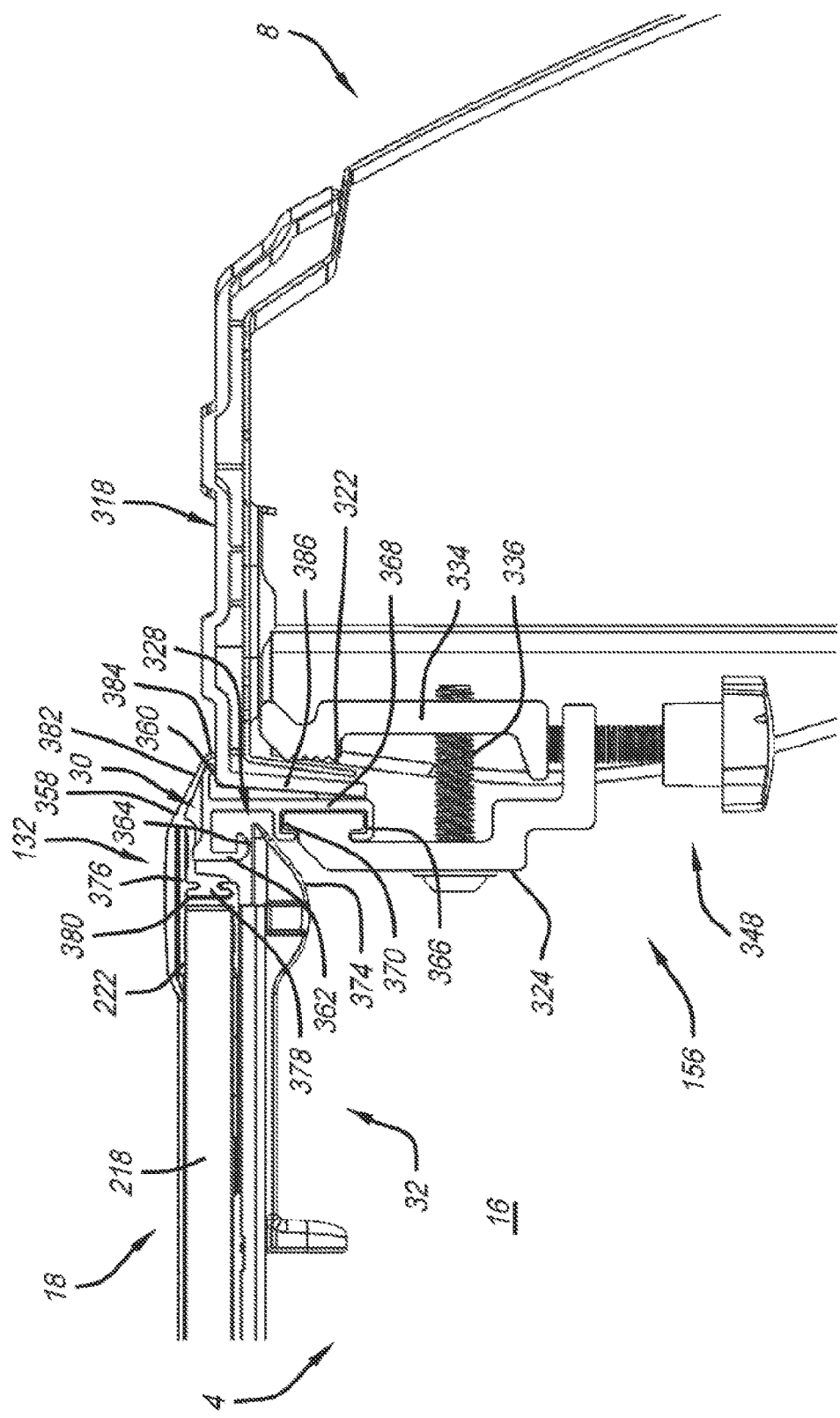
FIG. 29 is another across-sectional view of a portion of the side wall of the truck bed.

Another end cross-sectional view of a portion of sidewall 8 of truck 2, similar to the view shown in FIG. 28, is shown and FIG. 29. A distinction in this view from that shown in FIG. 28 is that cover section 18 is shown lowered onto rail 30 and latched thereto. Latch 374, of latching assembly 32, is disposed in slot 328 of rail 30, partially defined by knuckle 364 and member 370 forming latch receiving channel 366. Knuckle 364, in conjunction with extension 362, creates an abutment between latch 374 and flange 376 of endcap 222 to sandwich rail 30 therebetween. This secures cover section 18 onto rail 30. Further shown in this view is panel 218 fitting into endcap 222. Perimeter seal 132 includes tabs 378 fitted in channel 380 formed in endcap 222. This assists securing perimeter seal 132 to cover 14.

In addition, perimeter seal 132 includes a flap 382 extending from cover section 18 over top sidewall cap 318 on top of sidewall 8. As further shown in this view, flap 382 also extends over panel portion 358, and tab end 360 of rail 30 illustratively contacting the top of top sidewall cap 318 shrouding this portion of rail 30. An illustrative down-turned tab 384 extends over tab end 360 to provide additional sealing capabilities to keep rain or other precipitation from entering interior 16 of truck bed 4. Accordingly, as shown in this view, dual barriers exist between tab end 360 of panel portion 358 and flap 382 to provide the sealing function. It is appreciated that, although this sealing functionality is described with respect to perimeter seal 132 of cover section 18, the same structures apply on all of the additional cover sections 20, 22, and 24. These descriptions also apply to the opposite side of cover section 18, adjacent sidewall 6, along with the opposite sides of the other cover sections 20, 22, and 24. By creating this dual seal, essentially along both sides of tonneau cover 14, rainwater and other precipitation cannot get through this interface.

Also shown in FIG. 29 is clamp assembly 156 clamped onto down-turned flange 322 and illustratively a portion of top sidewall cap 318 on sidewall 8. This secures rail 30 to sidewall 8. It is appreciated that multiple clamp assemblies 156 may be placed along rail 30 to clamp same to sidewall 8 as shown herein. In addition, a plurality of clamp assemblies 156 may attach rail 28 to sidewall 6 in the same manner described herein. With respect to rail 30 and sidewall 8, as shown in this view, clamping fastener 336 draws clamp mount 324 and clamp back 334 together to sandwich down-turned flange 322 and leg member 368 of rail 30, as well as an illustrative down-turned tab 386 of top sidewall cap 318 to secure rail 30 to sidewall 8. Adjustment screw 348 may be moved as necessary to move clamp back 334 as needed. This assists clamping rail 30 to sidewall 8. It is appreciated that a plurality of such clamp assemblies 156 may be positioned along rail 30 and be adjusted in the aforedescribed manner to ensure rail 30 is secured to sidewall 8. Similarly, an additional plurality of clamp assemblies 156 may also be used in in the same manner described, but attaching rail 28 to sidewall 6 opposite rail 30.

Figure 30:
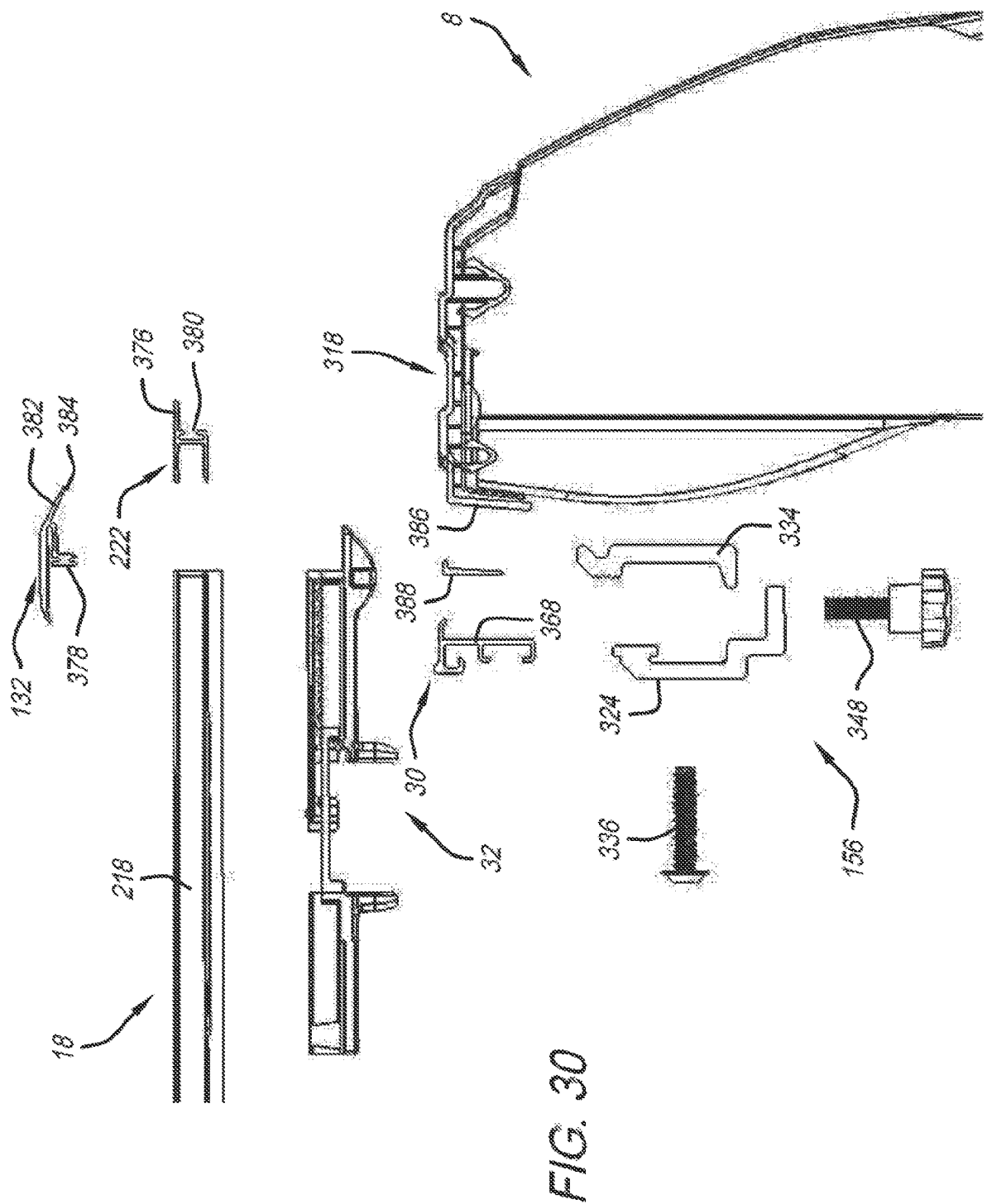
FIG. 30 is a cross-sectional exploded view of the side wall portion of the pickup truck and a portion of the tonneau cover and clamp.

An end cross-sectional exploded view of sidewall 8, with clamp assembly 156 and cover section 18, is shown in FIG. 30. This view further shows the illustrative attachment of top sidewall cap 318 attached to the top of sidewall 8, along with down-turned tab 386. The exploded view of cover section 18 includes perimeter seal 132 with its tabs 378 that are received in channel 380 of endcap 222. Also shown with respect to perimeter seal 132 is flap 382 with down-turned tab 384 sized to engage the top of top sidewall cap 318 to provide a barrier seal for interior 16 of truck bed 4. It is appreciated that perimeter seal 132 (and 133) may be made from a rubber, rubber-like material, or resilient polymer.

Endcap 222 includes flange 376 sized and configured to extend over sidewall 8. Channel 380 is sized to receive tabs 378 of perimeter seal 132 (see, also, FIG. 29). An illustrative channel in endcap 222 receives a portion of panel 218. Latching assembly 32, with latch 374 extending therefrom, is coupled to cover section 18. It is appreciated that these same structures described herein with respect to this end of cover section 18 may be employed on the opposed end of cover section 18 as well. Furthermore, the structures may also be included on both sides of the other cover sections 20, 22, and 24. It is still further appreciated that illustrative latch assemblies and other structures related to the cover sections may engage rails 28 and 30 as well.

A seal member 388 may illustratively be positioned between leg member 368 and down-turned tab 384 to provide a sealing function between rail 30 and top sidewall cap 318. Lastly, clamp assembly 156 is shown including clamp mount 324, clamp back 334, clamping fastener 336, and adjustment screw 348.

Figure 31:
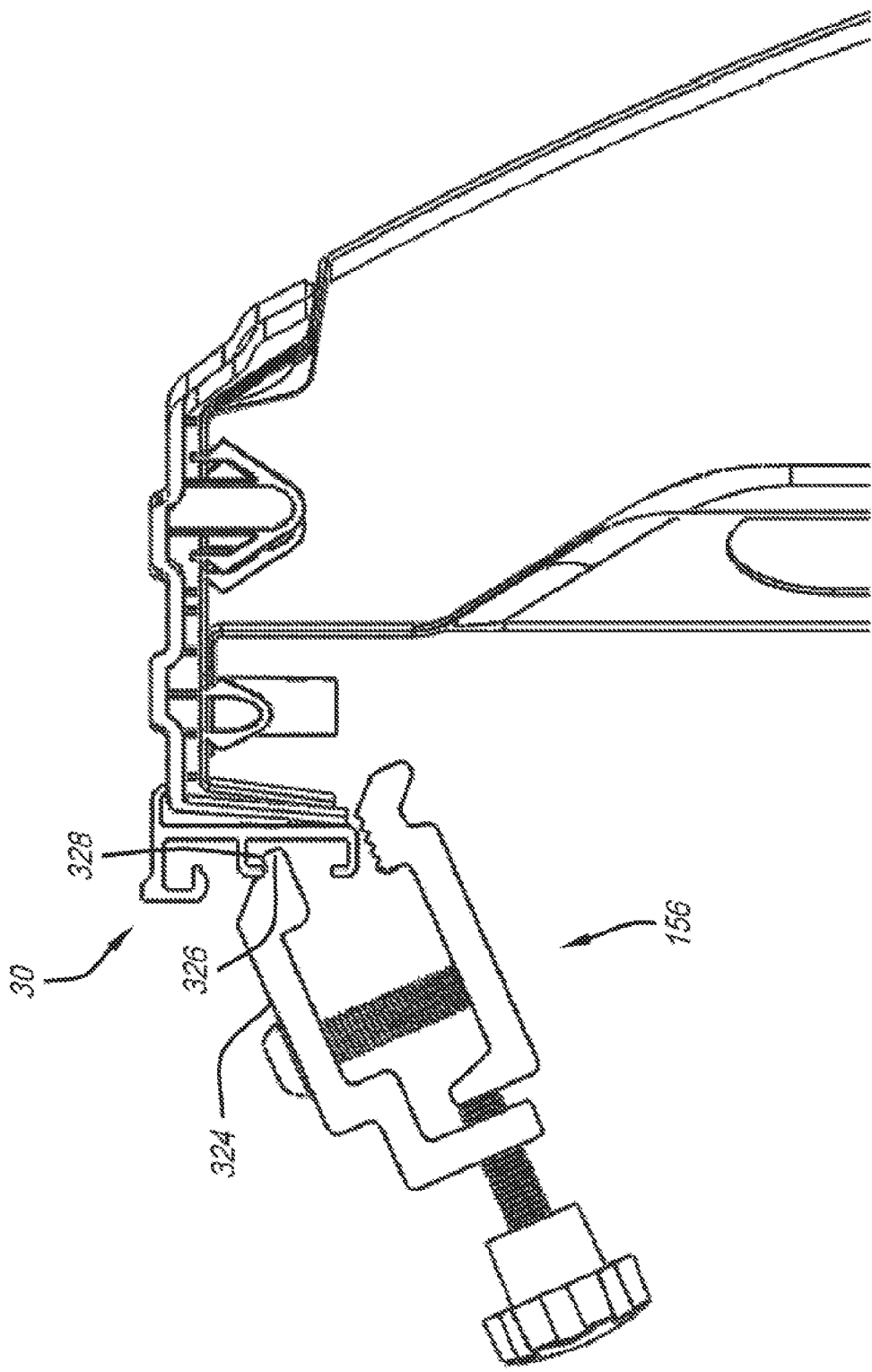
FIG. 31 is a sectional view of the truck bed side wall with a clamp and rail.
Figure 32:
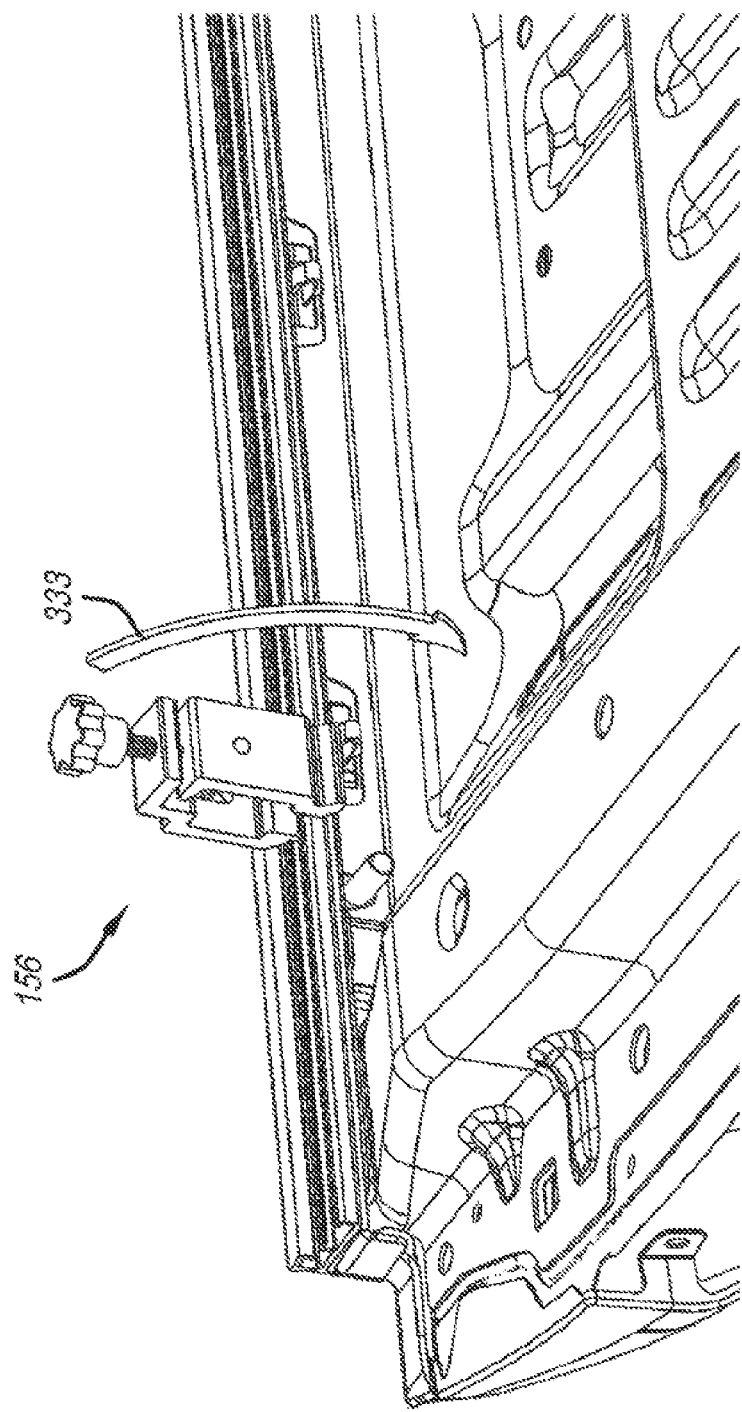
FIG. 32 is an underside view of a portion of the tonneau cover, clamp, and rail.
Figure 33:
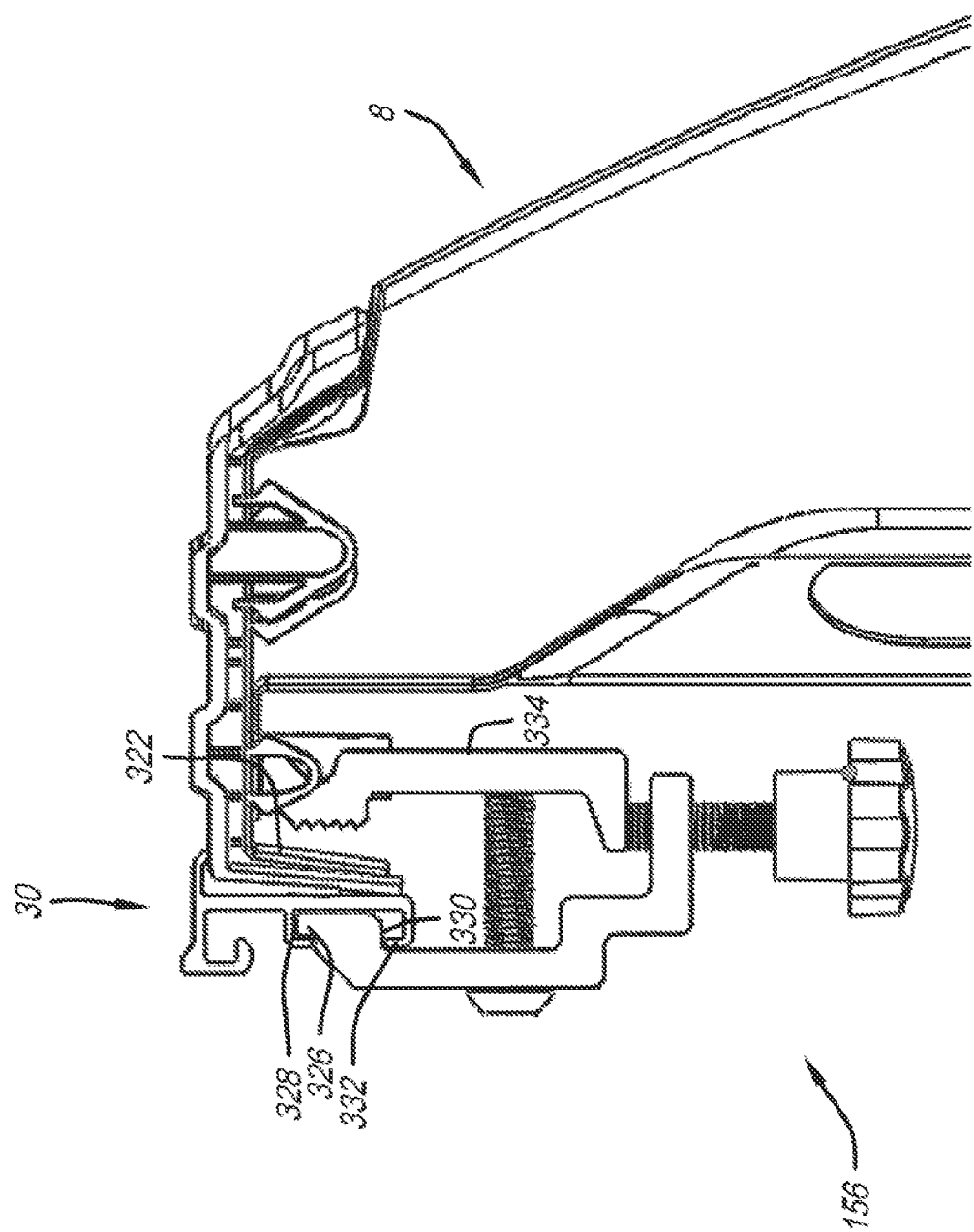
FIG. 33 is another sectional view of the truck bed side wall, rail, and clamp.
Figure 34:
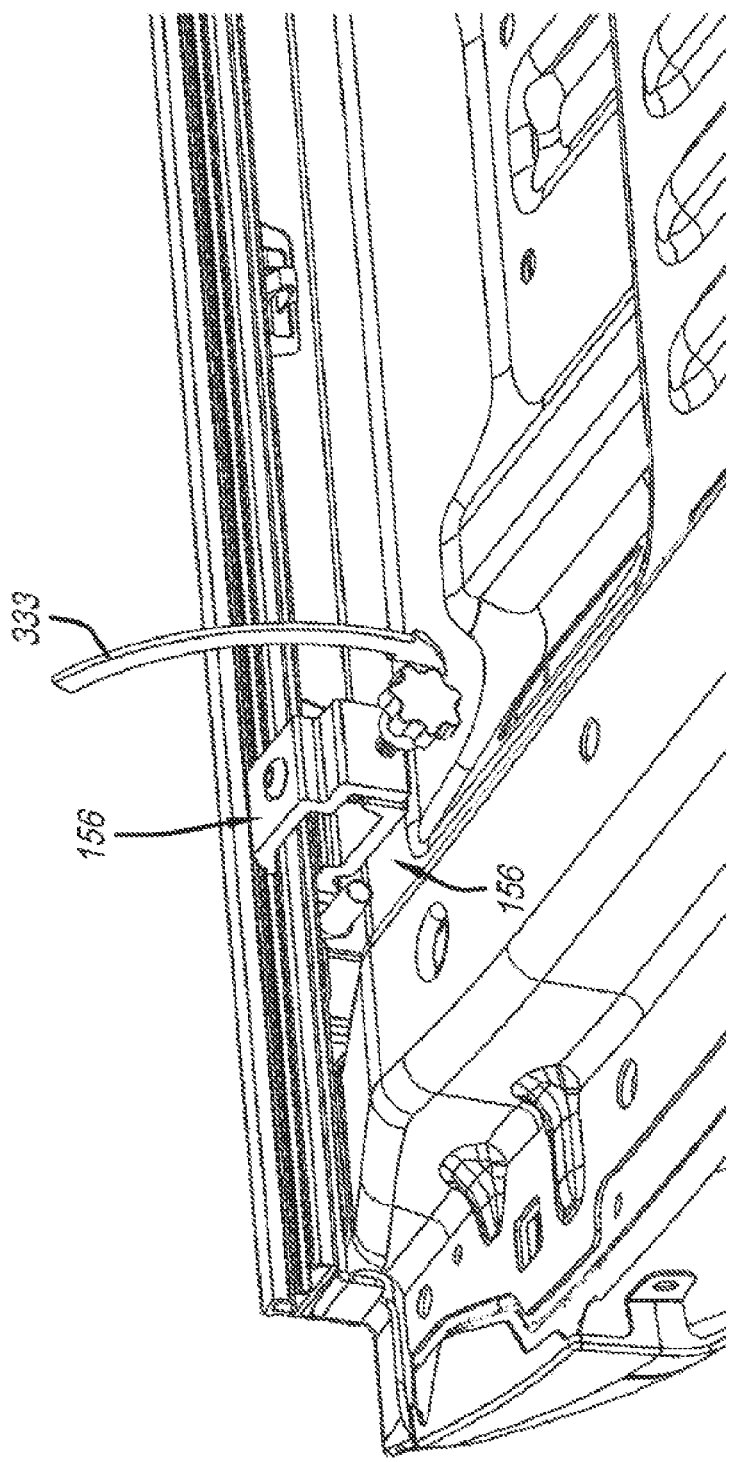
FIG. 34 is an underside view of a portion of the tonneau cover, clamp, and rail.

End sectional and underside views of tonneau cover 14 is shown in FIGS. 31, 32, 33, and 34. These views depict how clamp assembly 156 is coupled to the rail 30. As shown in FIG. 31, for example, upward-extending flange 326 of clamp mount 324 of clamp assembly 156 is placed in slot 328 of rail 30. Clamp assembly 156 is then pivoted in direction 333, as shown in FIG. 32. Planar surface 330 is, thus, supported by support 332 of rail 30 to support clamp assembly 156. Prior to clamping rail 30 onto down-turned flange 322 of sidewall 8 of the truck bed this view shows clamp back 334 not yet engaged with down-turned flange 322. Support of planar surface 330 on support 332 and upward-extending flange 326 fitted in slot 328 helps keep clamp assembly 156 hung onto rail 30 while in the process of installing same onto sidewall 8 without clamp assembly 156 falling off or needing some other support prior to clamping, as shown in FIGS. 33 and 34.

Tonneau Cover Multi-Piece Rail

Another illustrative embodiment of the present disclosure also provides a pickup truck that includes a tonneau cover having rails that are attached to the truck bed sidewalls. These rails support the tonneau cover and help keep water and other elements from migrating between the interface of the tonneau cover and truck bed side walls. In addition, the rails are composed of multi-piece rail sections that combine to form the full-length rails.

An advantage of multi-piece rails is for shipping the tonneau cover. Overall carton size must be increased when shipping a tonneau cover with full length 6 foot long rails. A 6 foot long carton may be unwieldy for common carriers such as the post office, FedEx and UPS, for example. With multi-piece rails, the carton size may be reduced, which is better for sellers, shippers, and, ultimately, customers.

In an embodiment of the present disclosure, rail assemblies may include a plurality of rail sections that can be combined together to form a rail that extends the length of the sidewall of the pickup truck's truck bed. A block, bracket, or other like structure may be attachable to both rail sections to attach them together. This connection can apply to rail sections that form the rails on both sidewalls of the truck bed. Accordingly, when shipping the tonneau cover, the rails are broken down into rail sections of lesser length than the rails as a whole and packaged in a carton that is of lesser size than the carton would otherwise be with rails that extend the full length of the truck bed sidewalls. This results in shipping cartons for the tonneau cover that are overall shorter than the carton otherwise would be. This results in better shipping options for the tonneau cover, particularly with respect to residential delivery.

Another perspective view of truck 2, with tonneau cover 14 attached onto sidewalls 6 and 8 of truck bed 4, and in folded condition similar to FIG. 5, is shown and FIG. 35. Here, cover sections 18, 20, 22, and 24 are folded over and stacked vertically onto bulkhead panel assembly 26. Prop rods 150 and 152 are each both coupled to cover section 24 and onto rails 28 and 30, respectively. A distinction between the views of FIG. 5 and FIG. 35 is that mechanical catch assembly 33, as shown in FIG. 5, has been removed for illustration purposes to show rail coupling block 390 illustratively located underneath. In this illustrative embodiment, rail 30 is not a single longitudinally extending rail. Instead, rail 30 is composed of multiple rail sections that are connected together to form the full rail that extends along sidewall 8 as shown herein.

Rails, such as rails 28 and 30, as shown in their installed form, tend to be the longest structures of tonneau cover 14. This can become an issue for shipping purposes. For example, a tonneau cover, such as tonneau cover 14 shown in its folded condition in FIGS. 5 and 35, may have a compact dimension of about 5.5 feet wide by about 1.3 feet high by about 0.5 feet thick. When disassembled, the cover portion alone only occupies a space of about 5.5 feet by about 1.8 feet by about 0.3 feet. These dimensions are acceptable for shipping through a common carrier such as UPS, FedEx, etc. But when including the rails, which may be as long as 6 to 8 feet, the shipping carton for the cover and rails needs to be that same length as well. This makes it potentially difficult for residential delivery.

Accordingly, the present disclosure includes rails, such as rails 28 and 30 that are composed of rail sections. These rail sections each have an overall length that is less than the total length of the rails (e.g., less than 6 feet). This makes the overall packaging for tonneau cover 14 much reduced, which translates into better shipping options for residential and commercial shipping.

As further shown in FIG. 35, rails 28 and 30 extend the length of sidewalls 6 and 8, respectively, just as full length rails. The addition of rail coupling block 390 connects rail sections 392 and 394 to form rail 30. The same is the case (although not shown in this view) with rail 28 having its own rail sections similar to rail sections 392 and 394 to form the full length rail 28.

A perspective detail view of rail 30 is shown in FIG. 36. Rail 30 is shown composed of rail sections 392 and 394, which are joined together and attached via rail coupling block 390. Clamp assemblies 156 may be coupled to each of rail sections 392 and 394 at slot 328. It is appreciated that multiple clamps 156 may be coupled to each of rail sections 392 and 394. Additionally, although only rail 30 is shown in this view, the embodiments and disclosures herein apply to rail 28 as well.

With regard to rail coupling block 390, it illustratively may include a cross-sectional profile that complements the cross-sectional profile of both rail sections 392 and 394, so as to fit thereon as illustratively shown. Rail coupling block 390 may expand across both rail sections 392 and 394, and use fasteners or other like structures to secure rail sections 392 and 394 to rail coupling block 390.

Figure 37:
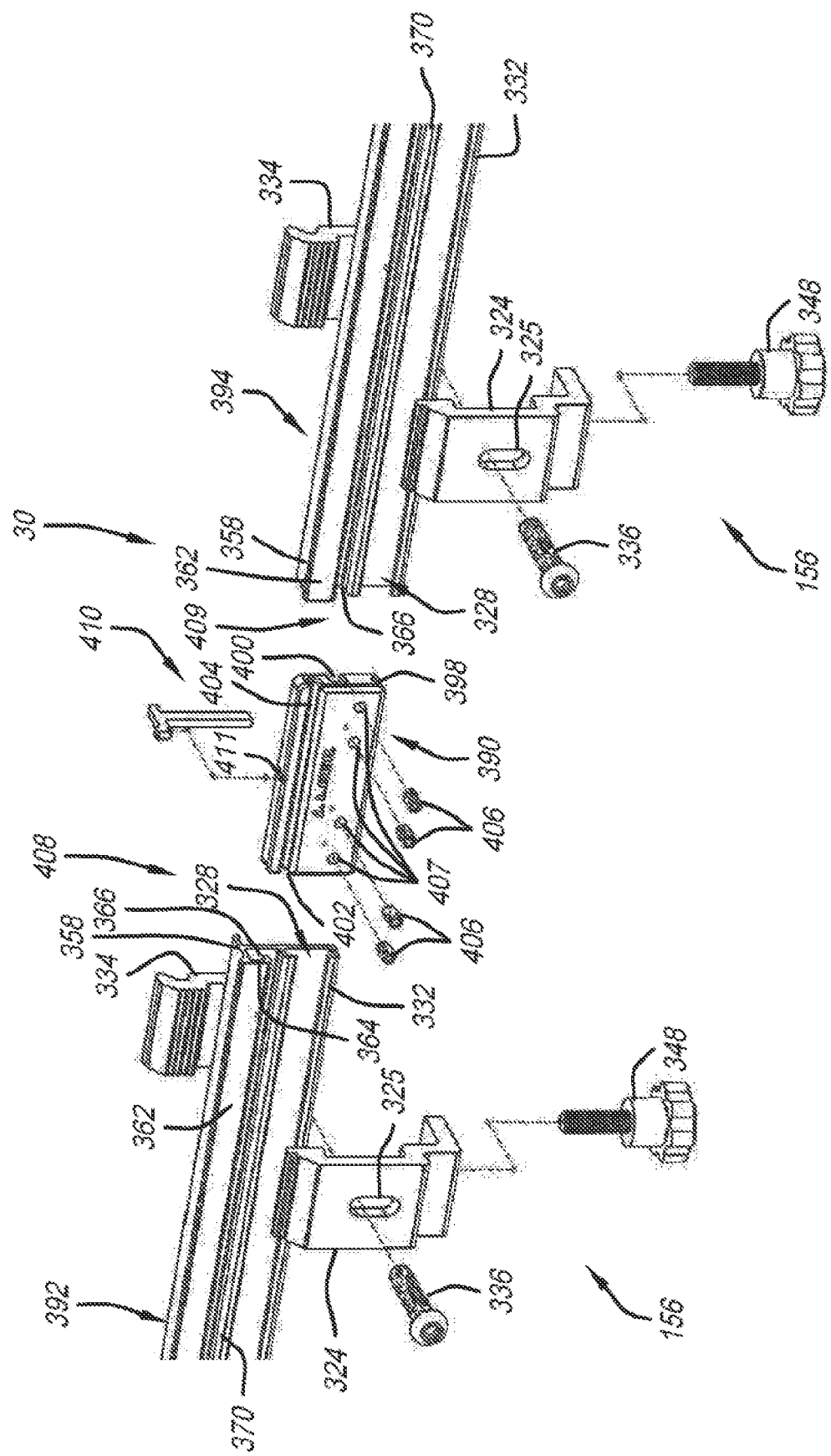
FIG. 37 is an exploded perspective detail view of the split rail and clamps.

An exploded perspective detail view of rail 30 is shown in FIG. 37. Clamp assemblies 156 is shown in exploded view, including clamp mount 324, clamp back 334, clamping fastener 336, and adjustment screw 348. Shown in clamp mount 334 is slot 325 sized to receive clamping fastener 336 allowing same to move within slot 325 to adjust clamp back 334 with respect to the other components of clamp assembly 156 (or the other components with respect to clamp mount 324). Each clamp assembly 156 shown in this view is configured to fit into slot 328 formed in each of rail sections 392 and 394, respectively. Each slot 328 includes an extending member 370 and support 332 which contribute to defining the cross-sectional profile of each of slots 328. An extension 362 depending from panel portion 358, along with finger 364, forms a latch receiving channel 366. Rail coupling block 390 engages both rail sections 392 and 394 by including features that complement the cross-sectional profile of rail sections 392 and 394. For example, a groove 398 and slot 400 longitudinally disposed along the back side of rail coupling block 390 complement the cross-sectional profile of rail sections 392 and 394, particularly, slot 328, with support 332 and member 370, as shown. Similarly, a corresponding latch slot 402 with flange 404, all of which are longitudinally extending, as shown, fit into latch receiving channel 366 having the profile formed by panel portion 358, extension 362, and finger 364. It will be appreciated by the skilled artisan upon reading this disclosure that the complementary cross-sectional profile formed in rail coupling block 390 is longitudinally extending on the block so that it may fit into both rail sections 392 and 394 (see, also, FIG. 36).

A plurality of fasteners 406 illustratively extend through bores 407. In an illustrative embodiment, bores 407 may include threads which receive fasteners 406. Because the shape of groove 398 and slot 400 are complementary to the shape formed by slot 328 with support 332 and member 370, this illustrative embodiment of rail coupling block 390 only couples to rail sections 392 and 394 by sliding in at their cross-sectional ends 408 and 409. Once rail coupling block 390 is fitted into both rail sections 392 and 394, rail coupling block 390 cannot be removed by pulling it outward in a direction transverse to the longitudinal extent of rail 30. The fasteners 406 extend through bores 407 to essentially wedge rail coupling block 390 in slots 328 by fasteners 406 pushing against rail sections 392 and 394 at slot 328. This secures rail coupling block 390 against rail sections 392 and 394.

It will be appreciated by the skilled artisan upon reading this disclosure that other coupling structures may be employed such as predrilled openings in the coupling block aligning with predrilled openings in the rail sections and attached together by fasteners; clamping structures not unlike clamp assembly 156 that clamps onto both panel sections. In addition, in other embodiments, rail 30 (as well as rail 28) may be split into three or more sections as opposed to just two sections. Multiple coupling blocks or other structures may be employed to couple the three or more rail sections together. Furthermore, a coupling seal 410 may be positioned between rail sections 392 and 394. Rail coupling block 390 may include a slot 411 configured to receive at least a portion of coupling seal 410. It is appreciated that coupling seal 410 has a shape that complements the cross-sectional shape of at least a portion of ends 408 and 409 of rail sections 392 and 394. This prevents moisture, such as precipitation, from seeping at the seam formed between connecting rail sections 392 and 394.

Figure 38A:
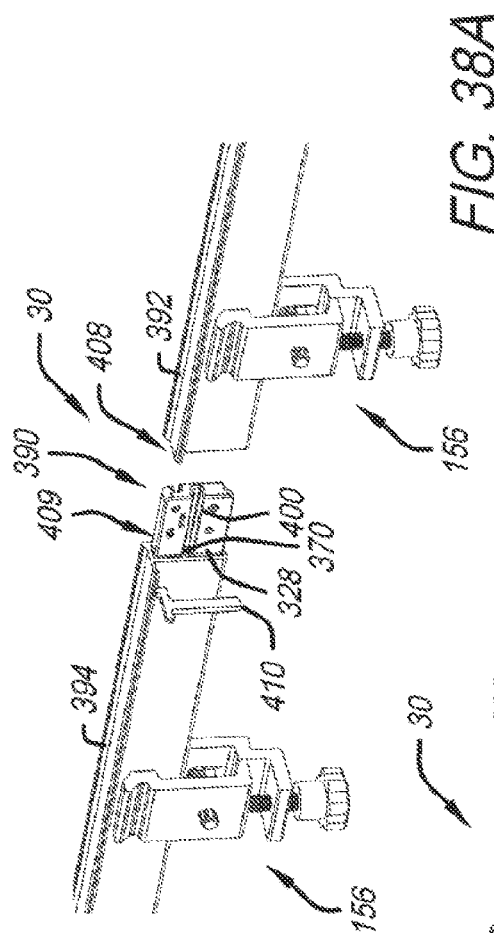
FIGS. 38A, 38B, and 38C, are progression perspective detail views showing the assembly of the split rails.
Figure 38B:
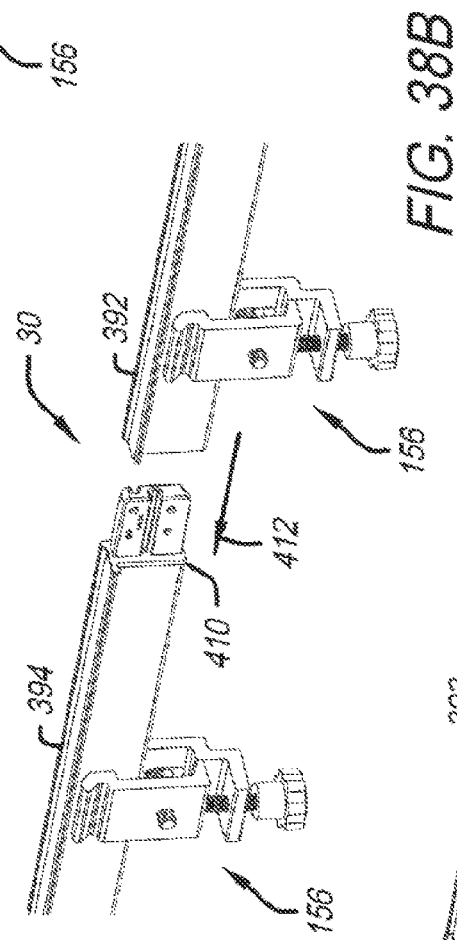
Figure 38C:
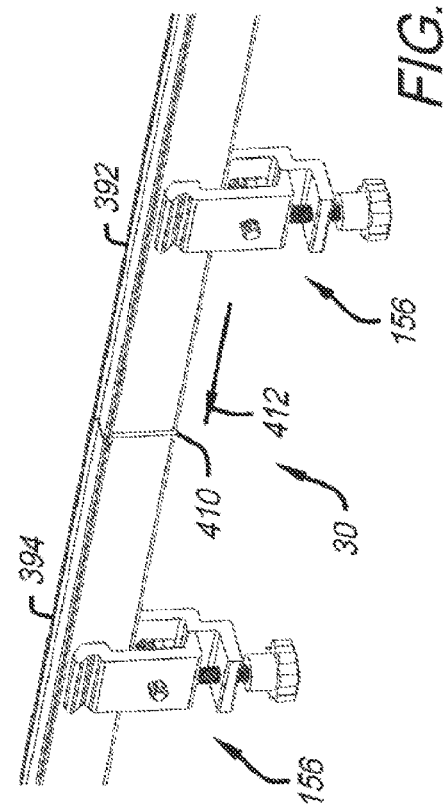

A plurality of perspective detail progression views showing the assembly of rail sections 392 and 394 are shown in FIGS. 38A, 38B, and 38C. With respect to FIG. 38A, it shows clamp assembly 156, rail coupling block 390, and coupling seal 410. From this view, rail coupling block 390 is inserted into rail section 394 at end 409 as shown. Rail coupling block 190 is also shown in this first view partially extending out from end 409 so as to fit into end 408 of rail section 392. This view further shows the longitudinal extent of slot 400 and how it is configured to receive member 370 when fitted into slot 328 in rail section 392.

The view in FIG. 38B is similar to that of FIG. 38A except that the next step in assembling rail 30 is to place coupling seal 410 onto rail coupling block 390 illustratively adjacent rail section 394. It is appreciated from this view how coupling seal 410 mimics the cross-sectional profile of rail section 394 (as well as rail section 392). This creates a mating seal between rail sections 392 and 394. At this point, rail section 392 may be movable in direction 412 to slide onto rail coupling block 390. To that end, as shown in FIG. 38C, rail section 392 has been moved fully in direction 412 onto rail coupling block 390 and abutting coupling seal 410. Using fasteners 406 (as shown in FIG. 37), rail sections 392 and 394 are coupled together with coupling seal 410 sandwiched in between. This forms the full rail 30 (or rail 28)

that extends the length of truck bed sidewall 8 (or sidewall 6) upon which tonneau cover 14 sets on as shown in the previous drawings.

The utility of the multi-piece rail design of the present disclosure enables the shipping carton to be a reduced size. Because of the increased popularity of common carriers employed to ship product, particularly to residential addresses, carton size for many products has received a new level of scrutiny. Where once it may have been a non-issue to ship tonneau covers with 6 foot long rails, it has now become an issue.

A perspective view of a folded prior art tonneau cover 413, with prior art single component rails 414 and 415 packaged in prior art carton 416, is shown in PRIOR ART FIG. 39. It is appreciated from this view how the length of folded tonneau cover 413 is much shorter than the length of single component prior art rails 414 and 415. This makes the length, identified by L', about the length of single component prior art rails 414 and 415 which are longer than tonneau cover 413. This creates dead space 417 between the end of tonneau cover 413 and prior art carton 416 as shown.

A perspective view of folded tonneau cover 14 of the present disclosure, along with rail sections 392 and 394, is shown in FIG. 40. It is appreciated from this view how the length of rail sections 392 and 394 are not long enough that they extend beyond the length of folded tonneau cover 14 shown therein. Indeed, their individual lengths are quite less. This means that the overall length, identified by L of carton 418, is substantially less than the overall length L' of prior art carton 416. This means the carton will have illustrative dimensions of about 5.6 feet long by about 2.3 feet wide by about 0.5 feet high, thereby making it sufficient to be delivered by common carriers such as UPS and FedEx.

Figure 41:
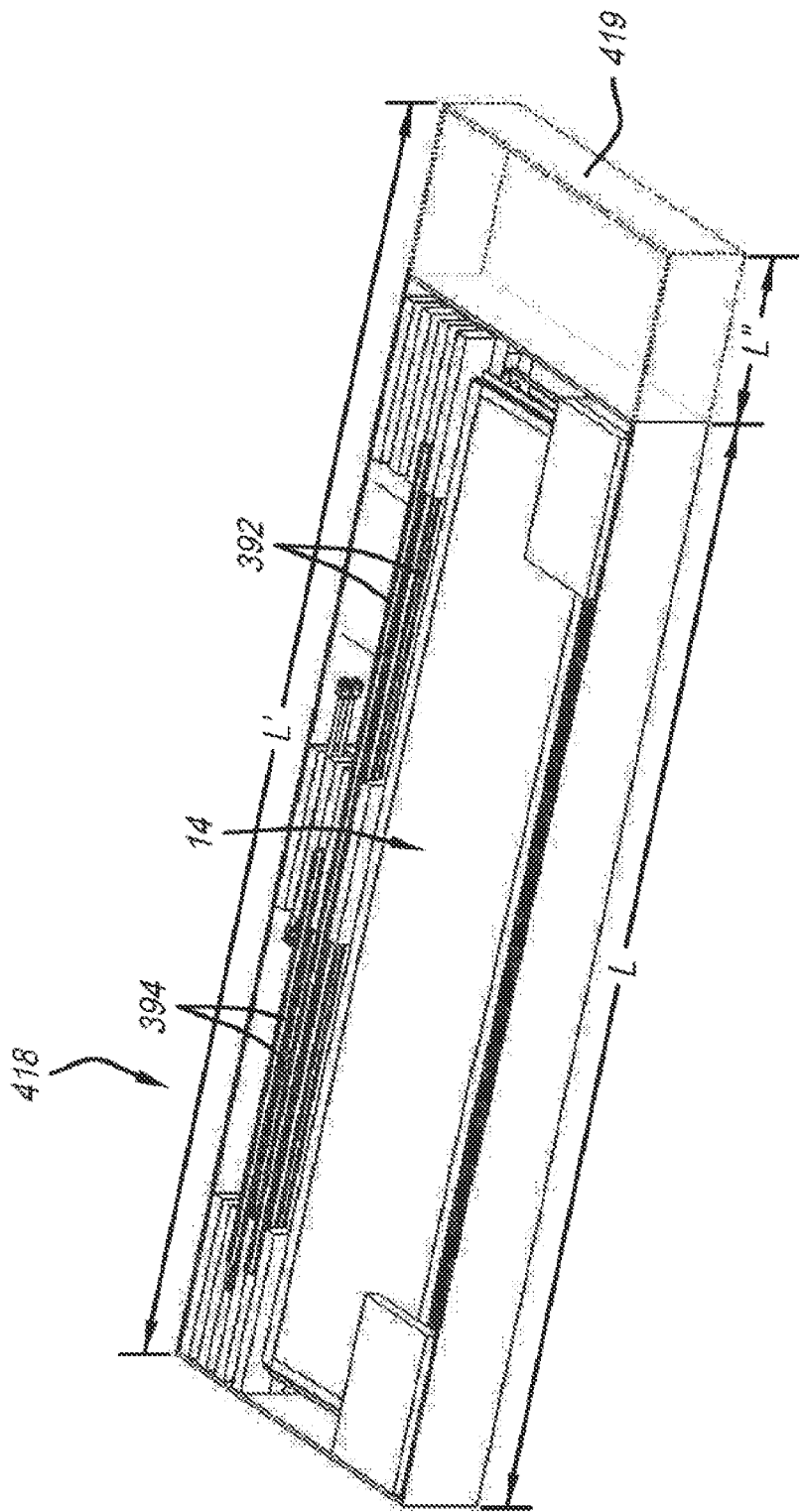
FIG. 41 is another perspective view of the tonneau cover and components related thereto, packaged in the carton.

Another perspective view of carton 418, from FIG. 11, is shown in FIG. 41. This view helps appreciate the difference in size between prior art shipping carton and the current shipping carton. As shown herein, the original prior art carton 416, as shown in FIG. 39, has a length as represented of L'. In contrast, carton 418 has a length L. As represented in dashed lines, the shipping volume saved 419 has a length L". In other words, the shipping volume saved 419 from prior art carton 416 results in a smaller carton 418 having a length L that is more accommodating for common carriers.

Figure 42:
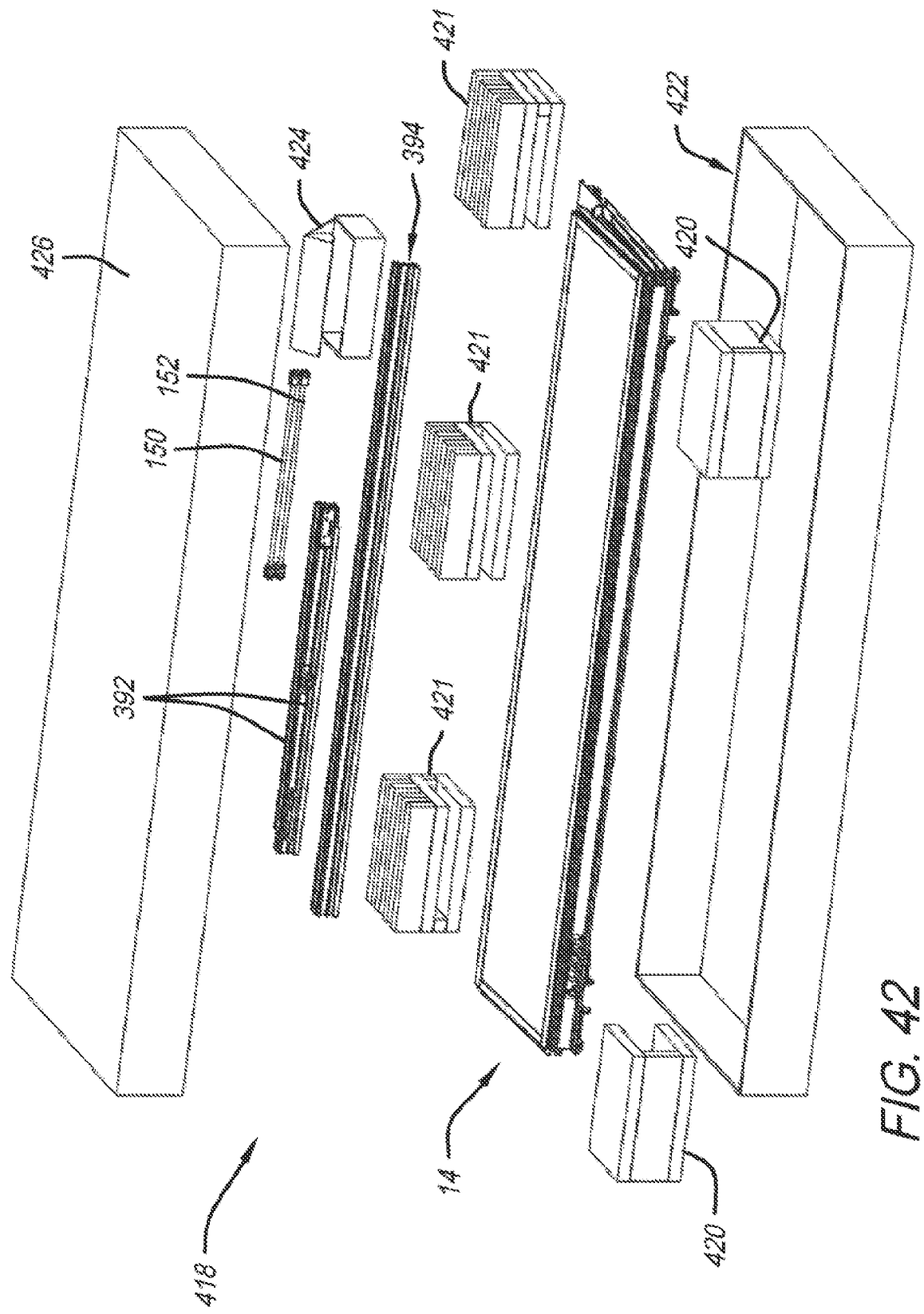
FIG. 42 is a perspective exploded view of the tonneau cover and associated components with illustrative packaging and the carton; tonneau cover.

A perspective exploded view of carton 418 that includes tonneau cover 14 and rail sections 392 and 394 is shown in FIG. 42. This view demonstrates how tonneau cover 14 may be packed with packing material 420 and 421 and placed in lower carton tray portion 422. Rail sections 392 and 394 may also be fitted in slots or other holding structures of packing material 421. Prop rods 150 and 152 may be fitted in packing material 421 as well. An additional box 424 may be used for parts and accessories. A top carton lid 426 may be placed over top to form carton 418. Again, this can only be accomplished in appropriate dimensions when rails 28 and 30 are split into at least two rail sections 392 and 394 each.

Mechanical Catch Assembly

Because of the expansive length of the truck bed, and hence its cover, it can be useful to have securement points along the length of the cover and the sidewalls. Typically, tonneau covers include a first latch assembly directed towards the inside of the truck bed to keep at least a portion of the cover secured to the rail or sidewalls of the truck bed. This first latching assembly is typically located towards the end of the cover by the tailgate so an operator may activate the latches to unlatch them from the sidewall or rail. Additional manually activated latching assemblies may be placed periodically along the length of the cover adjacent the sidewalls. Hence, a series of manually operated latches are regularly positioned along the length of the cover to keep same secured along the rail or sidewall.

An illustrative embodiment of the present disclosure provides an alternative to these additional manually actuated latches used to secure the length of the tonneau cover to the sidewalls. Although a manually operated latch can still be placed at the tailgate end of the cover to selectively initiate releasing the cover from the rail or sidewalls, one or more catch assemblies may be employed that do not require manual unlatching of the cover to fold or roll it up to its stored position for uncovering the truck bed. The catch assembly still secures the cover to the bed sidewalls (or rail) when the cover is unrolled flat over the truck bed, but during the act of unrolling or unfolding the cover, the catch assembly releases the cover without further effort by the operator.

A further illustrative embodiment of the present disclosure includes a mechanical catch assembly that is activated by the movement of the cover with respect to the mechanical catch assembly. This causes the mechanical catch assembly to either grab the cover when being unrolled or unfolded flat, or release from the cover when being rolled or folded for stowage.

An embodiment of the mechanical catch assembly may include a catch base that is secured to a rail which itself is secured to a sidewall of the pickup truck bed. A pivoting lever arm or other like structure may be spring-loaded or otherwise biased keeping it and a movable flange or plunger in a non-latched condition. This allows the cover to be folded or rolled without being impeded or necessitating any further action on the part of the operator to unsecure the cover from the rail or sidewall. Conversely, when the cover is being unfolded flat to shroud the truck bed, the cover can engage the lever arm which then moves the plunger. The plunger may serve as a catch that, upon movement, engages the cover to secure same to the rail.

These mechanical catch assemblies may be periodically spaced along the sides of the rail or sidewall to latch to the cover at multiple positions, to prevent anyone from separating the cover from the rail to gain unauthorized access to the truck bed underneath.

Illustratively, the mechanical catch assembly may include a movable arm attached to the rail that is engageable by a foot member that is attached to the underside of the cover. This engagement moves the lever arm, which extends the movable plunger or catch, that itself is engageable with a panel catch also extending from the underside of the cover, so as the cover unfolds and the foot engages the lever arm, the catch extends and engages the panel catch, thereby securing the catch assembly (attached to the rail) to the cover. When folding or rolling the cover, the foot releases from the lever arm causing the plunger or latch to release from the panel catch, thereby unlatching the cover from the rail and allowing the cover to be further folded or rolled for providing access to the truck bed underneath. This is all done without the operator having to perform any unlatching steps.

As shown in FIG. 3 mechanical catch assembly 33 is attached to rail 30. It is appreciated that a plurality of such mechanical catch assemblies 33 may be placed on both rail 30, as well as rail 28. Each of the plurality of mechanical catch assemblies 33 may be positioned adjacent to one of the cover panels so as to secure the cover panel to the rail when the cover panel is laid flat on same. Conversely, mechanical catch assembly 33 may release from its corresponding cover panel when the cover panel is being folded to uncover truck bed 4.

A utility of mechanical catch assembly 33, as further identified herein, is to provide a securement for the cover panels of tonneau cover 14 or types of covers such as flexible, folding, rolling, etc., when laid flat on rails 28 and 30 (and/or sidewalls 6 and 8). By having this securement when tonneau cover 14 is covering truck bed 4, thereby shrouding interior 16, a level of security is created. Despite latching assembly 32 on cover sections 18 securing same to rails 28 and 30, it might be possible to pry an opening between any of the other cover panels 20, 22, or 24 from rails 28 and 30 (or sidewalls 6 and 8) to provide unauthorized access into interior 16 of truck bed 4. Accordingly, having a catch that secures each of the cover panels (or the cover itself when used with other embodiments of the cover) prevents that potential for separation between tonneau cover 14 and truck bed 4.

A distinction, however, between mechanical catch assembly 33 and latching assembly 32 is that latching assembly 32 requires the operator to actively engage latches on latching assembly 32 in order to unlatch cover panel 18 from rails 28 and 30. In contrast, mechanical catch assembly 33 does not require direct engagement by the operator to either secure to or release the cover sections. The mechanical catch assemblies may be spaced apart in any desired manner and number to create a securement between the cover and the rail as desired. To that end, mechanical catch assembly 33 is configured to engage its corresponding cover panel when its cover panel is moved to its shrouding covered position such as in direction 35, and then disengage from its corresponding cover when same is being moved to its uncovered position, illustratively, in direction 37. This means the operator does not have to independently actuate any latch assemblies each time tonneau cover 14 is being folded up to access truck bed 4 underneath. At the same time, when cover sections 18 through 24 are being unfolded to shroud interior 16 of truck bed 4, mechanical catch assemblies 34 will automatically engage and latch to those cover sections, thereby securing tonneau cover 14 to truck bed 4. This makes folding and unfolding tonneau cover 14 an easier process.

The perspective view of truck 2 shown in FIG. 4 differs from FIGS. 2 and 3 in that cover panels 18 and 20 are folded completely over onto cover section 22. Illustratively, cover sections 18 and 20 have been pivoted in direction 37 as shown herein. When this happens, mechanical catch assembly 33 releases tonneau cover 14 without any further intervention by the operator other than folding the cover sections 18 and 20. It is appreciated that additional mechanical catch assemblies may be positioned along rail 30 (as well as rail 28) to secure the other cover sections onto truck bed 4.

Additionally, and as will be appreciated by the skilled artisan upon reading this disclosure, the positioning of mechanical catch assembly 33, with respect to tonneau cover 14, may be at a variety of locations. For example, mechanical catch assembly 33 may be engageable with the underside of any of cover sections 20, 22, and 24, the sides of those cover sections, the cover sections themselves, or any panels such as intermediate panel 40 located between cover sections 20 and 22. Mechanical catch assembly 33 may conversely be located on the cover and engage the rail, sidewall, or catch located on same.

Figure 43:
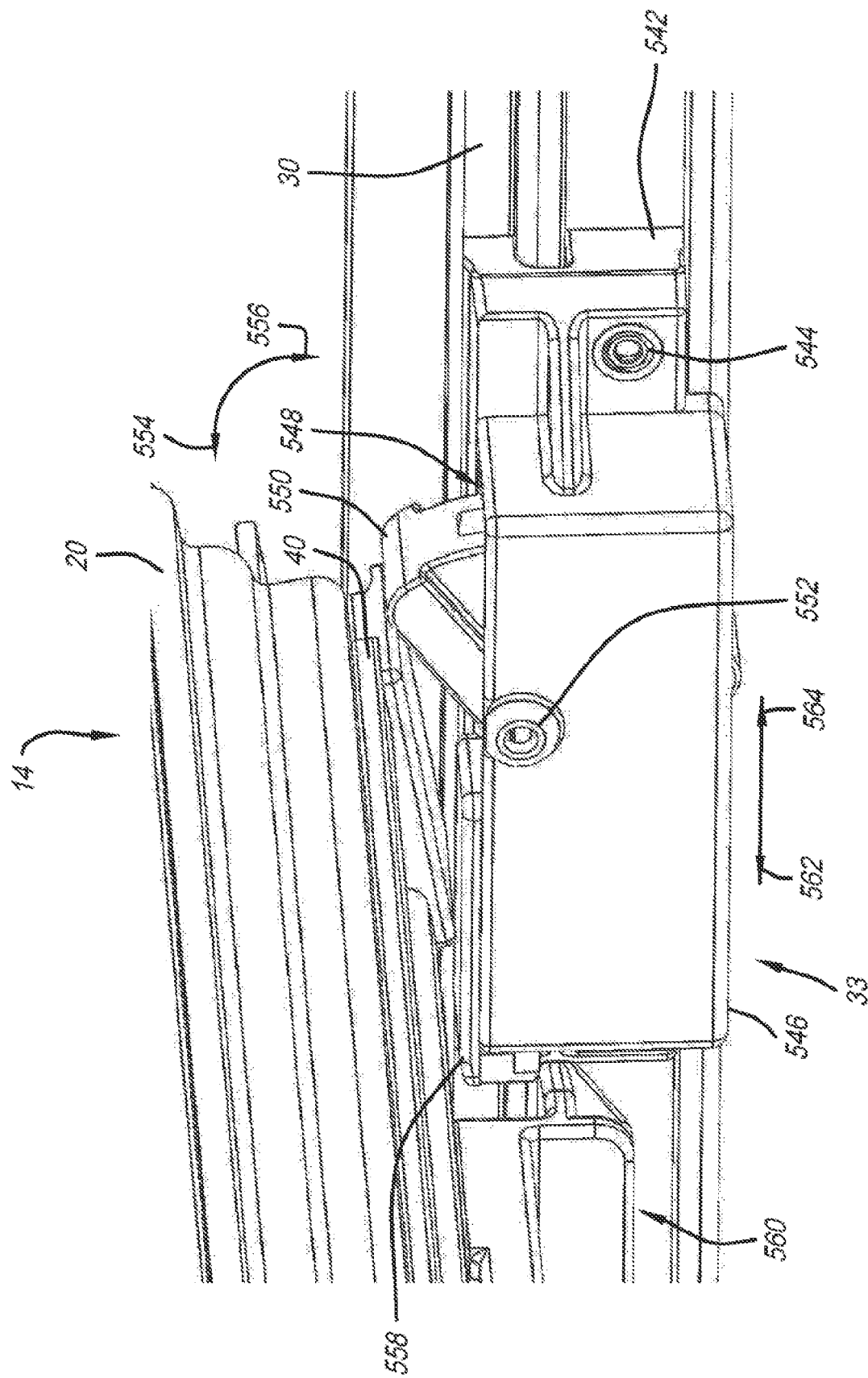
FIG. 43 is a perspective detail view of a mechanical catch assembly portion of the FIG. 44 is another detail view of the mechanical catch assembly of the tonneau cover.

A perspective detail view of mechanical catch assembly 33, illustratively attached to rail 30, is shown in FIG. 43. It is appreciated that additional mechanical catch assemblies 33 may be placed on rail 30 at different locations, as well as on rail 28, depending on the securement needs for the tonneau cover. For purposes of this disclosure, a single mechanical catch assembly 33 will be described. The skilled artisan upon reading this disclosure, however, should not interpret that only one mechanical catch assembly is necessarily being used. The aforementioned plurality or multiple mechanical catch assemblies discussed are contemplated to be within the scope of this disclosure.

As further illustratively shown, mechanical catch assembly 33 includes a base 542 that is attachable to rail 30, illustratively, via threaded fastener 544, that when tightened, illustratively, wedges base 542 against rail 30. It is appreciated, however, that any known mechanism that can attach an assembly to a rail may be employed as a substitute for fastener 544, and is contemplated to be within the scope of this disclosure. Illustratively, part of, and extending from base 542, is housing 546 that, illustratively, contains further components of mechanical catch assembly 33. As illustratively shown, housing 546 includes an opening 548 directed towards tonneau cover 14. Because of the position of tonneau cover 14, with respect to mechanical catch assembly 33, a lever 550 extends outward from an opening 548 of housing 546. The skilled artisan upon reading the present disclosure will appreciate that the lever shown herein is illustrative and is intended to be a structure that encompasses various physical forms. The point is that it is a structure being engageable by or engageable with other structures in order to selectively catch or release portions of tonneau cover 14. A further illustrative description of lever 550 is disclosed herein with respect to FIGS. 45 through 48.

A pin 552 is illustratively disposed through housing 546 and is the structure about which lever 550 pivots in either directions 554 and 556. A plunger 558 is also shown selectively extending from housing 546. As further described herein, plunger 558 is engageable with lever 550 and is movable by same either into or out of a panel catch 560, illustratively, located on tonneau cover 14. A bias member (see, FIGS. 47 and 48) may be employed to act on plunger 558 to cause it to maintain itself in one position or another. In an illustrative embodiment, the bias member can act on plunger 558 to bias same in direction 564 so it retracts into housing 546 instead of engaging panel catch 560. Again, as further discussed herein, it will be when lever 550 illustratively moves in direction 556 and acts on plunger 558, applying a force greater than the bias force, that plunger 558 will move in direction 562 and engage panel catch 560. This occurs when tonneau cover 14 engages lever 550 moving it in direction 556. It will be appreciated that mechanical catch assembly 33 and the panel catch 560 may either be located on the cover or the rail and vice versa.

Figure 44:
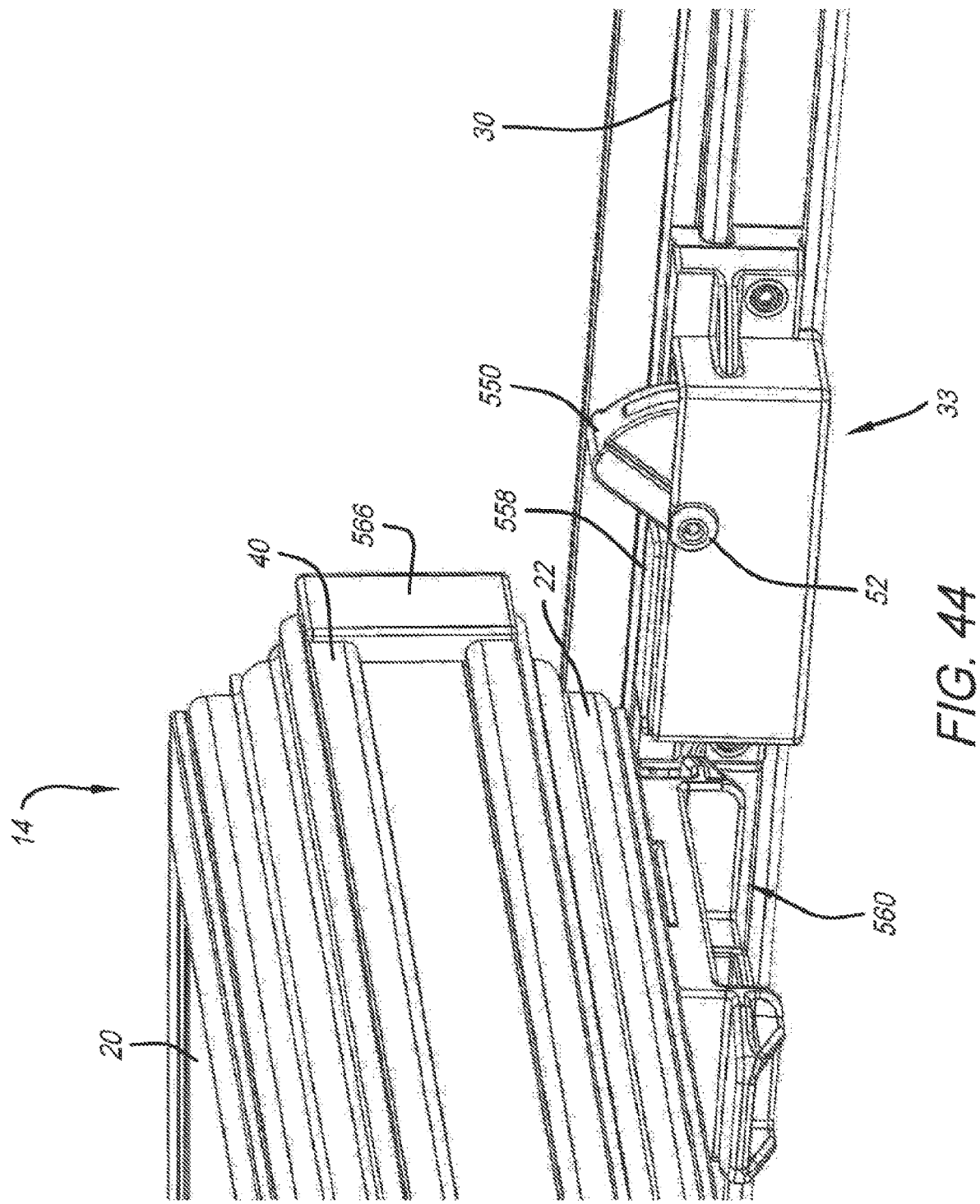

Another detail view of mechanical catch assembly 33, located on rail 30, adjacent tonneau cover 14 is shown in FIG. 44. In this view, cover section 20 is folded over cover section 22. Illustrative intermediate panel 40 is pivotally attached therebetween. A foot pad 566 is, illustratively, coupled to intermediate panel 40 and is configured to engage lever 550 when tonneau cover 14 is unfolded and laid flat. It will be appreciated by the skilled artisan upon reading this disclosure that foot pad 566 in its interaction with lever 550 does not have to be at the location of intermediate panel 40. Foot pad or other like structure may be attached to the underside of cover section 20, for example. Additionally, a foot pad may be integrally formed on the cover or the cover itself may be used to engage lever 550. As shown here, plunger 558 is fully retracted from panel catch 560. This means the latching function of mechanical catch assembly 33 is presently disengaged.

Figure 45:
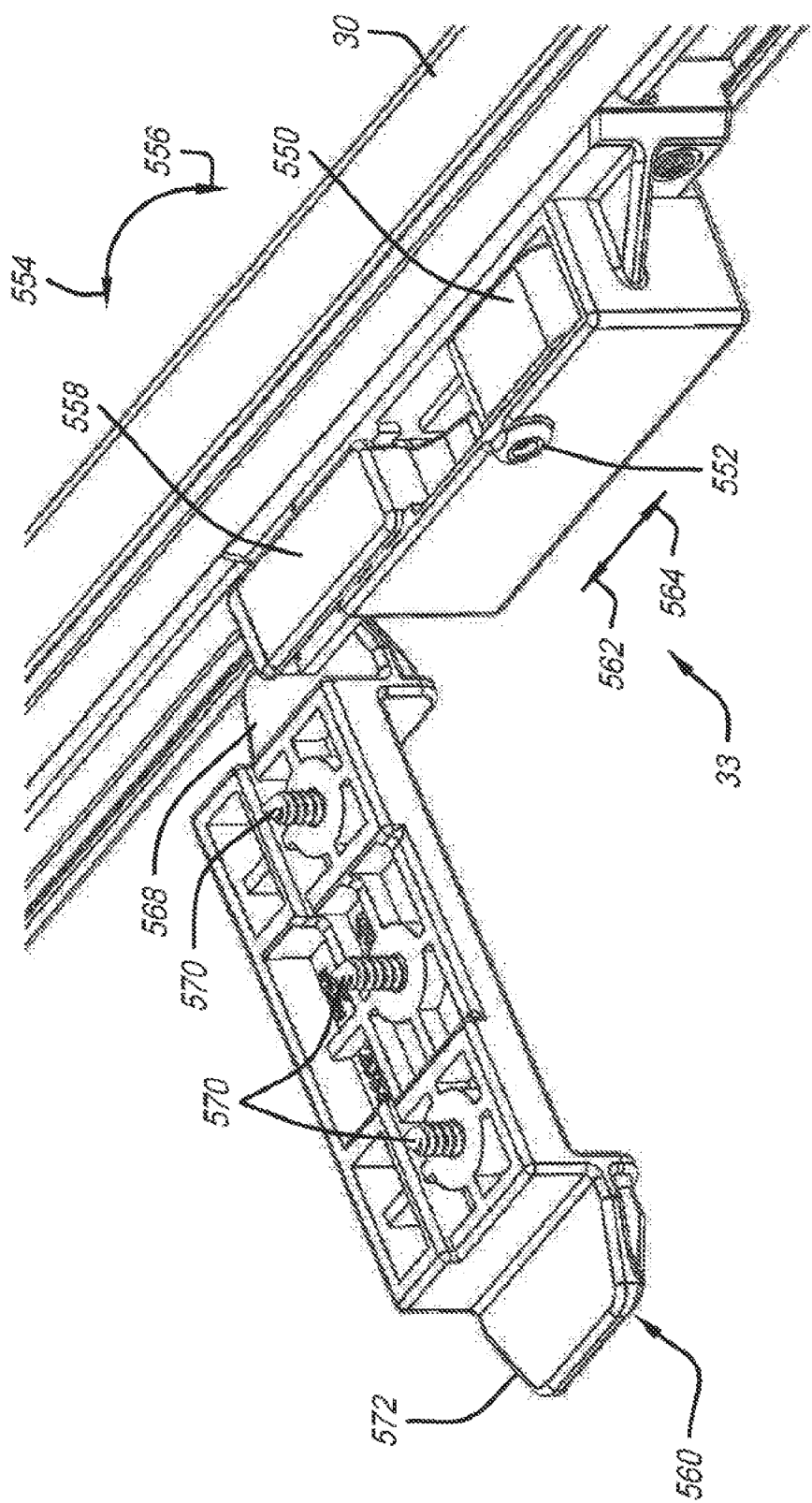
FIG. 45 is a perspective isolated detail view of the mechanical catch assembly coupled to the rail with a panel catch isolated from the tonneau cover.

A perspective isolated detail view of mechanical catch assembly 33 coupled to rail 30 with panel catch 560 isolated from tonneau cover 14 is shown in FIG. 45. This view, in contrast to the views in FIGS. 43 and 44, depict mechanical catch assembly 33 in a latched condition. As illustratively shown, lever 550 has been moved in direction 556 about pin 552. This movement causes lever 550 to engage plunger 558 which moves in direction 562 so it can engage illustrative flange 568 extending from panel catch 560. Also illustrative fasteners 570 may be used to attach to the underside of tonneau cover 14.

In this illustrative embodiment, by extending plunger 558 adjacent panel 560, the skilled artisan upon reading this disclosure will appreciate, the tonneau cover that panel catch 560 is attached to, will not move. Additionally, in an illustrative embodiment, panel catch 560 may have an additional flange 572 extending away from flange 568 on the opposite side of panel catch 560. This is so that panel catch 560 may be used on the other side of tonneau cover 14. For ease of manufacture and cost, a single panel catch 560 may be employed on either side of tonneau cover 14.

Figure 46:
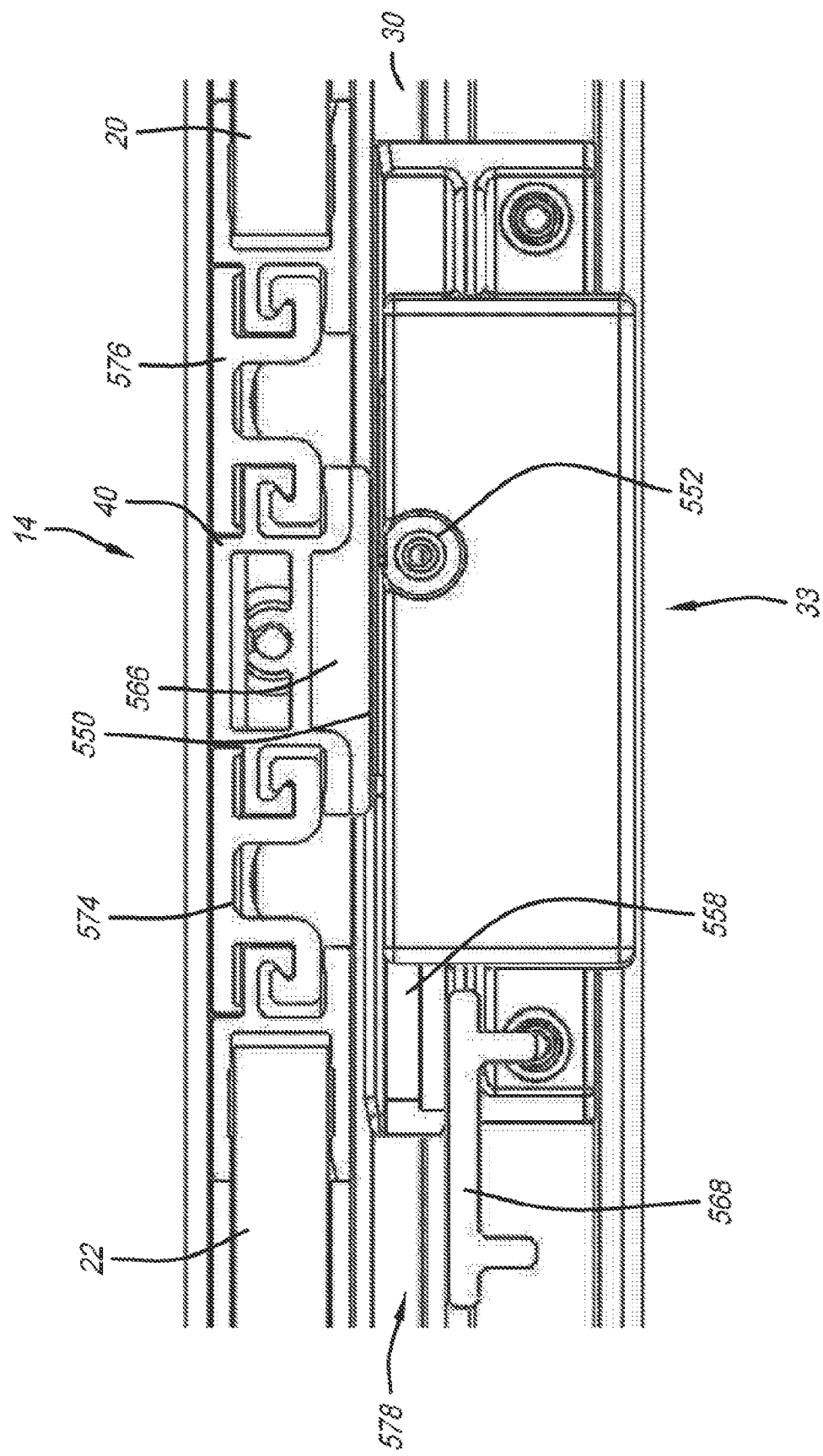
FIG. 46 is an isolated view of the tonneau cover lying flat on the rail and including the mechanical catch assembly.

An isolated side view of a portion of tonneau cover 14 lying flat on rail 30 and mechanical catch assembly 33, is shown in FIG. 46. This view depicts, like the view in FIG. 45, the positioning of mechanical catch assembly 33 when it is engaged and holding tonneau cover 14. In the illustrated embodiment, foot pad 566 is pressed down on lever 550 and attached to intermediate panel 40 hingedly attached to cover sections 20 and 22 via hinges 574 and 576. It is appreciated that foot pad 566 (or other similarly functioning structure) and mechanical catch assembly 33 may be located fore or aft this particular location to catch either cover sections 20 or 22. Furthermore, additional mechanical catch assemblies may be employed on rail 30, as well as rail 28 to provide additional selective catching functionality along the sides of tonneau cover 14. In this depiction of FIG. 46, plunger 558 is extended and engaging flange 568 of panel catch 560. Further, illustratively, plunger 558 sits in cavity 578 that is formed between flange 568, the underside of panel 22, and rail 30. This combination, illustratively, serves to maintain a secure pocket for plunger 558 to reside in order to hold tonneau cover 14 in the closed position as shown. If someone attempted to lift tonneau cover 14, plunger 558 prevents such movement as it is engaged to both tonneau cover 14 and mechanical catch assembly 33. And because mechanical catch assembly 33 is fixedly attached to rail 30, which is fixedly attached to sidewall 8 of truck bed 4, tonneau cover 14 will be unable to move.

Figure 47:
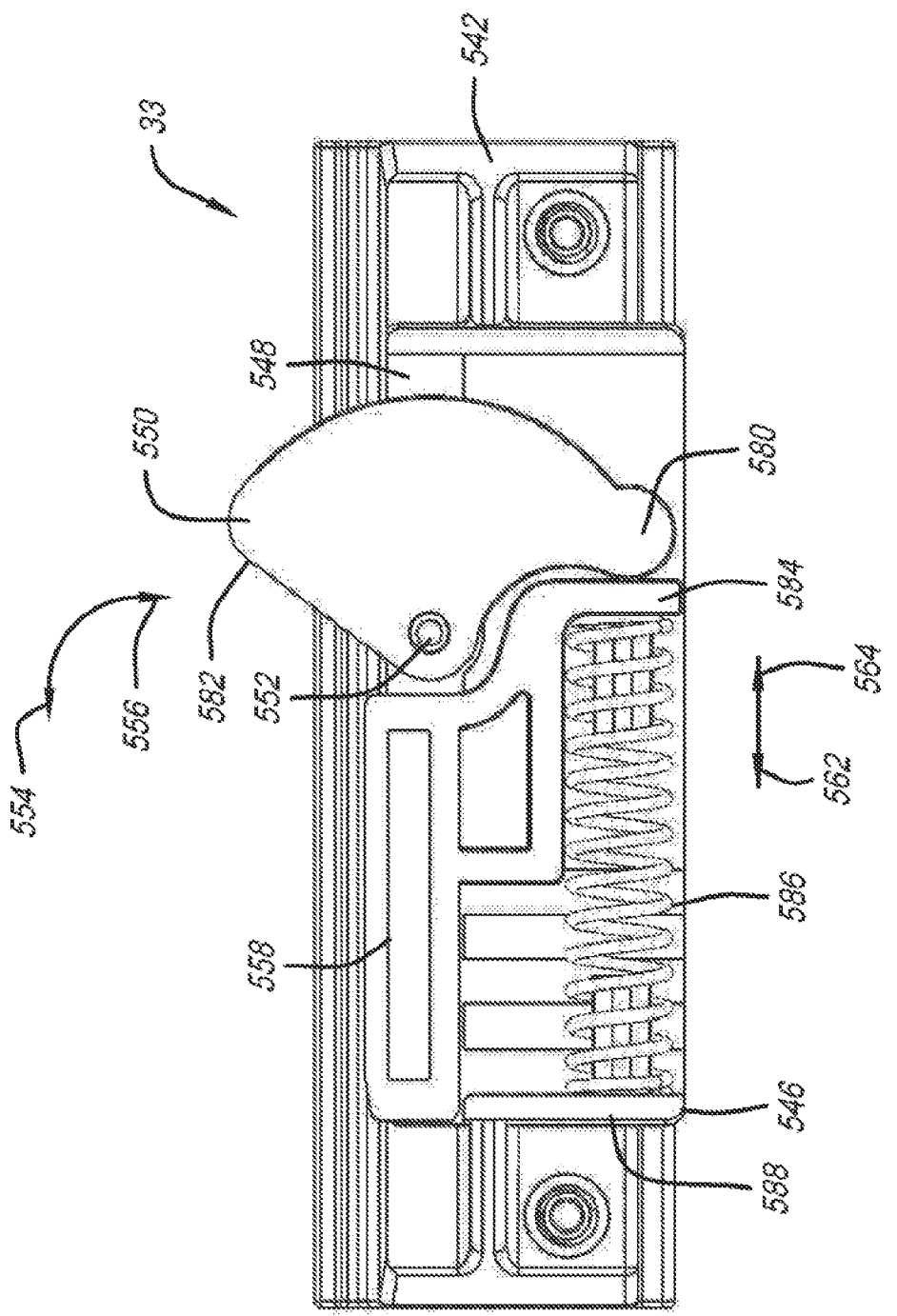
FIG. 47 is a side elevational sectional and partial interior view of the mechanical catch assembly.

A side elevational, sectional, and partial interior view of mechanical catch assembly 33 is shown in FIG. 47. Base 542 and housing 546 are shown with the latter having its facing cut away to view the structures within. As shown, lever 550 is pivotally coupled to pin 552 and extends out of opening 548. An extension bar or cam 580 extends from lever 550 spaced apart from pin 552 and located opposite surface 582 that engages foot pad 566. Cam 580 engages a flange portion 584 extending from plunger 558. A bias member or spring 586 extends between flange portion 584 and sidewall 588 of housing 546. Spring 586 is configured to bias in directions 562 and 564. With this configuration, such bias keeps plunger 558 recessed in direction 564 in housing 546, as well as keeping a portion of surface 582 extended outwardly from opening 548 of housing 546 making lever 550 available to be engaged by tonneau cover 14. In other words, the positioning of plunger 558 and lever 550 shown herein are their positioning when no other external force (i.e., the tonneau cover) acts on level 552 to move plunger 558.

Figure 48:
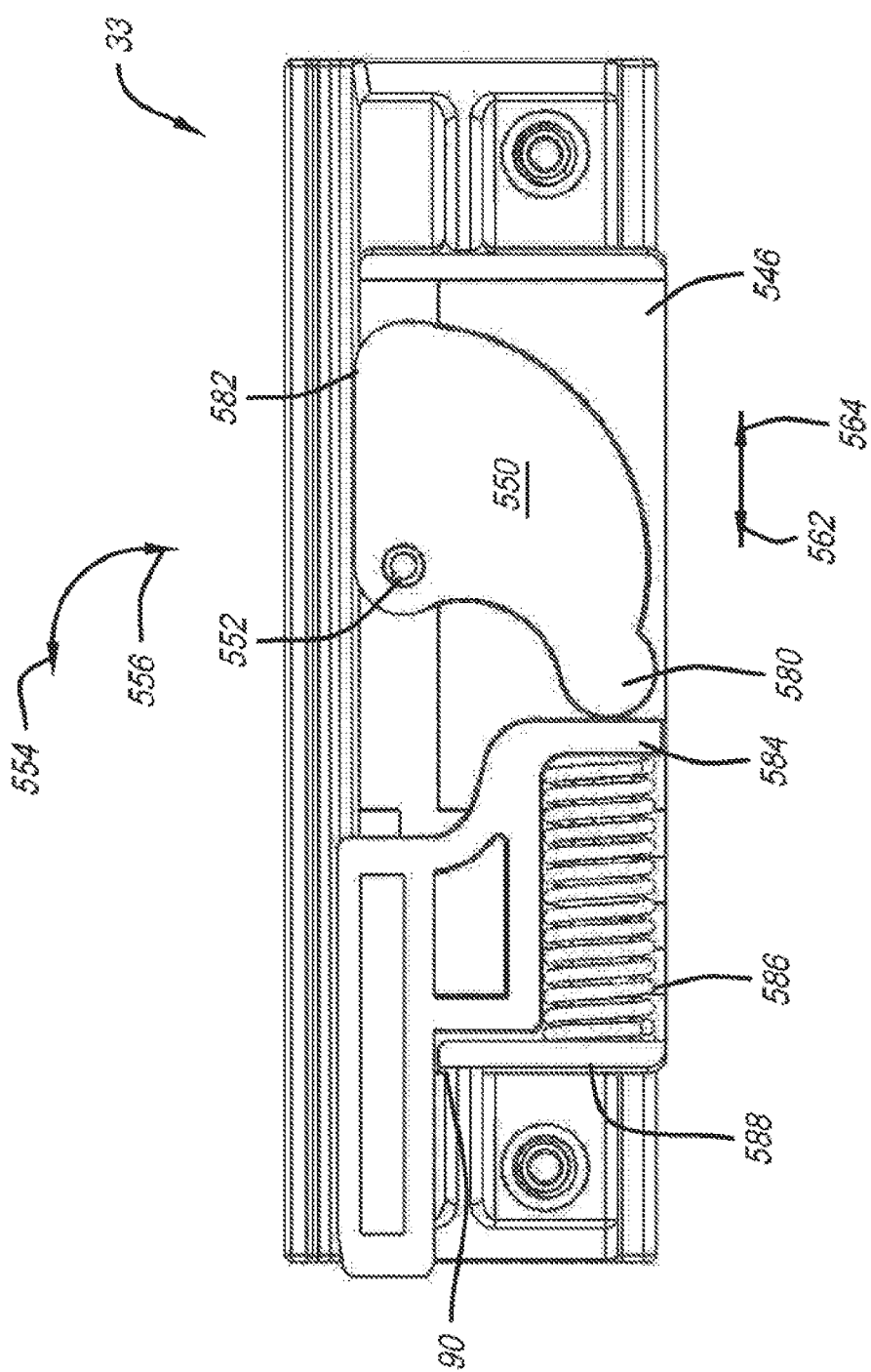
FIG. 48 is a side elevational partial cutaway interior view of the mechanical catch assembly.

Another side elevational partial cut away interior view of mechanical catch assembly 33 is shown in FIG. 48. This view differs from the view shown in FIG. 47 in that now lever 550 has been moved in direction 556 about pin 552. This causes cam 580 to push against flange portion 584 of plunger 558 in direction 562 against the bias of spring 586. It is contemplated that the weight of tonneau cover 14 will overcome the bias of spring 586 so plunger 558 will extend from opening 590 inside wall 588 of housing 546. With plunger 558 extended, it engages adjacent flange 568 of the panel catch 560 as shown in FIGS. 45 and 46. This creates the latching-type configuration which will prevent tonneau cover 14 from being moved again after the initial cover section 18, with latching assembly 32, is unlatched. This allows the operator to begin folding tonneau cover 14. By doing so (as shown in FIGS. 2 through 4), the lifting movement will allow lever 550 to move in direction 554, which retracts plunger 558, releasing it from panel catch 560. This allows the tonneau cover 14 to be continually folded without any manually unlatching steps to be engaged in by the operator.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A tonneau cover comprising:
a bulkhead panel assembly;
a plurality of cover panel sections pivotally coupled to each other;
wherein one or more of the plurality of cover panel sections are foldable onto the bulkhead panel assembly;
wherein the bulkhead panel assembly includes a front frame, a central panel, and a hinge frame;
wherein the front frame is configured to extend over a cargo box and is configured to be located adjacent a cab section of a pickup truck;
wherein the central panel is configured to extend over the cargo box and is located between the front frame and the hinge frame;
wherein the hinge frame is configured to extend over the cargo box and is located adjacent the central panel opposite the front frame;
wherein the hinge frame is configured to hingedly couple to a panel of the plurality of cover panel sections so the one or more of the plurality of cover panel sections are supportable by the bulkhead panel assembly;
wherein the front frame includes a longitudinally extending channel that receives a portion of the central panel;
wherein the hinge frame includes a longitudinally extending channel that receives another portion of the central panel;
wherein the front frame, the central panel, and the hinge frame are each made of an extruded metal material; and
at least one positive placement assembly located on the bulkhead panel assembly and configured to position the one or more of the plurality of cover panel sections that are foldable onto the bulkhead panel assembly at a predetermined location;

wherein the at least one positive placement assembly includes at least one positive placement tab extending from the bulkhead panel assembly and configured to fit into a corresponding channel formed in an intermediate panel located between cover panel sections of the plurality of cover panel sections when the one or more of the plurality of cover panel sections are folded onto the bulkhead panel assembly.

2. The tonneau cover of claim 1, wherein the extruded metal material includes aluminum.

3. The tonneau cover of claim 1, further comprising an end cap that covers at least a portion of each of the front frame, the central panel, and the hinge frame.

4. The tonneau cover of claim 1, further comprising a hinge fitted into a space formed in the hinge frame to connect to a cover panel section of the plurality of cover panel sections.

5. The tonneau cover of claim 1, wherein the central panel is composed of a top panel member and a lower panel member located opposite the top panel member with a space located therebetween.

6. The tonneau cover of claim 5, wherein the central panel includes at least one brace member located between the top panel member and the lower panel member.

7. The tonneau cover of claim 1, wherein the longitudinally extending channel of the front frame and the longitudinally extending channel of the hinge frame are each at least partially defined by opposed flange members, where in each of the flange members includes a detent extending interior of the channel.

8. The tonneau cover of claim 1, wherein the front frame includes a front flange extending from the channel, wherein a second channel is located underneath the front flange.

9. The tonneau cover of claim 8, further comprising a bulkhead seal located on the front flange of the front frame, wherein the bulkhead seal is composed of a flexible first seal flange that is spaced apart from a flexible second seal flange and both extending from the front flange, and wherein a portion of the bulkhead seal is fitted within the second channel of the front frame.

10. The tonneau cover of claim 5, wherein at least a portion of the lower panel member of the central panel includes at least one opening, wherein the top panel member includes at least one tab depending from an underside of the top panel member and over the at least one opening.

11. A tonneau cover comprising:
a bulkhead panel assembly; and
a plurality of cover panel sections pivotally coupled to each other;
wherein one or more of the plurality of cover panel sections are foldable onto the bulkhead panel assembly;
wherein the bulkhead panel assembly includes a front frame, a central panel, and a hinge frame;
wherein the front frame includes a longitudinally extending channel that receives a portion of the central panel;
wherein the hinge frame includes a longitudinally extending channel that receives another portion of the central panel;
wherein the front frame, the central panel, and the hinge frame are each made of an extruded metal material;
wherein the central panel is composed of a top panel member and a lower panel member located opposite the top panel member; and
wherein at least a portion of the lower panel member of the central panel includes at least one opening, wherein the top panel member includes at least one tab depending from an underside of the top panel member and over the at least one opening.

12. The tonneau cover of claim 11, wherein the front frame is configured to extend over a cargo box and wherein the central panel is configured to extend over the cargo box.

13. The tonneau cover of claim 11, wherein the hinge frame is configured to extend over a cargo box and is located adjacent the central panel opposite the front frame, and wherein the hinge frame is configured to hingedly couple to a panel of the plurality of cover panel sections so the one or more of the plurality of cover panel sections are supportable by the bulkhead panel assembly.

14. The tonneau cover of claim 11, wherein the extruded metal material includes aluminum.

15. The tonneau cover of claim 11, further comprising at least one positive placement assembly located on the bulkhead panel assembly and configured to position the one or more of the plurality of cover panel sections that are foldable onto the bulkhead panel assembly at a predetermined location.

16. The tonneau cover of claim 15, wherein the at least one positive placement assembly includes at least one positive placement tab extending from the bulkhead panel assembly and configured to fit into a corresponding channel formed in an intermediate panel located between cover panel sections of the plurality of cover panel sections when the one or more of the plurality of cover panel sections are folded onto the bulkhead panel assembly.

17. A tonneau cover comprising:
a bulkhead panel assembly;
a plurality of cover panel sections pivotally coupled to each other;
wherein one or more of the plurality of cover panel sections are foldable onto the bulkhead panel assembly;
wherein the bulkhead panel assembly includes a front frame, a central panel, and a hinge frame;
wherein the front frame is configured to extend over a cargo box and is configured to be located adjacent a cab section of a pickup truck;
wherein the central panel is configured to extend over the cargo box and is located between the front frame and the hinge frame; and
at least one positive placement tab extending from the bulkhead panel assembly and configured to fit into a corresponding channel formed in an intermediate panel located between cover panel sections of the plurality of cover panel sections when the one or more of the plurality of cover panel sections are folded onto the bulkhead panel assembly.

18. The tonneau cover of claim 17, wherein the front frame, the central panel, and the hinge frame are each made of an extruded material, and wherein the extruded material includes aluminum.

* * * * *